Figure 1:
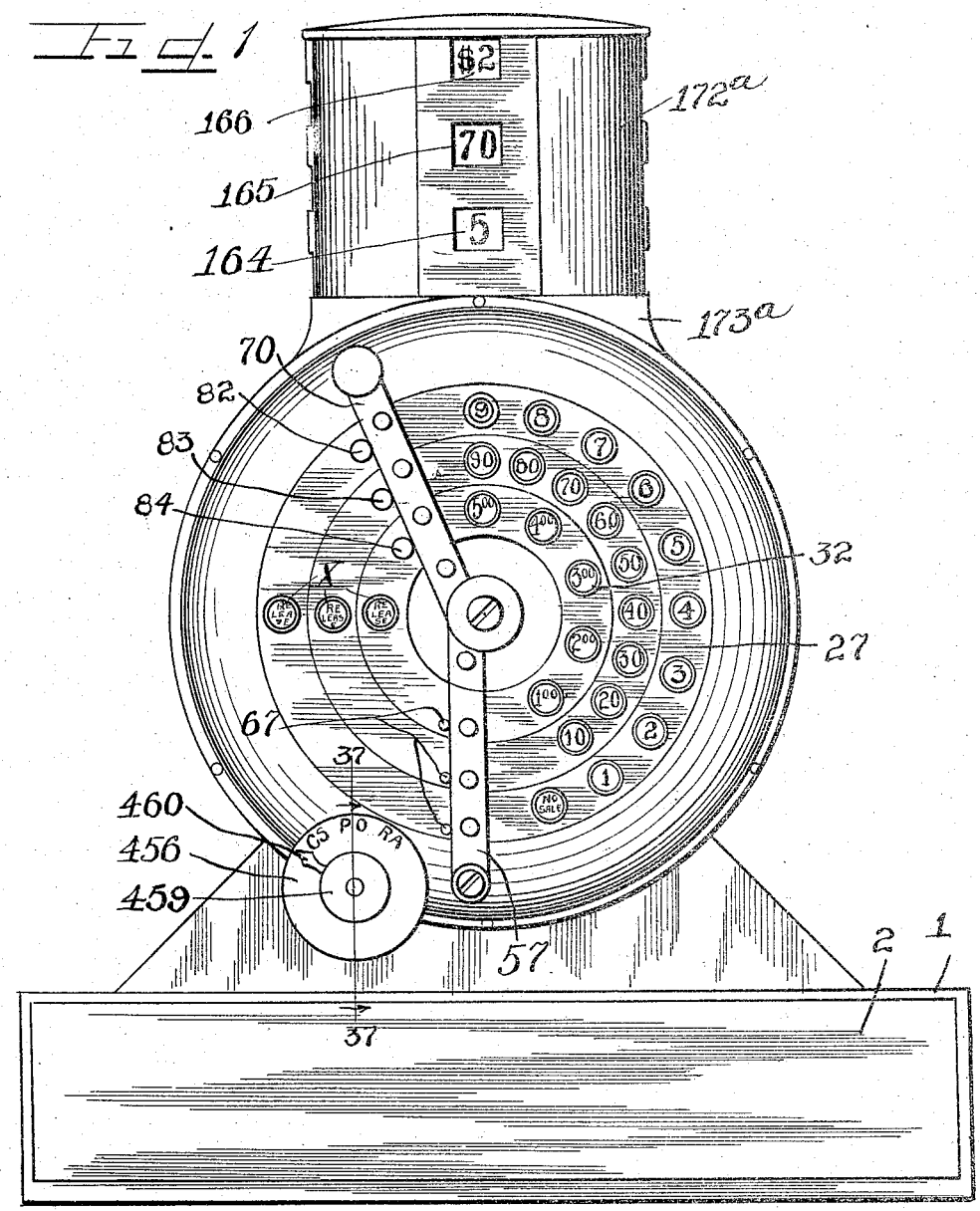

C. SULFER.
CASH REGISTER.
APPLICATION FILED JUNE 28, 1911.

1,196,898.

Patented Sept. 5, 1916.
28 SHEETS—SHEET 1.

C. SULFER.
CASH REGISTER.
APPLICATION FILED JUNE 28, 1911.

1,196,898.

Patented Sept. 5, 1916.
28 SHEETS—SHEET 2.

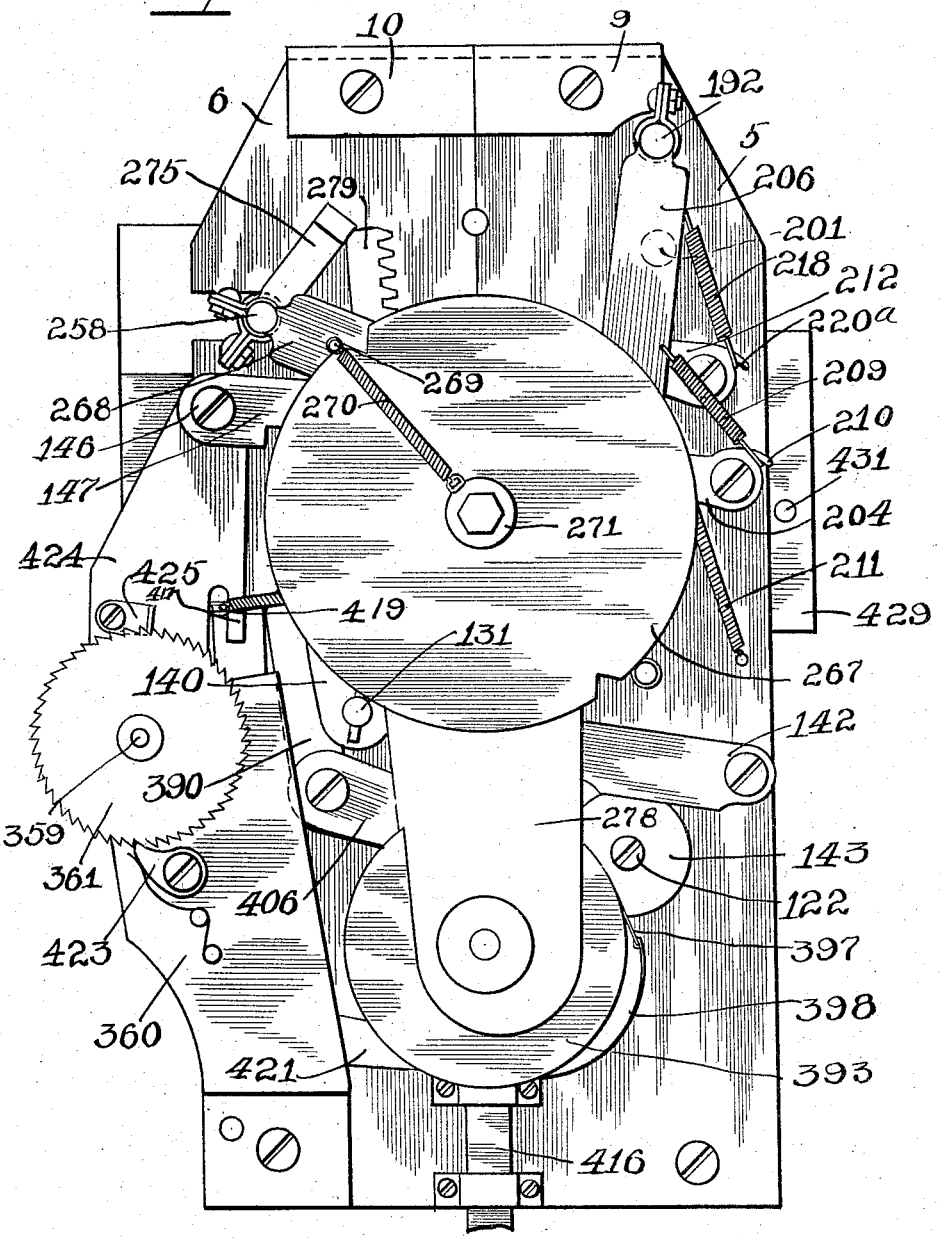

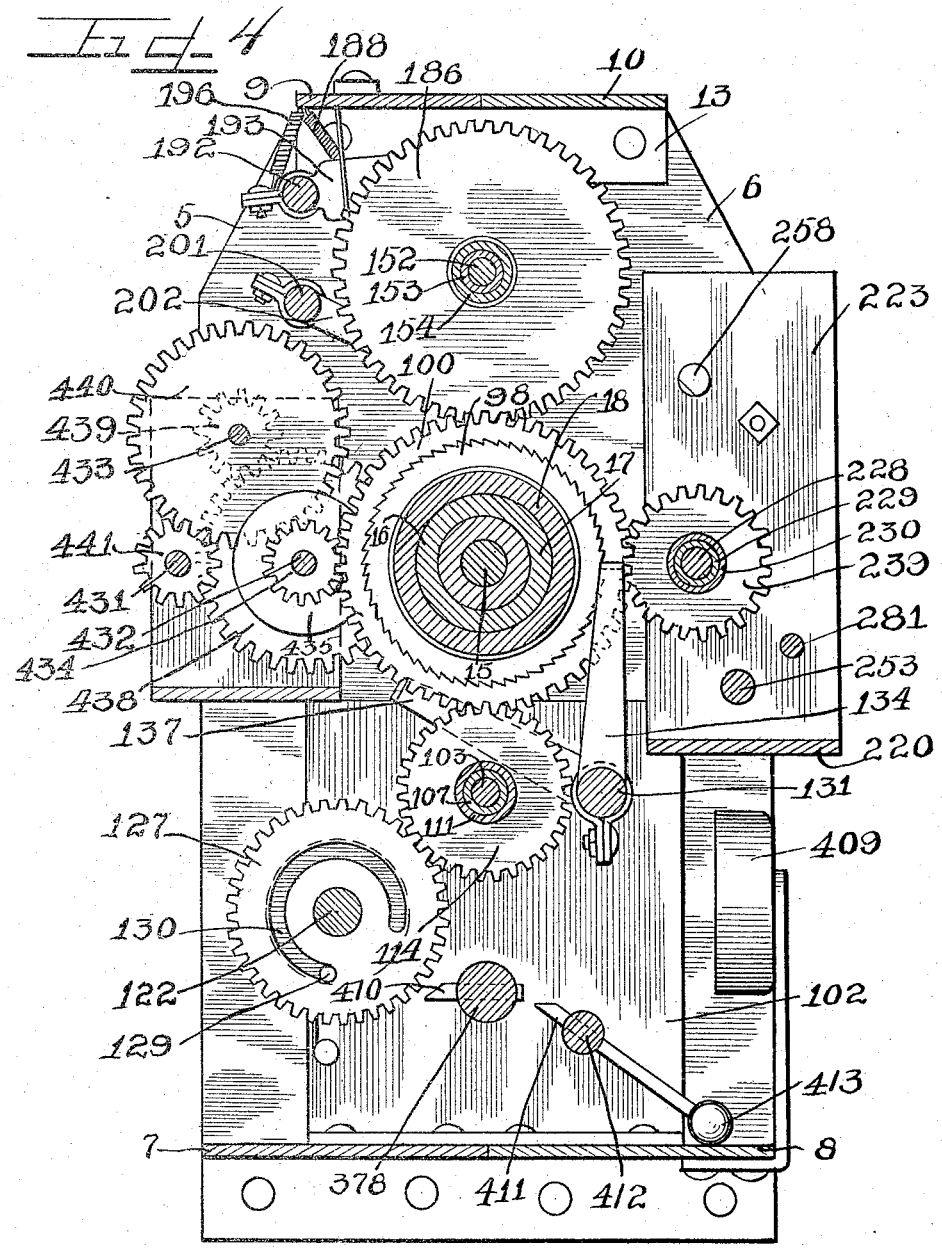

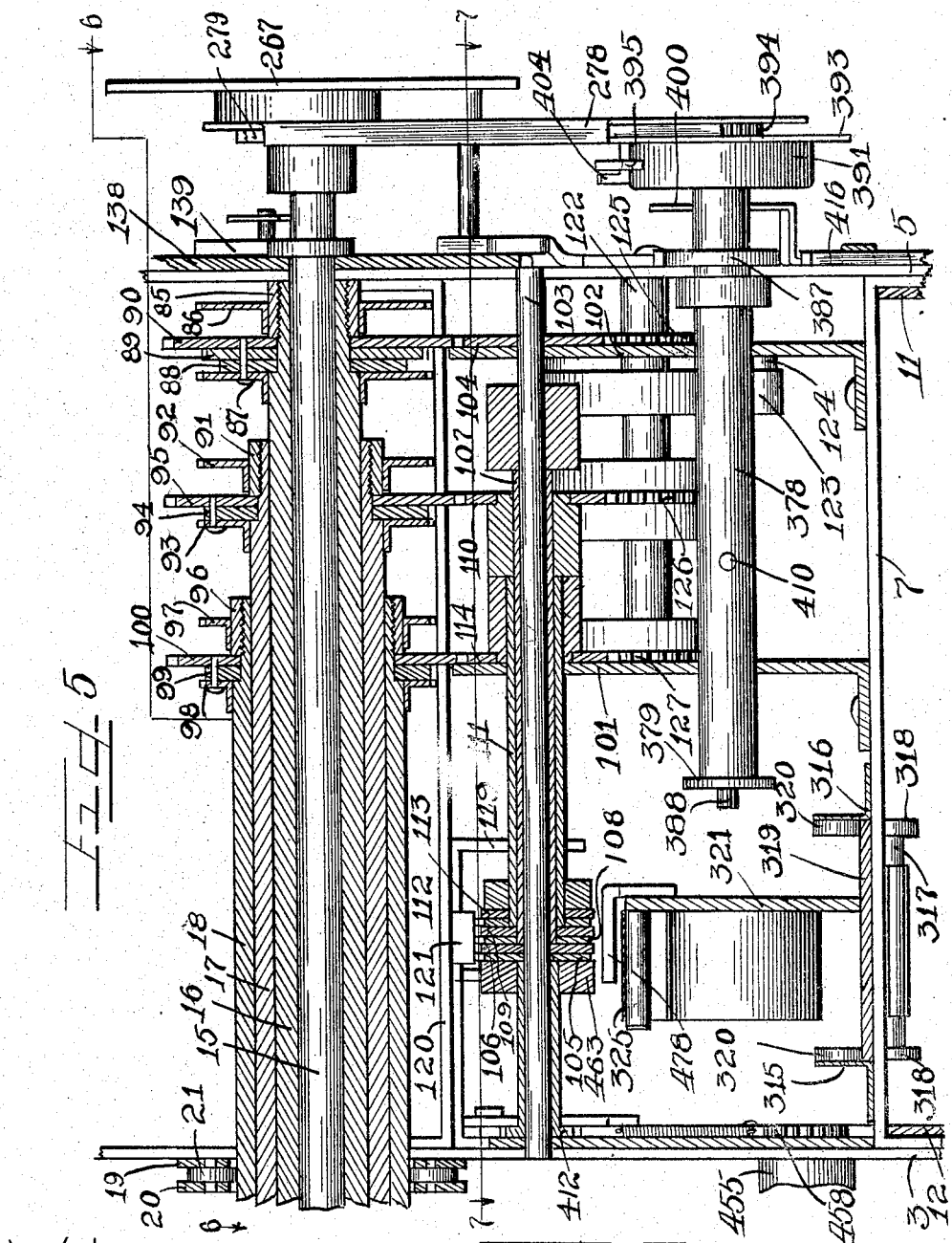

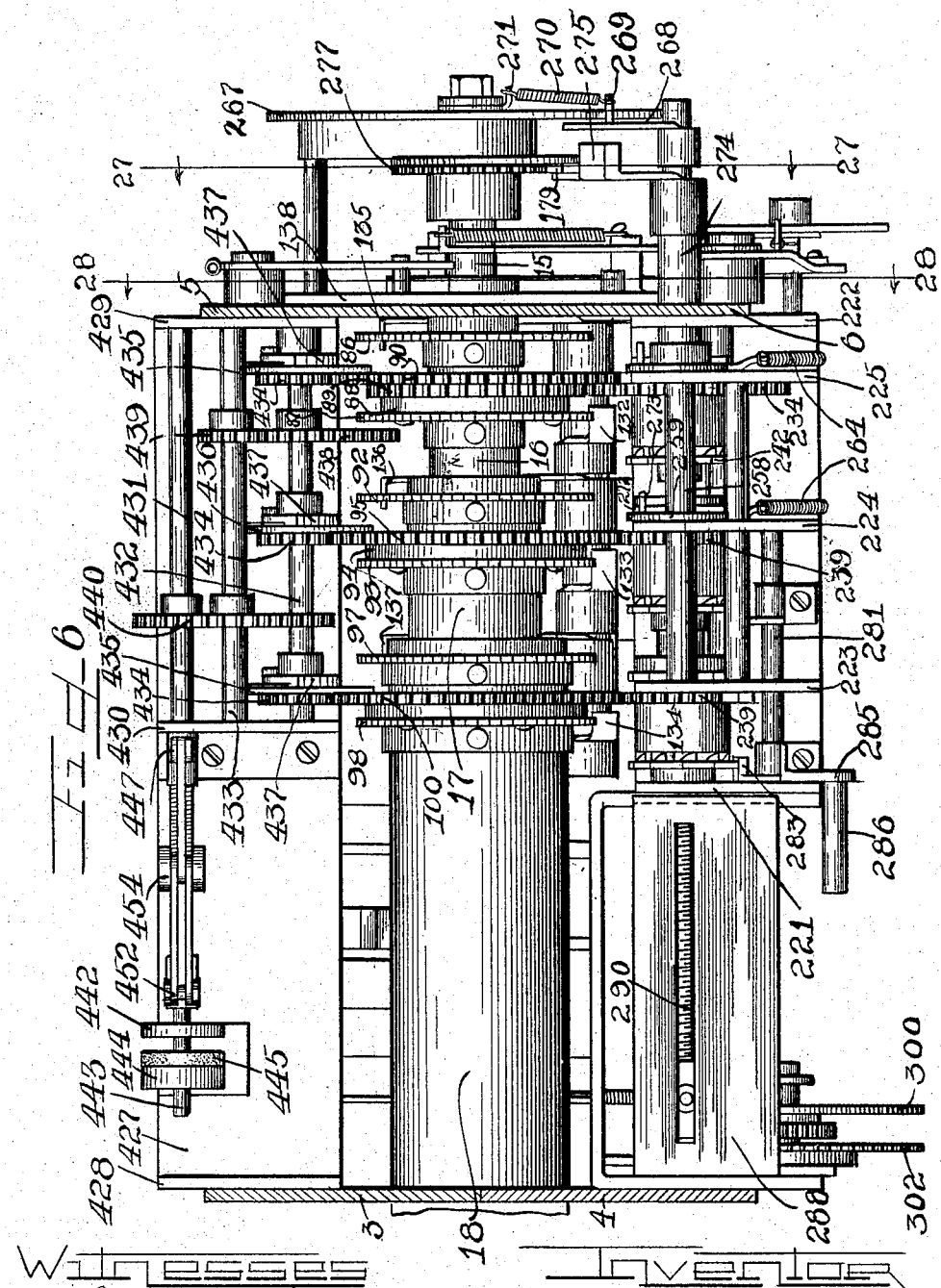

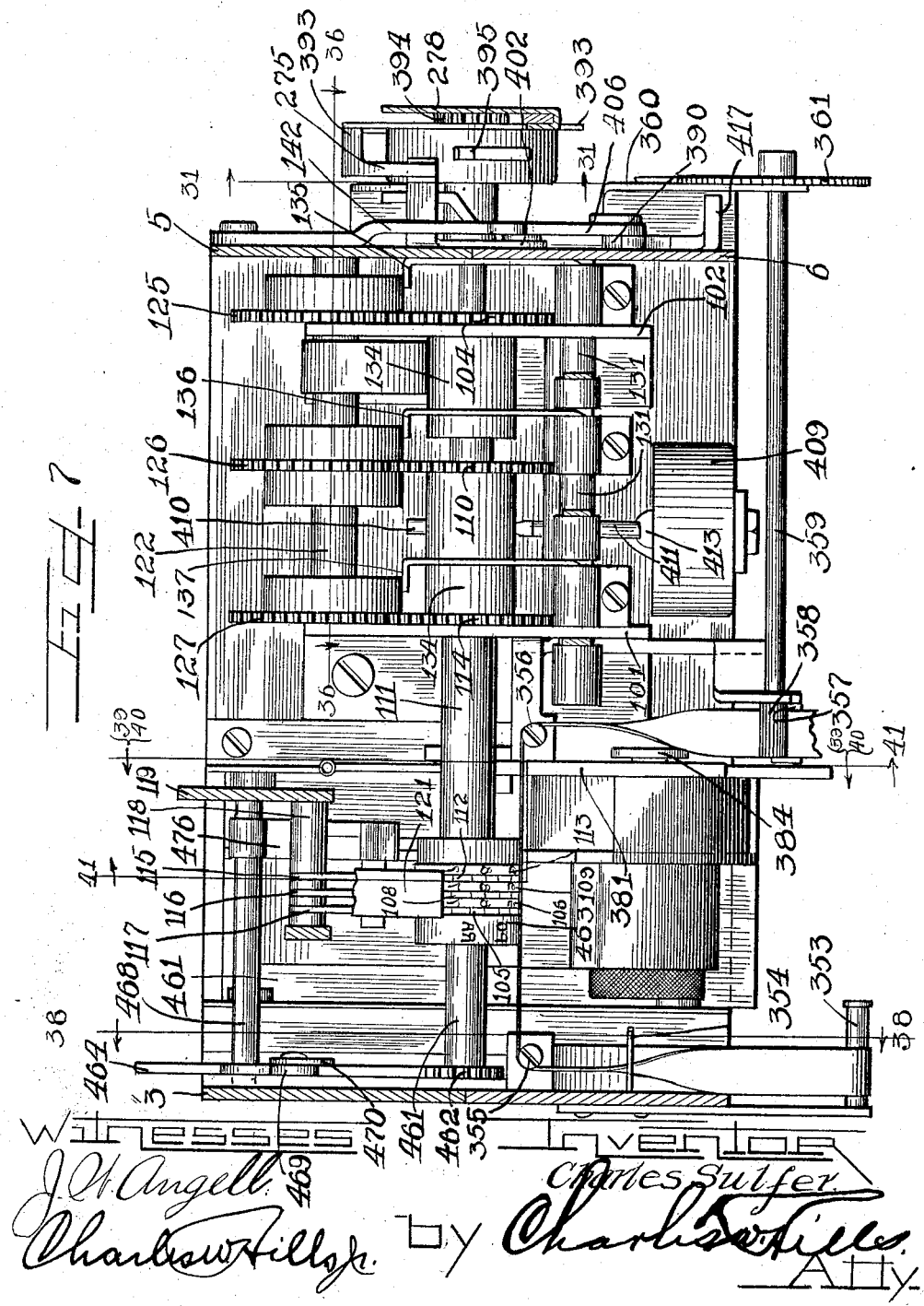

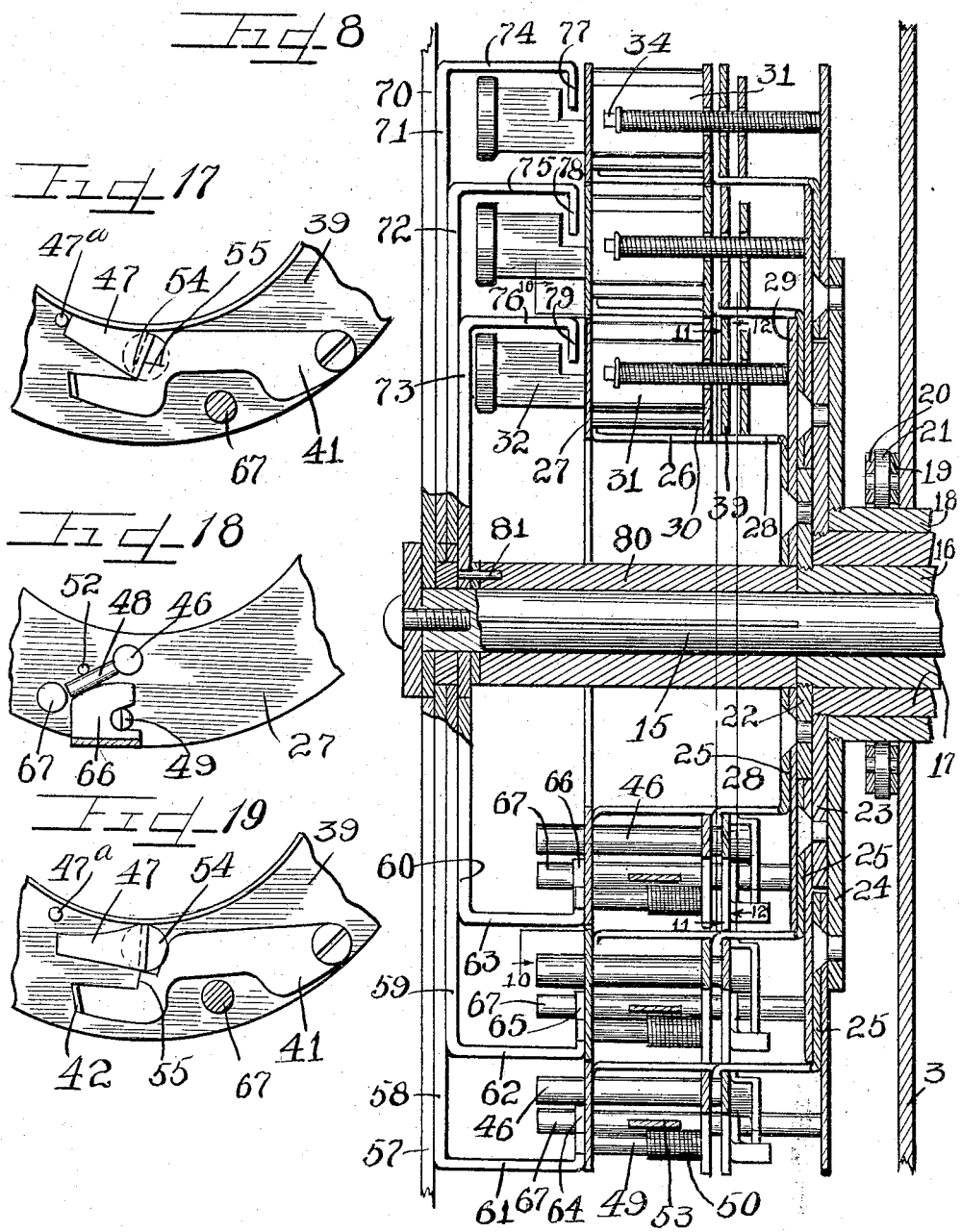

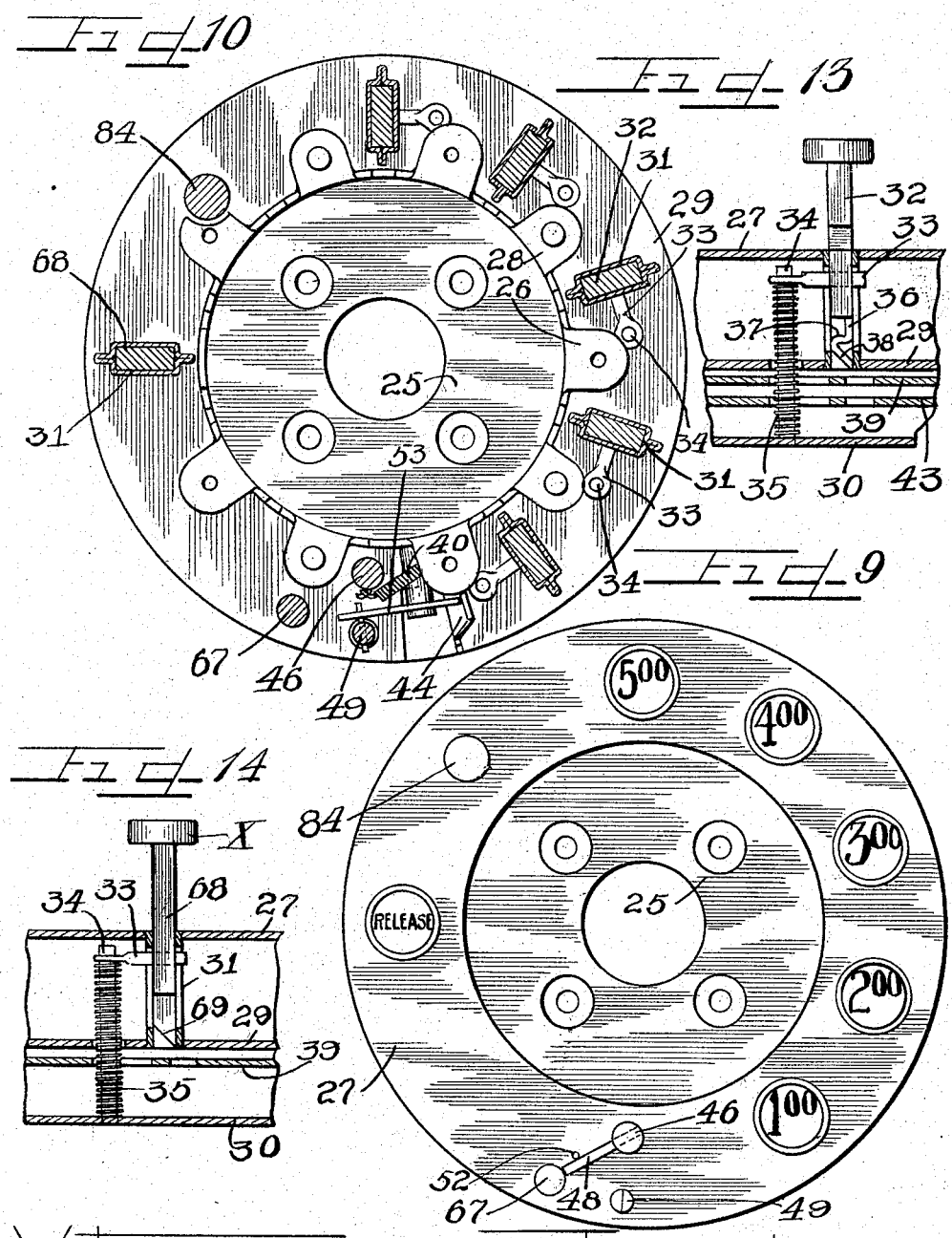

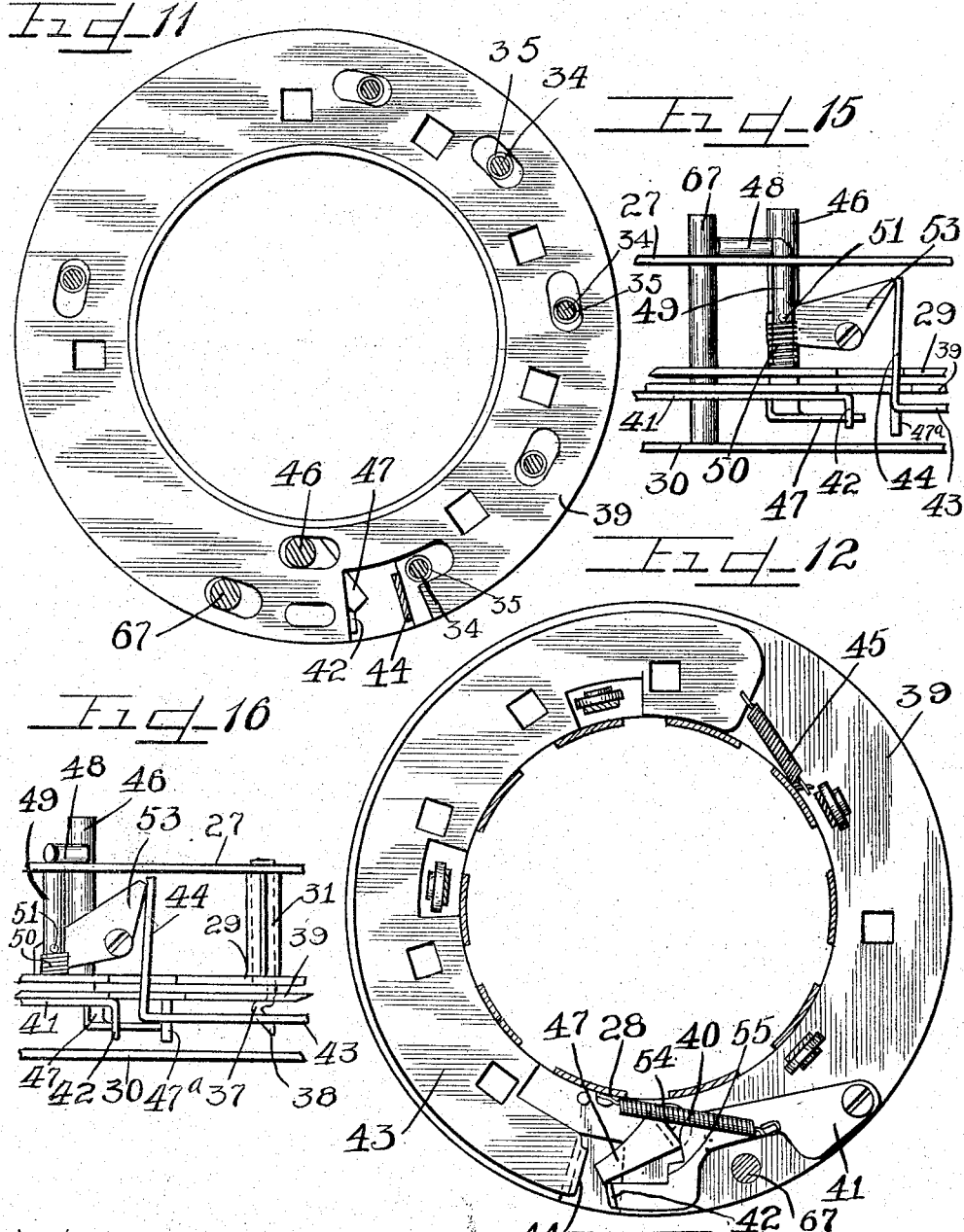

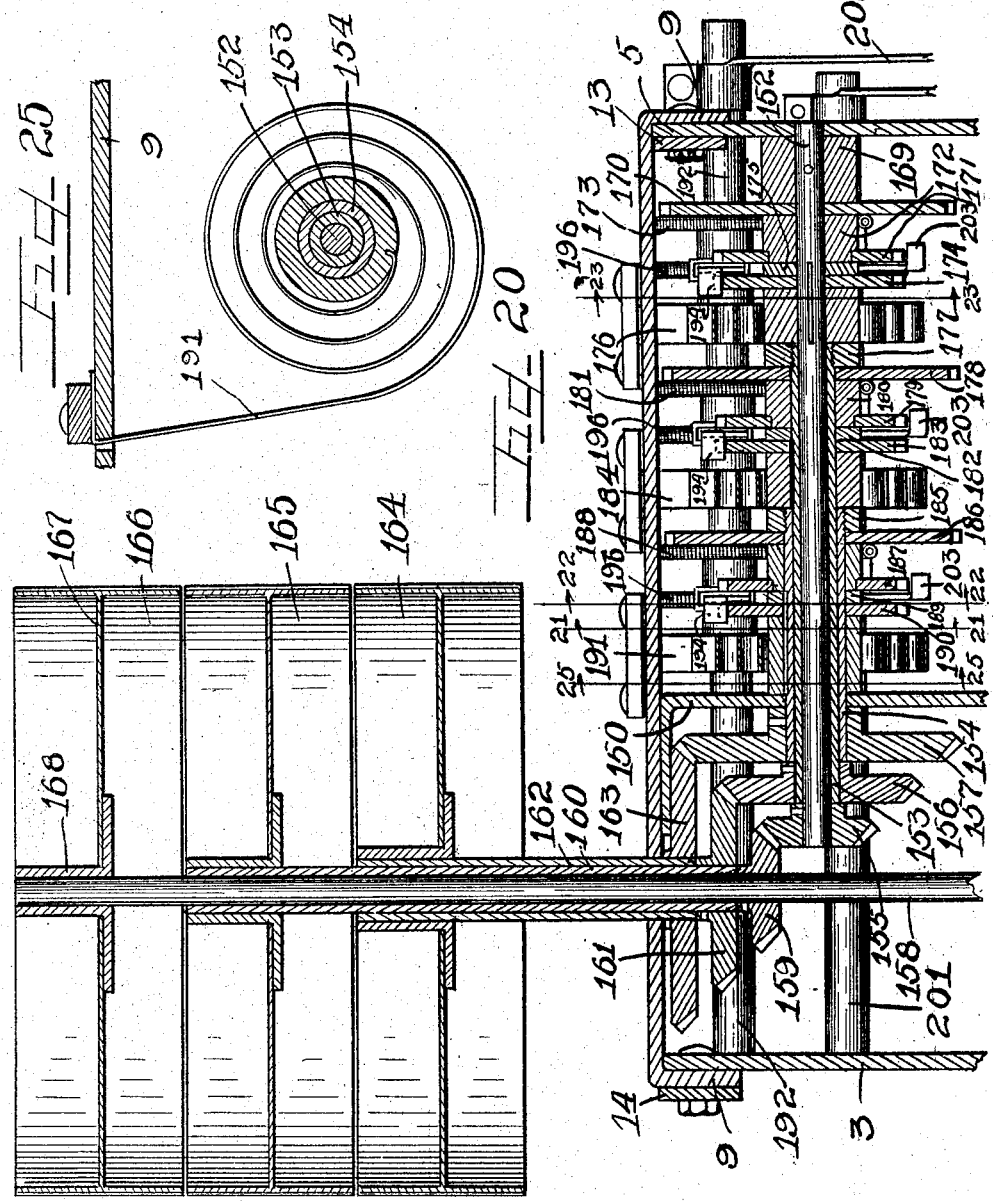

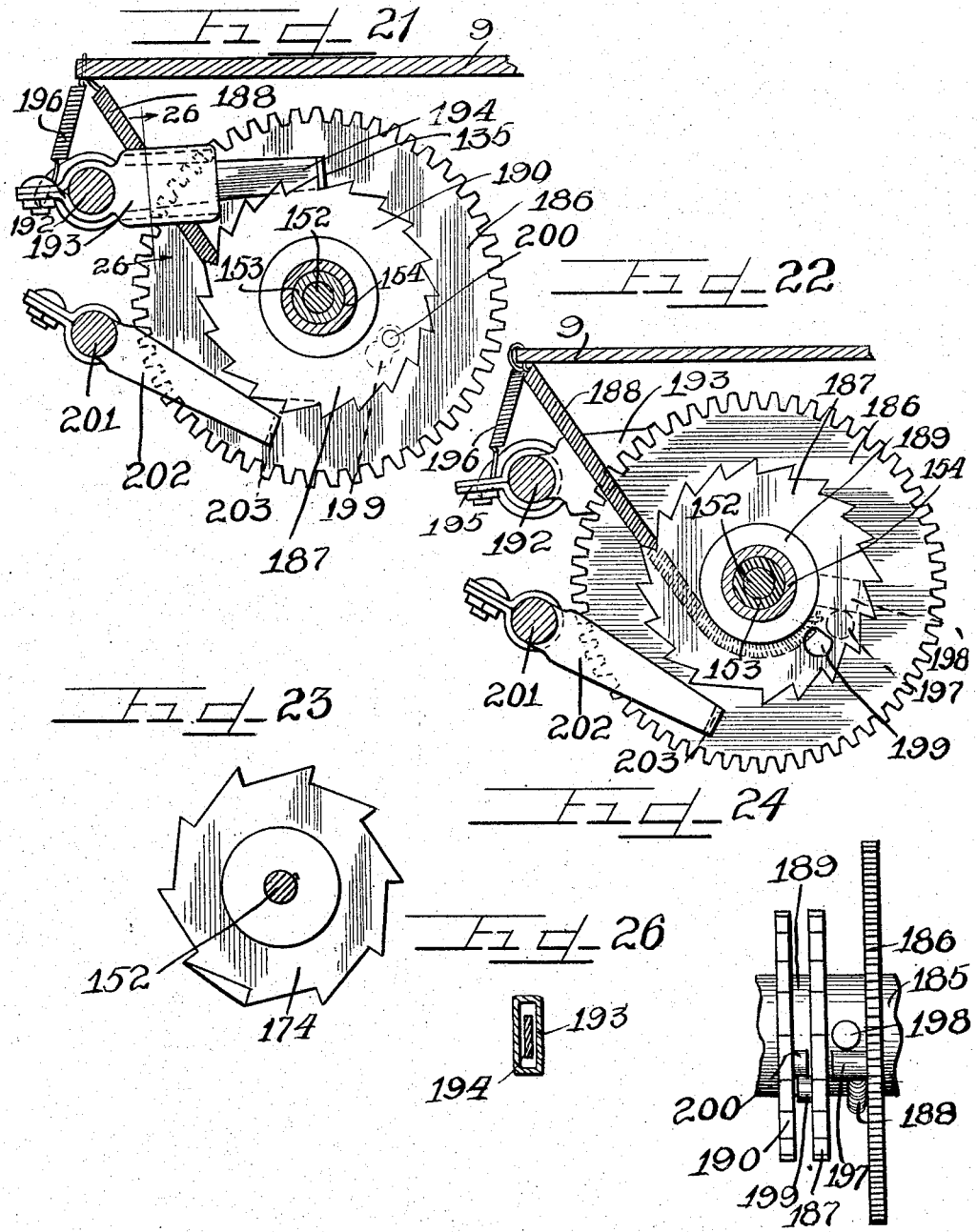

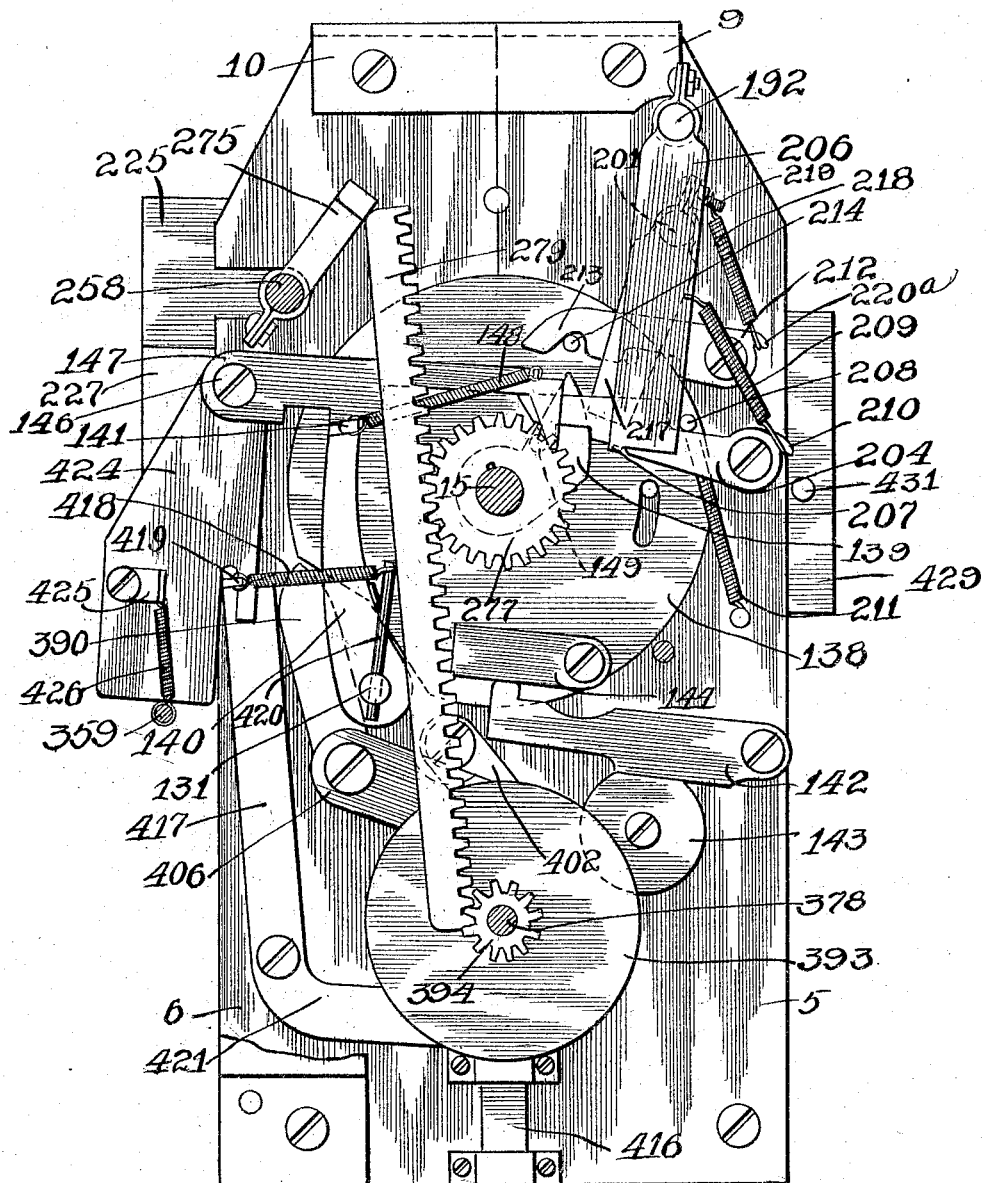

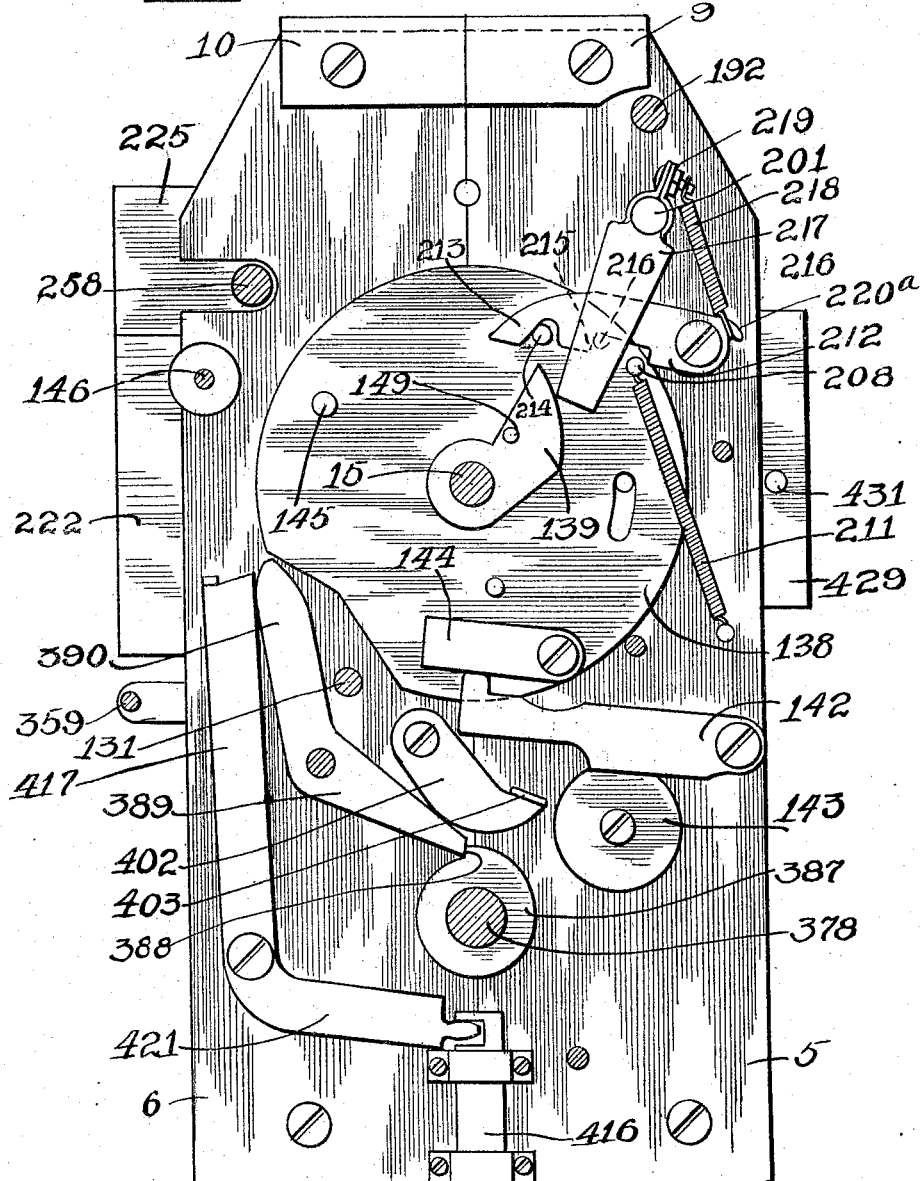

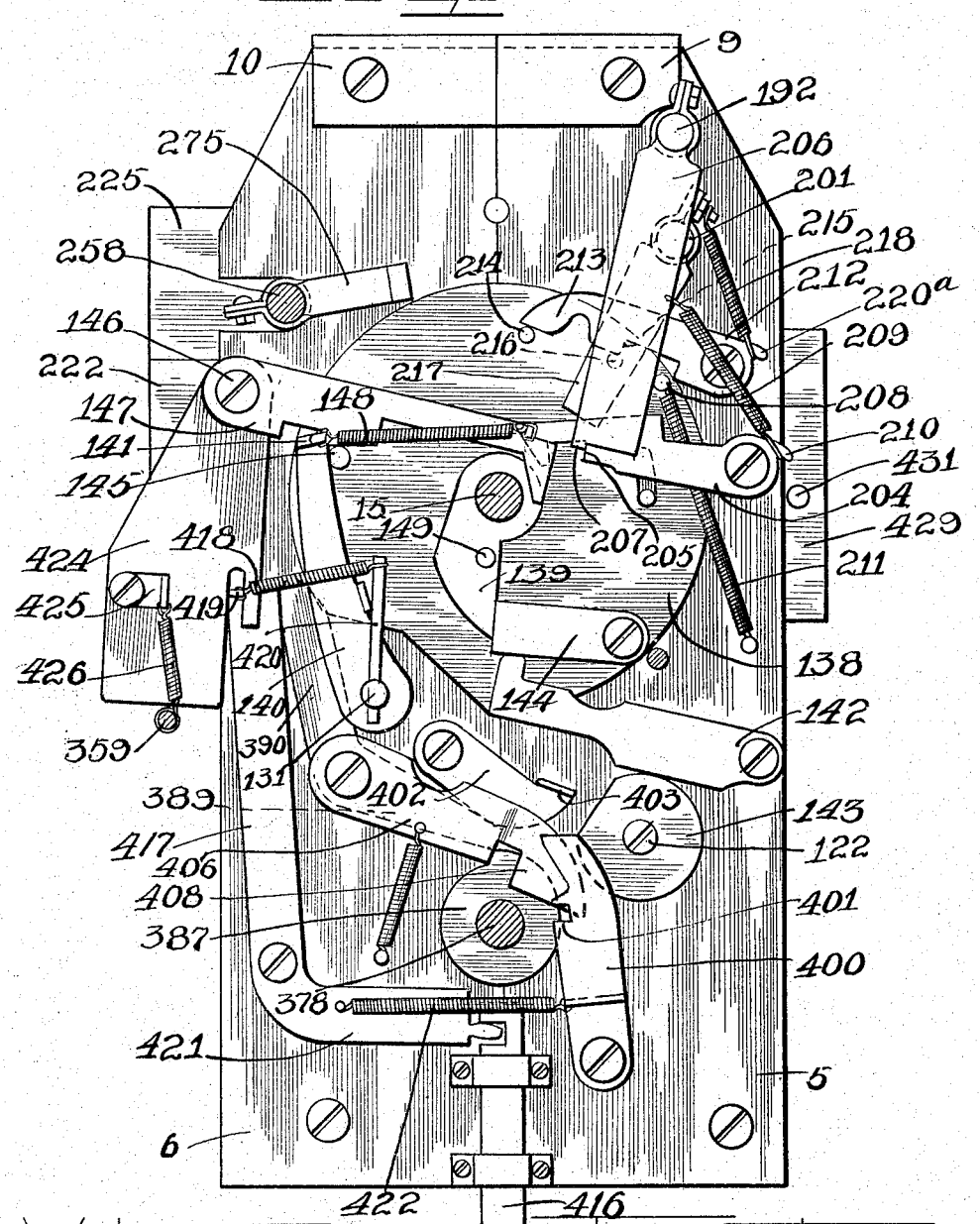

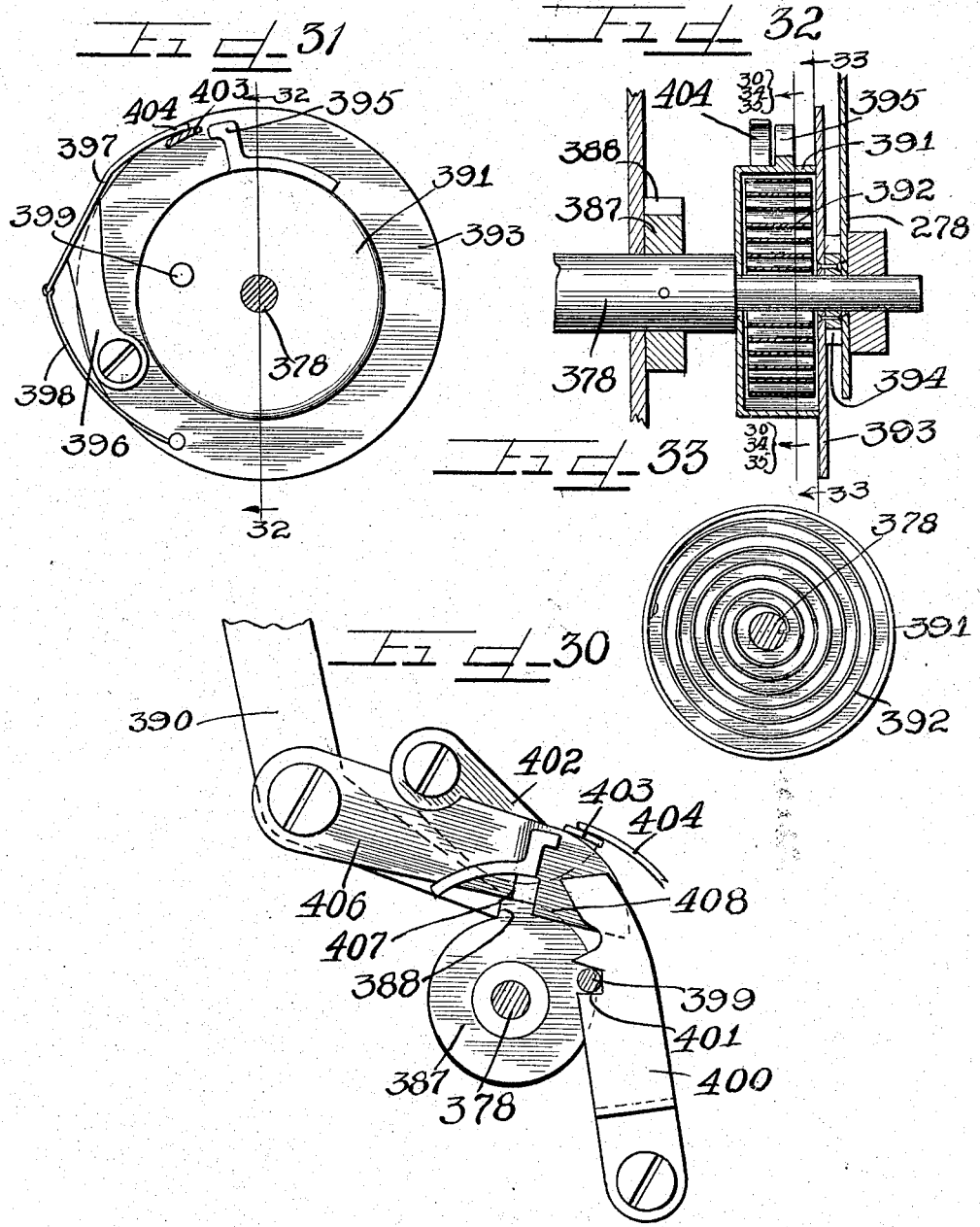

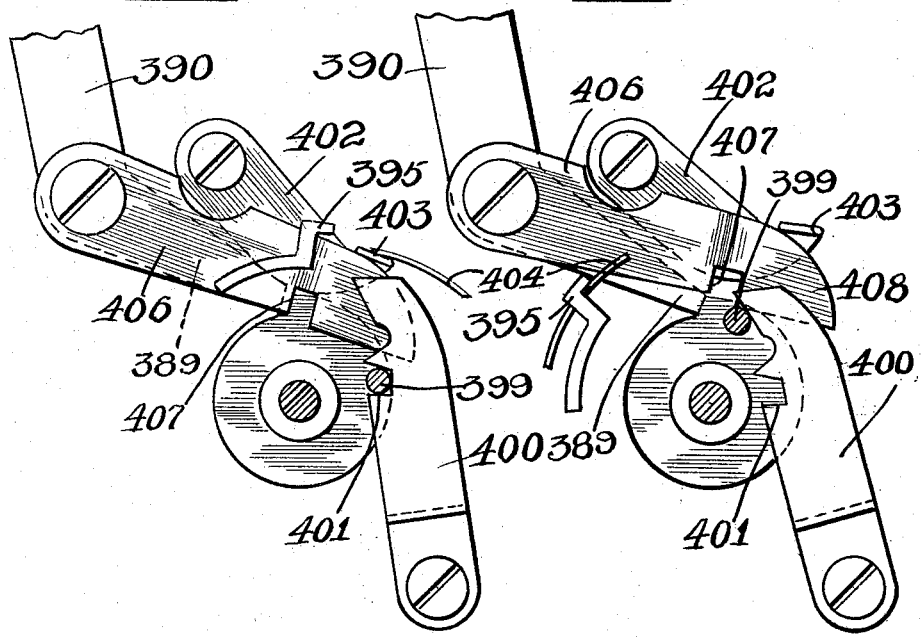

C. SULFER.
CASH REGISTER.
APPLICATION FILED JUNE 28, 1911.
1,196,898. Patented Sept. 5, 1916.
28 SHEETS—SHEET 18.
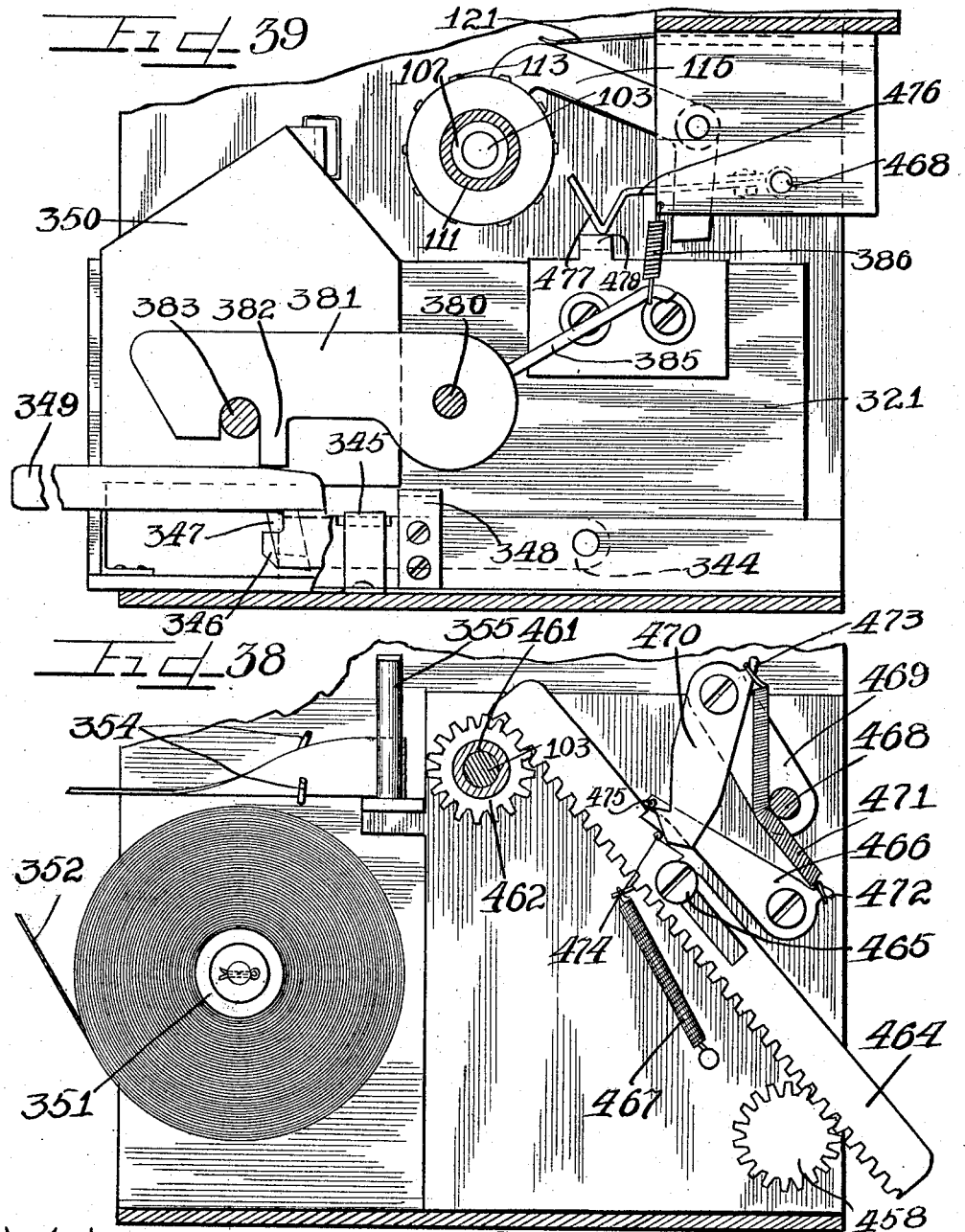

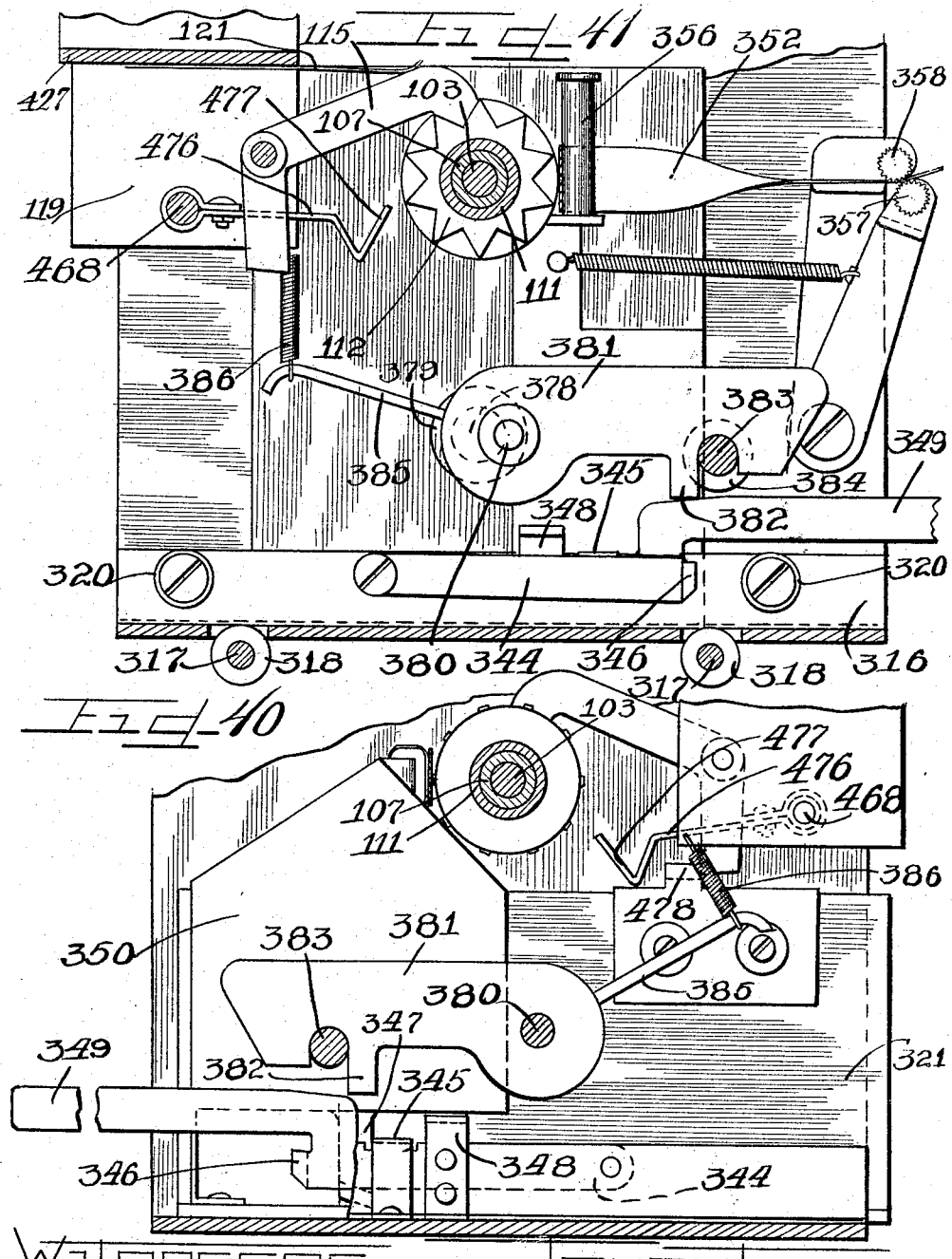

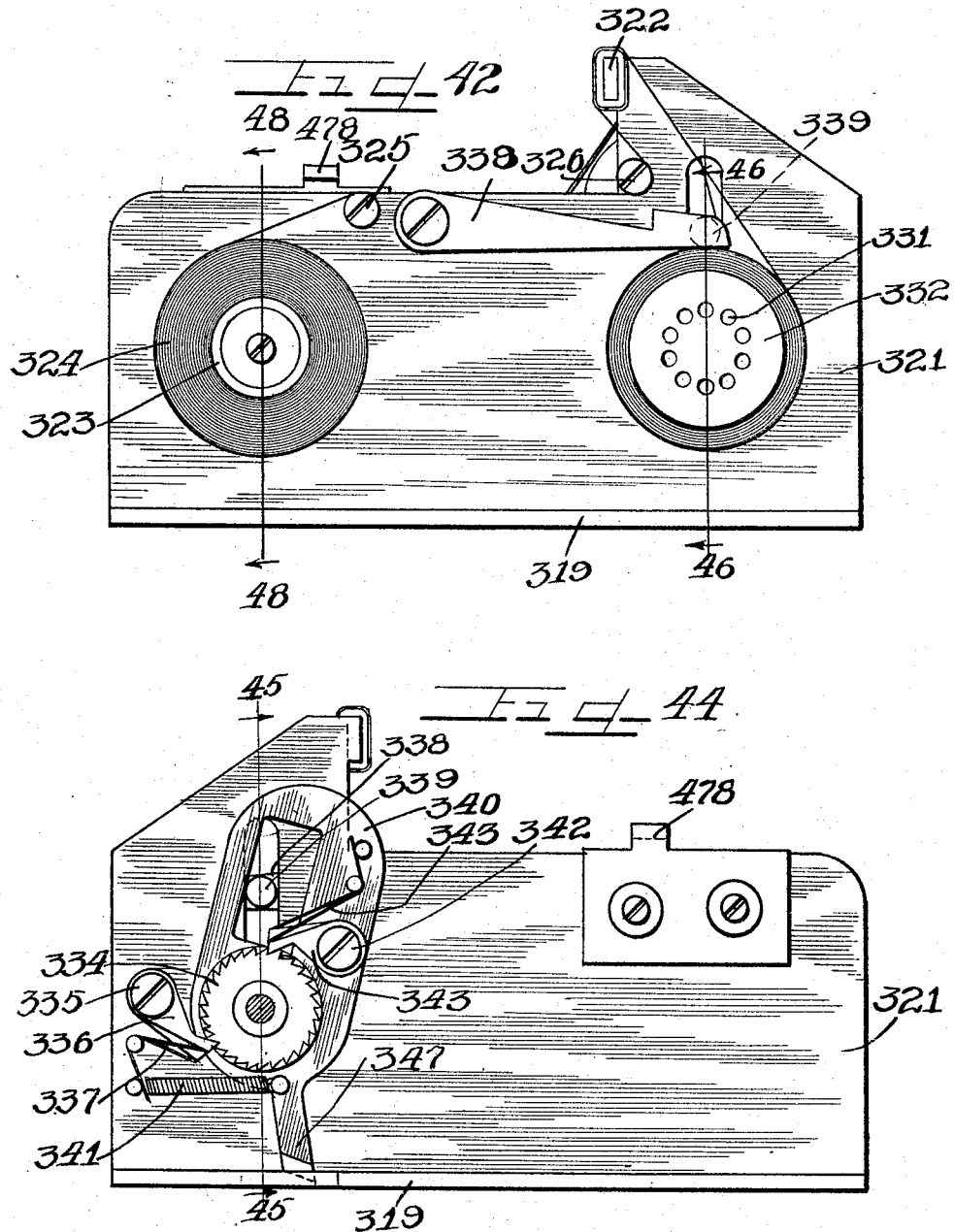

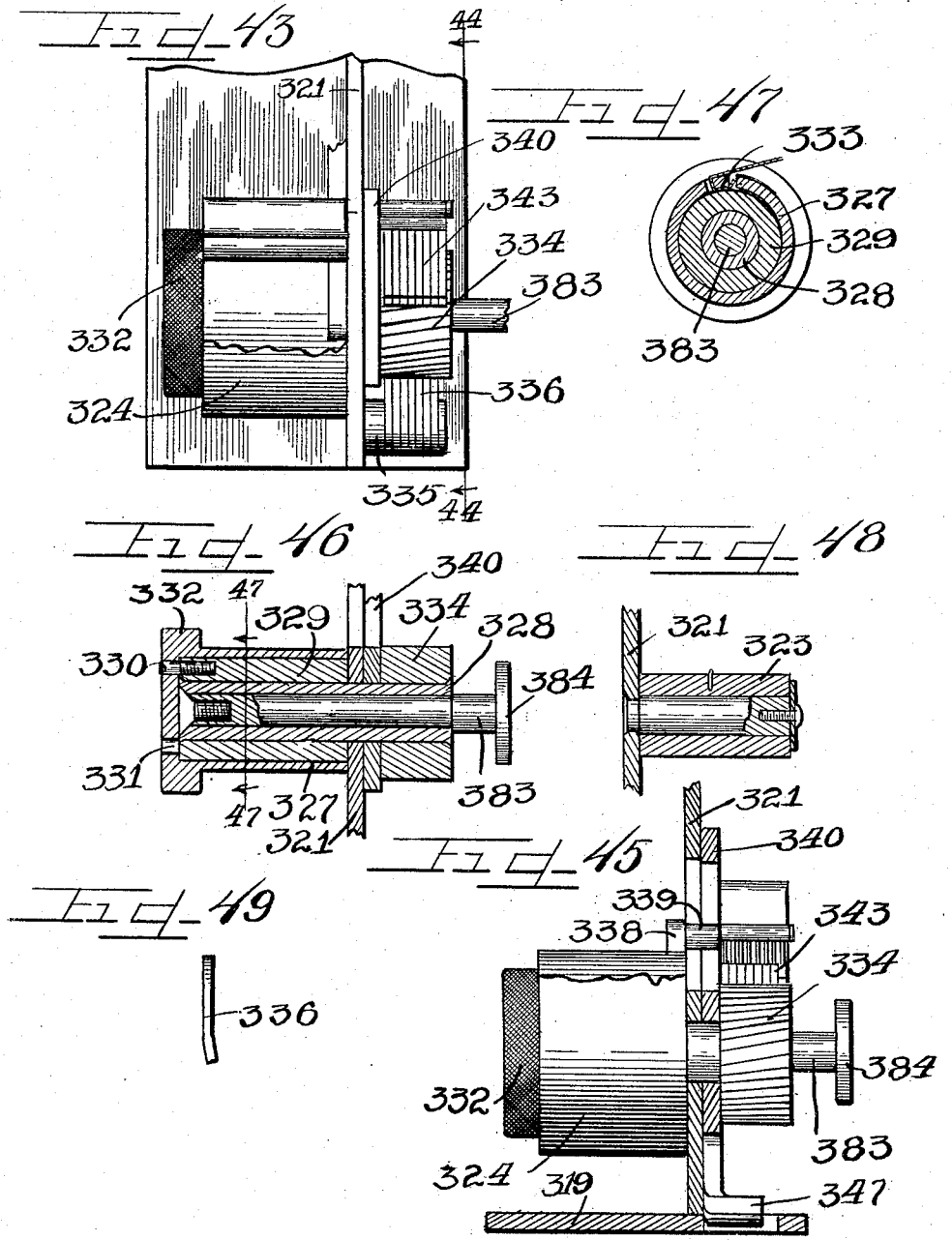

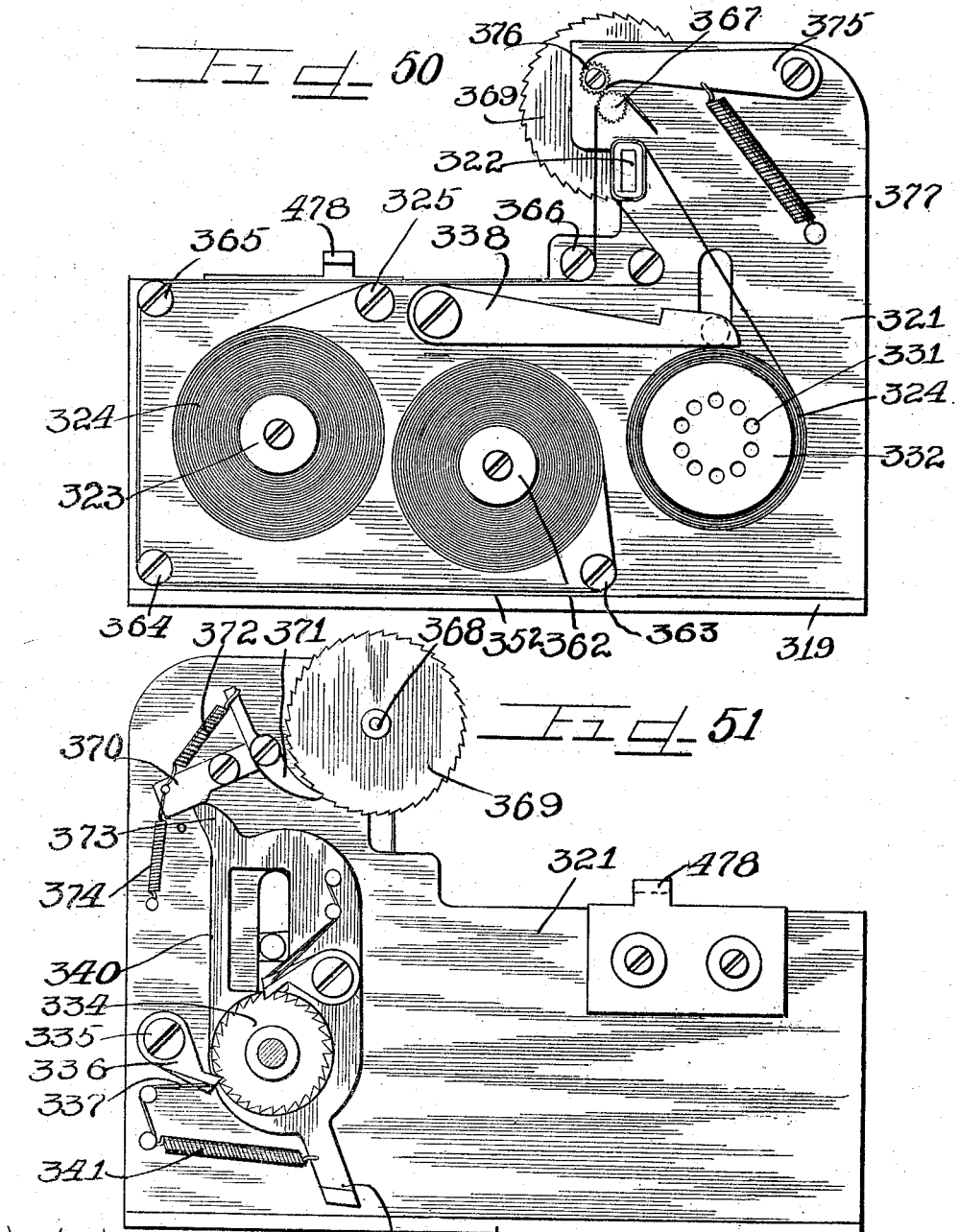

C. SULFER.
CASH REGISTER.
APPLICATION FILED JUNE 28, 1911.
1,196,898.
Patented Sept. 5, 1916.
28 SHEETS—SHEET 23.
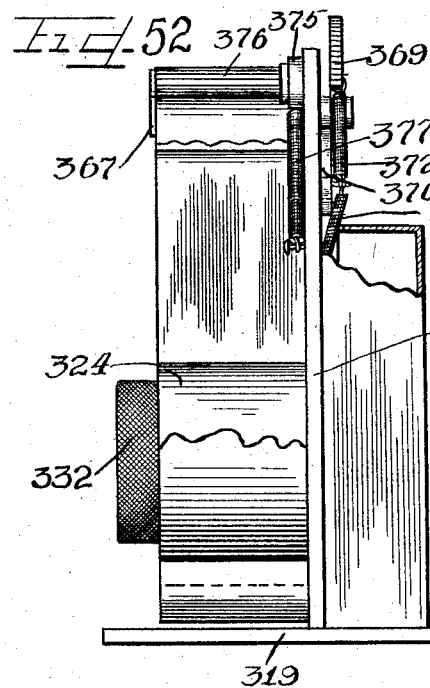
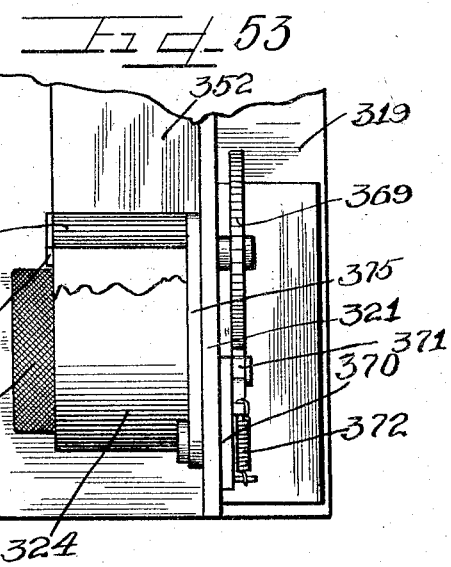
Fig. 54
| $2 | $1 | | $5 | $4 | $3 | $2 | $1 | | $5 | $4 | $3 |
|----|----|----|----|----|----|----|----|----|----|----|----|
| $5 | $4 | $3 | $2 | $1 | | $5 | $4 | $3 | $2 | $1 | |
Fig. 55
| 40 30 20 10 | | 90 80 70 60 50 40 30 20 10 | | 90 80 70 60 50 |
|---|---|---|---|---|
| 90 80 70 60 50 40 30 20 10 | | 90 80 70 60 50 40 30 20 10 | | |
Fig. 56
| 4 3 2 1 NO SALE | 9 8 7 6 5 4 3 2 1 NO SALE | 9 8 7 6 5 |
|---|---|---|
| 9 8 7 6 5 4 3 2 1 NO SALE | 9 8 7 6 5 4 3 2 1 NO SALE | |
Witnesses
J. W. Angell
Charles W. Hill Jr.
Inventor
Charles Sulfer
by Charles W. Niles
Atty.

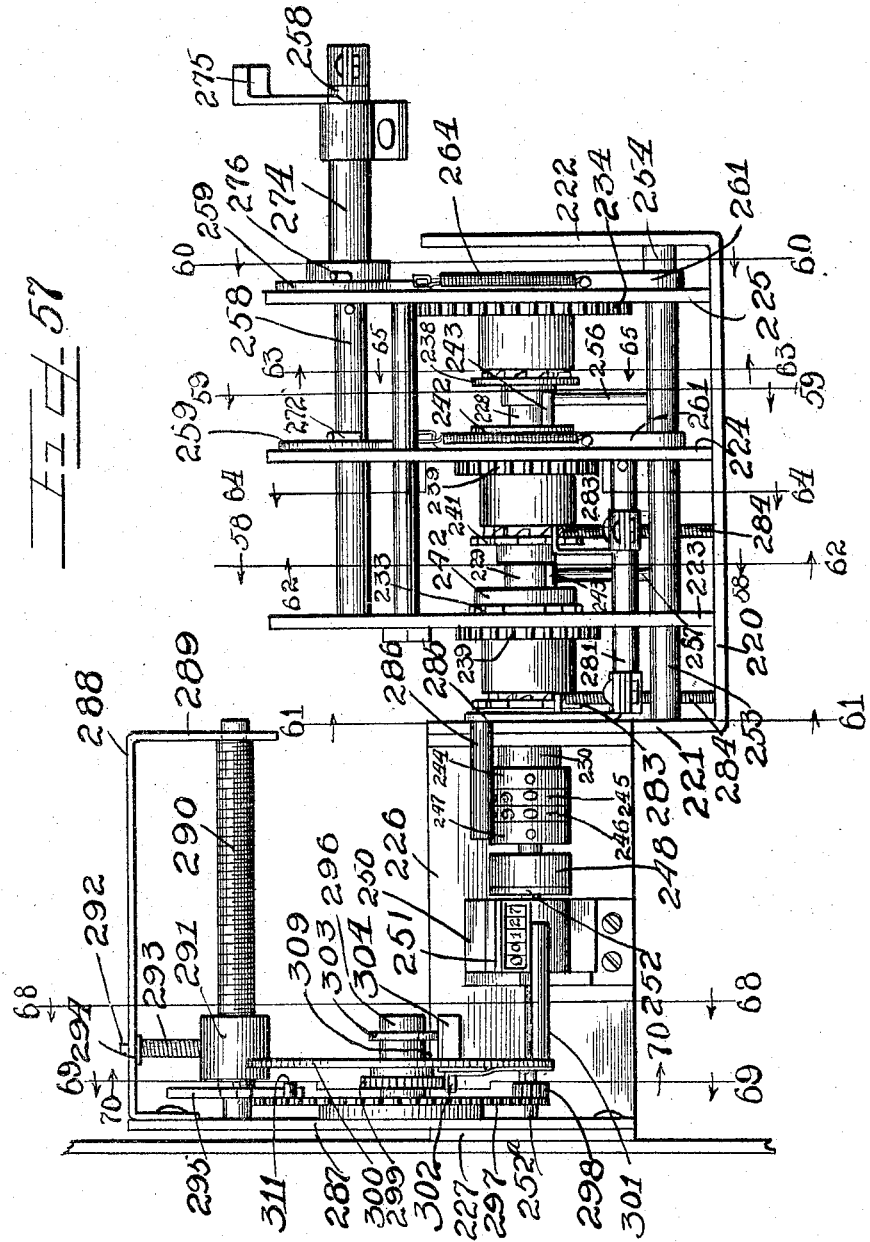

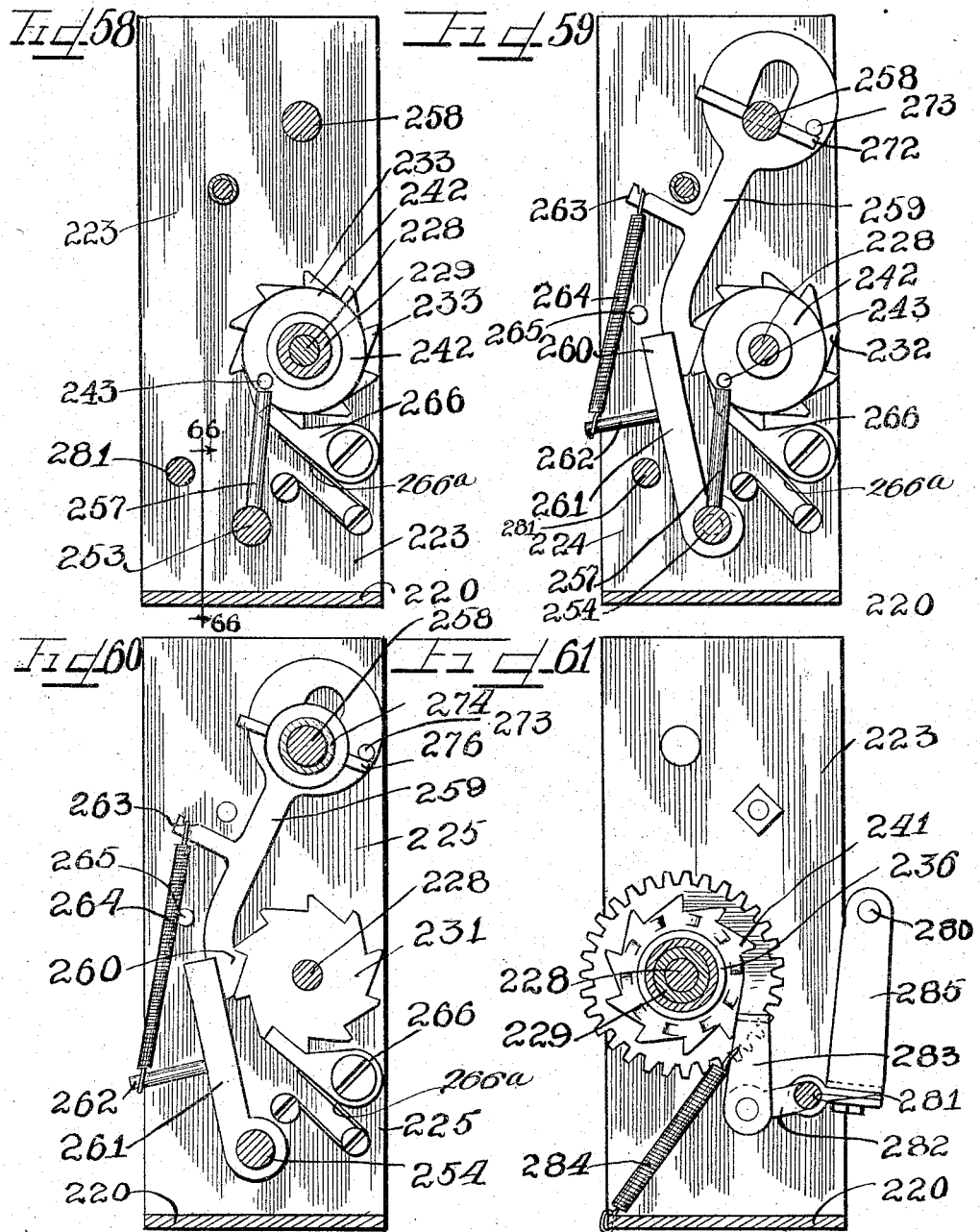

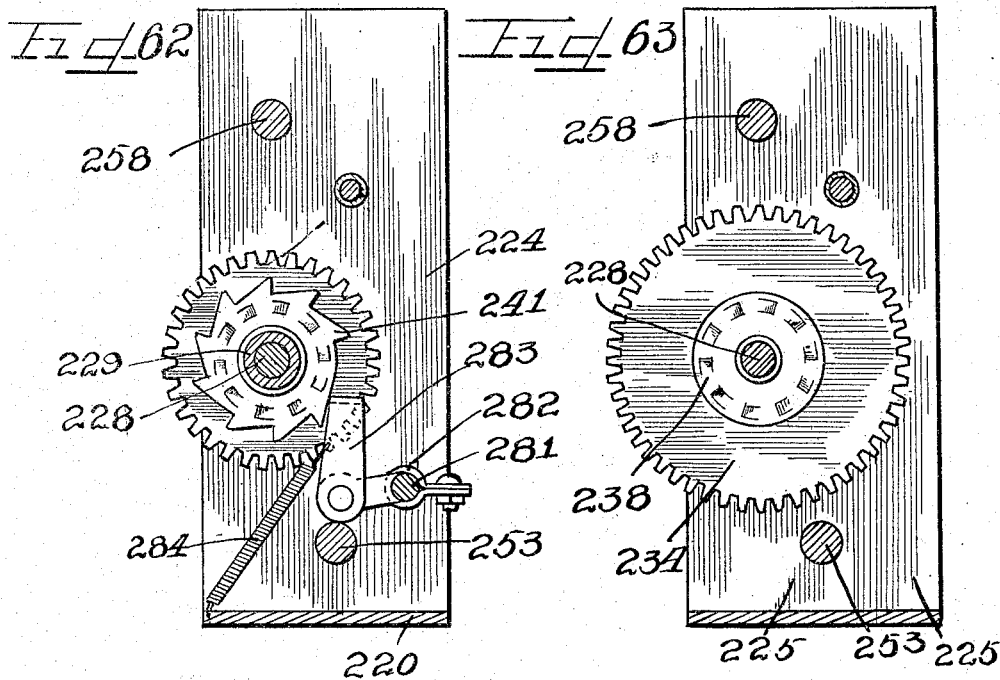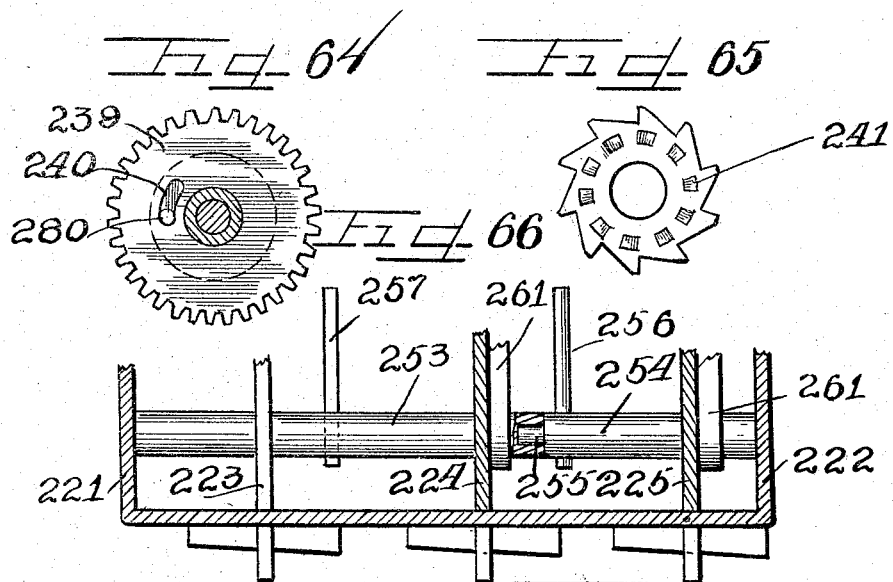

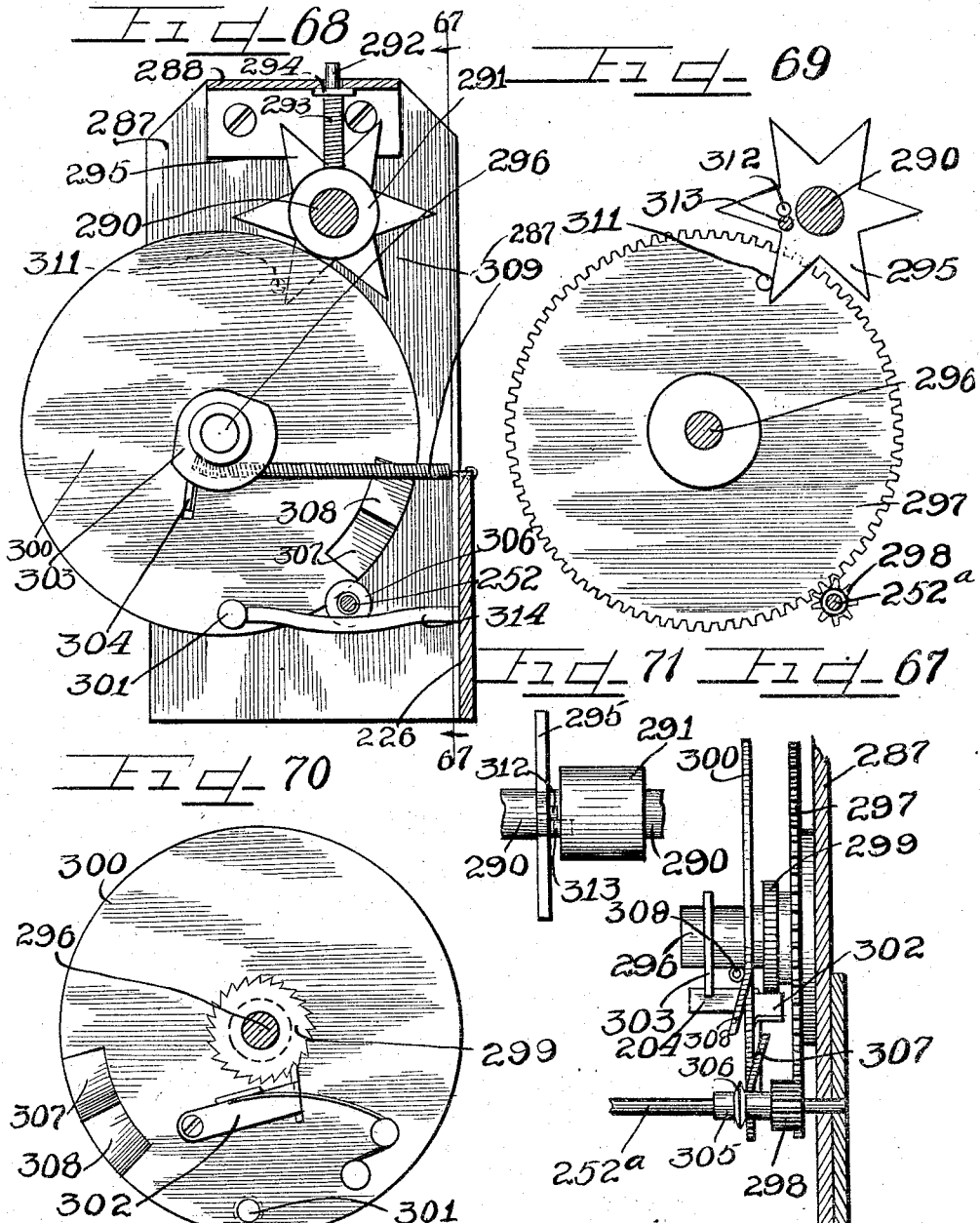

C. SULFER.
CASH REGISTER.
APPLICATION FILED JUNE 28, 1911.
1,196,898.
Patented Sept. 5, 1916.
28 SHEETS—SHEET 28.
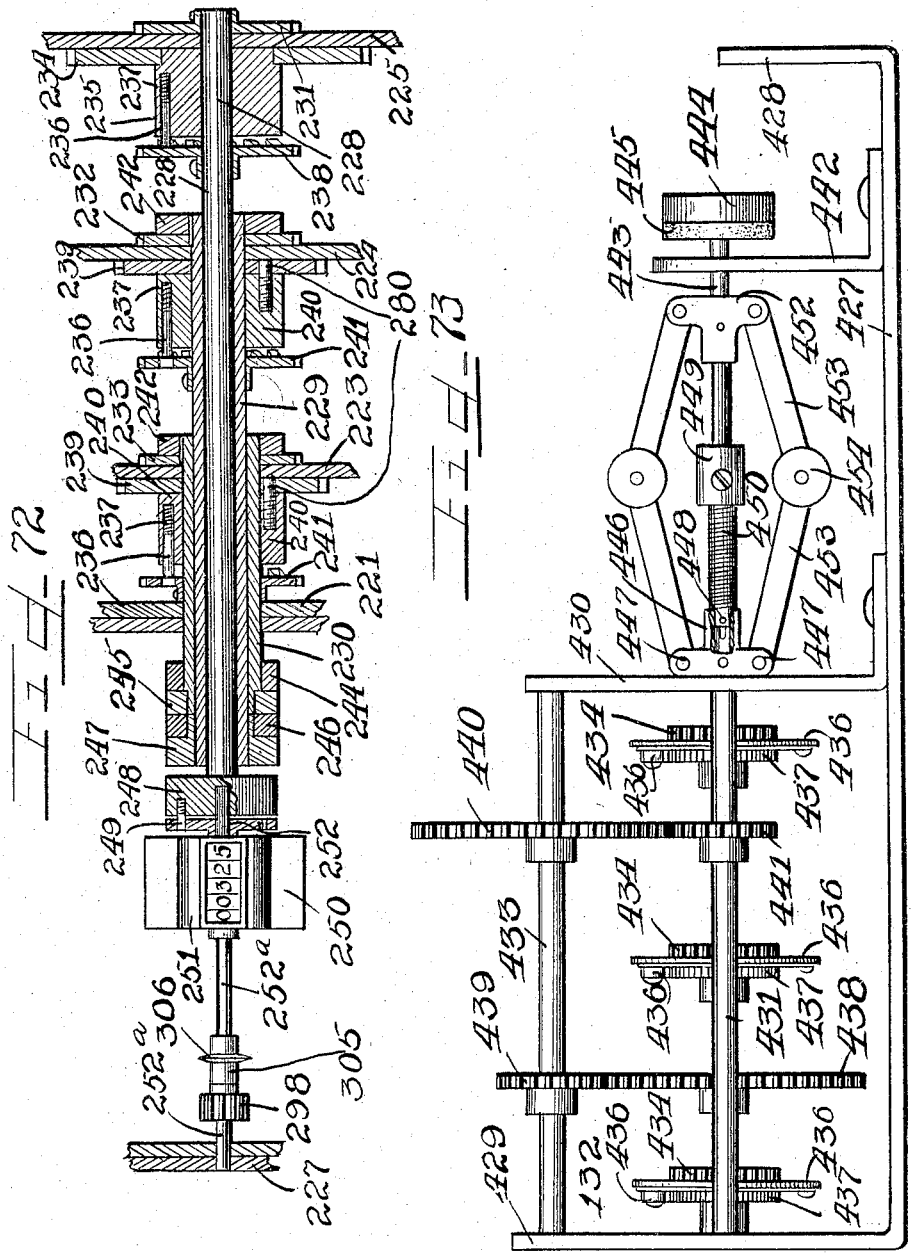

UNITED STATES PATENT OFFICE.

CHARLES SULFER, OF MILWAUKEE, WISCONSIN, ASSIGNOR TO DIAL CASH REGISTER COMPANY, OF MILWAUKEE, WISCONSIN, A CORPORATION OF ARIZONA.

CASH-REGISTER.

1,196,898.  Specification of Letters Patent.  Patented Sept. 5, 1916.

Application filed June 28, 1911. Serial No. 635,821.

*To all whom it may concern:*

Be it known that I, CHARLES SULFER, a citizen of the United States, and a resident of the city of Milwaukee, in the county of Milwaukee and State of Wisconsin, have invented certain new and useful Improvements in Cash-Registers; and I do hereby declare that the following is a full, clear, and exact description of the same, reference being had to the accompanying drawings, and to the numbers of reference marked thereon, which form a part of this specification.

This invention relates to that class of cash registers set forth in my prior application for patent for "Total adding cash registers", filed on the 29th day of December, 1906, Serial No. 350,057.

The object of this invention is to afford a cash register operated wholly by rotational movement, and in which revoluble elements are utilized for actuating the machine in registering and recording the amount of the transaction and in affording a visible indicator of the transaction.

It is also an object of the invention to afford a mechanism in which all the functions of the machine are effected rotationally and in which the various mechanisms are positively driven from the main rotational elements.

It is a further object of the invention to afford a mechanism in which main shafts are positively rotated by the clerk or operator through the medium of a dial-like keyboard, and in which rotational elements geared *en train* with said shafts, act to afford a visible signal of the amount of the transaction, to register the transaction, and to record or print the amount of the transaction together with the character of the transaction or the name or number of the clerk recording the same, or both.

It is an object of the invention further to afford in a machine of the class described rotationally operated registering, recording and indicating means, and rotatable dial keyboards for actuating the same, and to afford a construction in which the dials are firmly locked from movement until and after a key indicating a money amount, has been actuated, and in which the dial actuated is firmly held and locked from return movement, and the registering and recording mechanism held out of action until the dial is released by the actuation of an operating lever, so that movement of the dial, whether authorized or unauthorized, will result in affording the record and register before the mechanisms can return to normal.

It is also an object of the invention to afford in connection with a cash register, rotational mechanism for adjusting the machine to record with each transaction either the nature of the transaction or the number of the clerk, as preferred, or both.

A further object of the invention is to afford a four way indicator in connection with a device of the class described, by means of which the customer may at all times, and in whatsoever position, see displayed the amount of his transaction.

It is also an object of the invention to afford a total adding register in connection with a machine of the class described, said register accumulating in dollars and cents, the total of all transactions, and to afford mechanism for quickly setting back the registering mechanism to naught.

A further object of the invention is to afford in a device of the class described, a printing or recording mechanism in which the amount of all transactions are accurately printed and recorded on a suitable tape or strip and to provide a mechanical feed for the printing or record tape or strip, in which the rate of feed of the tape or ribbon is at all times the same independently of the variations in diameter of the roll upon which the tape winds.

It is an object of the invention also to afford in connection with a printing mechanism of such a machine, a carbon strip or ribbon and a feed therefor operating in conjunction with the recording mechanism, and in which the impression from the record strip is effected by impelling the record strip against the carbon strip, and the latter against the type thereby.

The invention further has for its object the elimination (so far as may be) of all reciprocating mechanisms from the construction of the cash register and to afford a continuous or intermittent rotation for the moving parts, positively timing all from the main rotative elements by means of intermeshing trains of gears, the use of which insures the various mechanisms synchronizing at all times to afford accurate and positive results.

Figure 2:
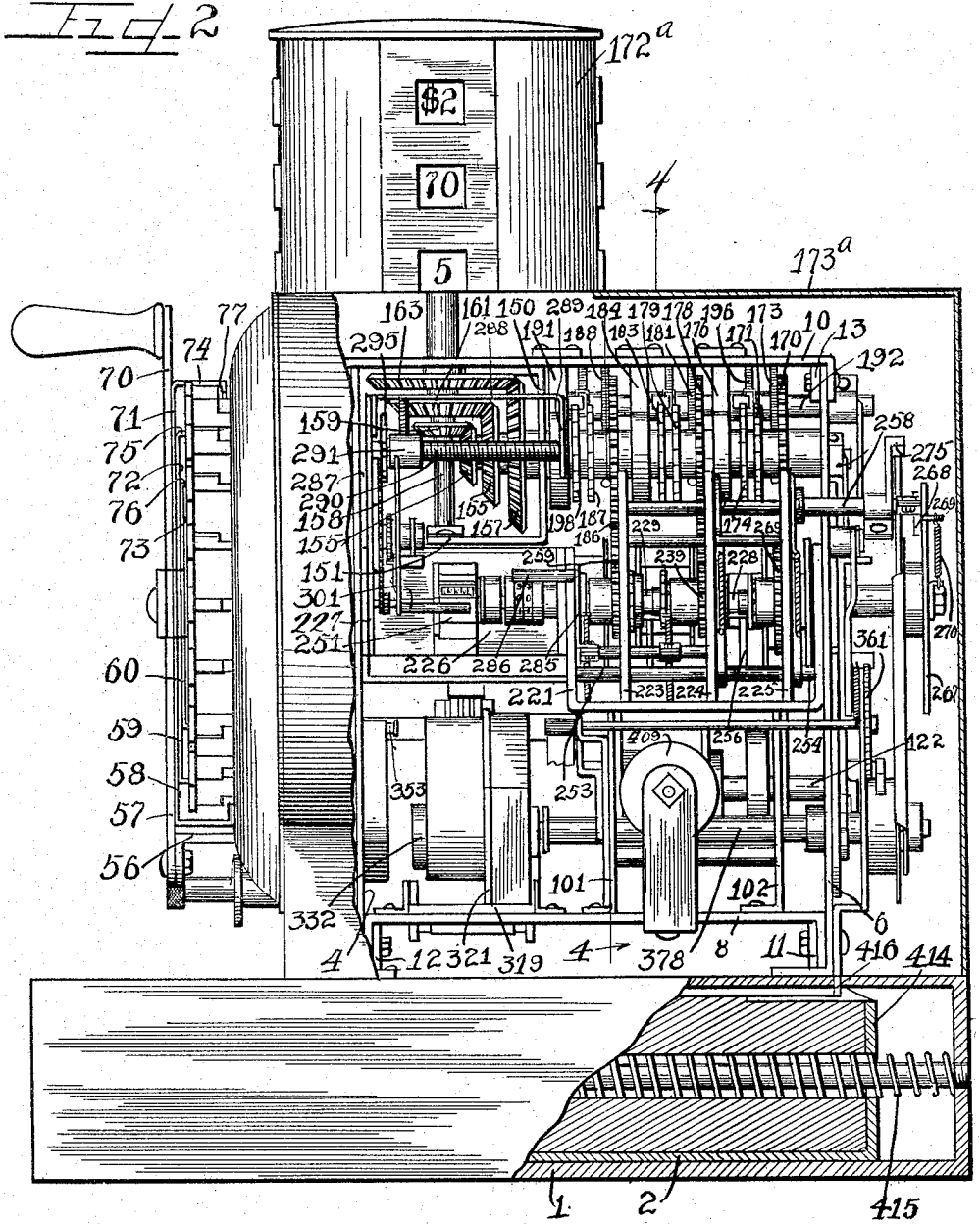

In the drawings: Figure 1 is a front elevation of a device embodying my invention. Fig. 2 is a side elevation with a part of the case broken away and with parts omitted. Fig. 3 is an enlarged rear end elevation with the case and base and indicator removed, and showing the parts in normal position. Fig. 4 is an enlarged section on line 4—4 of Fig. 2. Fig. 5 is an enlarged fragmentary vertical section with parts omitted, and showing more particularly the arrangement of the coaxial dial shafts and parts below the same. Fig. 6 is a section on line 6—6 of Fig. 5. Fig. 7 is a section on line 7—7 of Fig. 5, with parts omitted. Fig. 8 is an enlarged, fragmentary, detail section taken through the dial keyboards. Fig. 9 is a face view of the dollar dial, showing the same removed from the machine. Fig. 10 is a section on line 10—10 of Fig. 8, and of the dollar dial. Fig. 11 is a similar section taken on line 11—11 of Fig. 8. Fig. 12 is a similar section taken on line 12—12 of Fig. 8. Fig. 13 is an enlarged, fragmentary, sectional detail illustrating the construction and operation of one of the money keys. Fig. 14, is a similar section illustrating the construction and operation of one of the release keys. Figs. 15 and 16 are fragmentary sectional details showing the two positions for a part of the release mechanism for the keys. Figs. 17, 18 and 19 are further details of parts of the release mechanism. Fig. 20 is an enlarged fragmentary view in vertical section of the sight indicators, and the actuating mechanism therefor. Fig. 21 is a section on line 21—21 of Fig. 20. Fig. 22 is a section on line 22—22 of Fig. 20. Fig. 23 is a section on line 23—23 of Fig. 20. Fig. 24 is a fragmentary face view of the mechanisms illustrated in Figs. 21 and 22, and showing more particularly the stops for the indicators. Fig. 25 is a section on line 25—25 of Fig. 20. Fig. 26 is a section on line 26—26 of Fig. 21. Fig. 27 is an enlarged section taken on line 27—27 of Fig. 6. Fig. 28 is an enlarged section on line 28—28 of Fig. 6, and showing the parts in normal position. Fig. 29 is a similar section and illustrates the position of the parts at the limit of the forward rotational movement in recording just prior to the return movement of the dials. Fig. 30 is an enlarged fragmentary detail of a part of the re-wind mechanism for the main spring, and is a section taken on line 30—30 of Fig. 32, and shows the parts in normal position. Fig. 31 is an enlarged section on line 31—31 of Fig. 7. Fig. 32 is a section on line 32—32 of Fig. 31. Fig. 33 is a section on line 33—33 of Fig. 32. Figs. 34 and 35 are enlarged details of the parts represented in Fig. 30, showing different operative positions thereof, and are taken on lines 34—34 and 35—35 of Fig. 32. Fig. 36 is a section on line 36—36 of Fig. 7. Fig. 37 is a section on line 37—37 of Fig. 1. Figs. 38, 39, 40 and 41 are enlarged, fragmentary views in vertical section illustrating parts of the printing and related mechanism, and are taken on lines 38—38 to 41—41 inclusive on Fig. 7. Fig. 42 is an enlarged side elevation of the tape carriage for the printing recording mechanism, showing the same removed from the machine. Fig. 43 is a fragmentary top plan view of the mechanism shown in Fig. 42. Fig. 44 is a section taken on line 44—44 of Fig. 43. Fig. 45 is a section on line 45—45 of Fig. 44. Fig. 46 is a section on line 46—46 of Fig. 42. Fig. 47 is a section on line 47—47 of Fig. 46. Fig. 48 is a section on line 48—48 of Fig. 42. Fig. 49 is a fragmentary detail in elevation of one of the pawls. Fig. 50 is an enlarged detail illustrating a modified construction and in which the carbon ribbon or tape is carried on the carriage with the record tape or ribbon. Fig. 51 is a view in elevation of the opposite side of the carriage from that shown in Fig. 50. Figs. 52 and 53 are fragmentary end elevations thereof. Figs. 54, 55 and 56 are enlarged face views of the indicator strips for the respective dollar, dime and penny sight indicators. Fig. 57 is a view in elevation of the registering mechanism and the actuating means therefor, and also the set-back mechanisms, and with other parts of the mechanism omitted. Figs. 58, 59, 60, 61, 62, 63, 64, and 65 are enlarged sectional details, and are all taken on lines 58—58 to 65—65 inclusive on Fig. 57. Fig. 66 is a fragmentary section on line 66—66 of Fig. 58, with a part broken away. Fig. 67 is a fragmentary section taken on line 67—67 of Fig. 68. Figs. 68, 69 and 70 are enlarged detail sections of a part of the set-back mechanism and are taken on lines 68—68 to 70—70 inclusive of Fig. 57. Fig. 71 is an enlarged fragmentary face view illustrating the coaction of the stops on the set-back mechanisms for dollars. Fig. 72 is a fragmentary longitudinal section taken through the registering shafts, and showing the inner or accumulating shaft in elevation. Fig. 73 is a view in enlarged side elevation of the governor, showing the same removed from the machine.

As shown in the drawings, the machine is mounted upon a base comprising a casing 1, of any suitable kind (preferably metallic) and in which is the money drawer 2. Secured upon this base is the frame of the machine comprising front plates 3 and 4, and rear plates 5 and 6. The two plates affording the front end plates, as likewise those affording the rear end frame plates, are matched together edge to edge for their entire length at the middle and lie in the same plane and are rigidly secured together by means of the two piece bottom plates 7 and 8, and the two piece top plates 9 and 10, the former of which are flanged downwardly to fit against the inner faces of the end frame plates, and the latter of which are flanged over the end frame plates, and the two half frames thus formed are rigidly secured together by means of transverse bottom bars 11 and 12, which engage on the inner sides of the flanges of the bottom plate, and corresponding bars 13 and 14, are secured transversely the frame, the former on the inner side the rear end frame plate for the entire width of the frame, and the other on the forward or outer side, or, in other words, on the downturned flanges of the top plates, as shown in Fig. 2, and are rigidly bolted in place through the end frame members and top and bottom plates respectively, as the case may be, thus affording an exceedingly rigid upright frame. Such vertical division of the frame in two halves or sections, is made possible by the removal of the transverse bars or plates 11 and 12, 13 and 14, and also such other transverse members as may be secured across the frame to any two of said plates as hereinafter described, and greatly facilitates and simplifies the construction and assembling. Journaled horizontally and near the center of said frame, is a nest of co-axial shafts, comprising a central crank shaft 15, a tubular dollar shaft 16, fitting closely thereon, a tubular dime shaft 17, fitting closely on the dollar shaft, and a tubular penny shaft 18, fitting snugly on the dime shaft, and each of which is rotatable either simultaneously with, or independently of any or all of the other of said shafts. Said co-axially alined shafts are inserted through the front end frame plates and rear end frame plates, as shown in Figs. 5 and 6, and a roller bearing is provided for the forward end of said nest of shafts comprising two bearing rings 19 and 20, of a size to fit over the outer or penny shaft 18, and having rollers 21, journaled therebetween, which fit snugly against the periphery of the shaft 18, to afford an anti-friction bearing therefor. Said nested shafts 16, 17 and 18, are provided on their forward or outer ends with integral or otherwise rigidly fixed and secured flat collars or face plates, of which the collar or face plates on the shaft 16, is indicated by 22, on the dime shaft by 23, and on the penny shaft by 24. Said face plates or collars from the center outwardly, are of successively greater diameter, as shown in Fig. 8, and afford means for attaching the individual dial keyboards to the respective shafts for the actuation of the same.

In currency of three denominations, as, for example, pennies, dimes and dollars, in which, of course, but three coin shafts are required, but three actuating dials therefor are necessary. Of course, the number of such dials and coin shafts will vary with the number of denominations of coin. The dials, one appropriated for each coin denomination, are nested, the higher denomination within the lower, as shown in Figs. 1 and 8, each dial being rigidly secured to the collar or face plate, on the corresponding shaft, and of such dimensions that all the faces of said dials lie in the same plane, as shown in Fig. 8.

Inasmuch as the construction of each dial is identically the same as the construction of each other dial, the dollar or inner dial may be taken as typical of the construction, these dials varying only in size of parts and in the fact that in the particular dollar dial shown, but five keys for significant digits or numerals are used, whereas in the other dials nine are employed. All the dials are constructed of pressed or stamped metal and referring to Figs. 8 to 19 inclusive, it will be seen that each dial comprises first, a central web or hub 25, having integral arms struck up therefrom and arranged equal distances from the centers. Alternate arms 26, are of a length to afford attachment for the outer or face plate 27, which is a flat ring finished suitably for ornamental purposes either by plating or otherwise. Said face plate is secured on said arms in any suitable manner by riveting, by means of screws, or by spot welding to afford a rigid construction. Intermediate arms 28, are relatively short and the ends thereof are turned outwardly beneath an inner dial frame ring 29, and riveted thereto, holding the same rigidly in parallel relation with the outer or face ring 27. Secured on the face plate 22, on the dollar shaft and affording attachment of said spider therewith, is an annular plate or ring 30, of the same diameter as the face ring 27, and the inner dial frame ring 29. Said ring is spaced from the inner frame ring by the shorter arms of the spider.

Extending through the face ring 27, and inner frame ring 29, are registering apertures, shown as rectangular, and having their greater dimension radially of the ring, and seated and firmly engaged between said two rings and registering in said apertures are sheet or pressed metal tubes 31, corresponding in their interior cross section with said apertures and affording guides for the stems 32, of the keys. Each of said tubular guides is provided on each side thereof with a longitudinal slot, as shown in Figs. 13 and 14, and the key stems 32, extending therethrough and slidable therein, are each provided with a transverse arm 33, extending through the stem of the key and outwardly through the slot, and provided with an aperture at its outer end to receive therethrough a pin or rod 34, which extends upwardly through the inner frame plate 29, and is rigidly secured on the back plate or ring 30. A spring shown as a coil pushing spring 35, is engaged around said pin or rod 34, and bears at one end on said back plate 30, and on the other pressed upwardly on said arm 33, and acts normally to hold said keys elevated or outwardly. Means are provided for holding said key in registering position when pressed inwardly preparatory to actuating the machine. For this purpose all the keys on all the dials appropriated to significant figures, are provided with a detent at their inner extremity adapted to engage the same firmly at the inner adjusted position of the key. For this purpose, an integral extension 36, is provided on the rear side of each key stem, as shown in Fig. 13, which, at a point sufficiently below the end of the stem to allow for the proper travel of the key inwardly, is bent abruptly forwardly to afford a shoulder or detent 37, which extends to the opposite side of the tube or chute 31. At this point the extremity of said extension inclines inwardly and rearwardly to afford an inclined member or cam 38.

An automatically adjustable locking ring 39, is positioned between the inner frame plate 29, and back plate 30, and is provided with slots therein having their greatest dimension concentric with the center of the dials and adapted to receive therethrough the posts 34, and springs 35, thereon, and are provided with angular apertures to receive therethrough the detents 37, at the extremity of each key for the significant digits. Said plate is normally held as hereinafter described, with the apertures therein partly out of register with the tubes or chutes 31, for the respective key stems, but in position for the inclined or cam end 38, on each stem, to engage therein to force said locking ring forwardly sufficiently to permit the entry of the detent therethrough whereby the locking rings immediately engage the detent of the depressed key to hold the same inwardly. As shown, a lever 41, is pivotally engaged on the rear side of said locking ring, and a spring 40, is engaged at one end thereon and at the other engaged on one of the spider arms 28, and acts to hold said locking ring in its normal or retracted position. A rearwardly directed finger 42, is provided on said lever 41.

Extending partway around the channel afforded between the rear frame ring and the back ring or plate, is a mutilated ring 43. This, at its extremity adjacent the tail 42, of the lever 41, is bent outwardly and projects through a broad notch in the locking ring 39, and in the back frame ring affording an outwardly directed tail 44, which extends to a point intermediate the face ring and inner frame ring of the dial. The opposite end of said mutilated ring is connected by means of a pulling spring 45, with one of the spider arms and acts to hold said mutilated ring which I have called a "tripping ring" at all times rearwardly. This also is provided with apertures to register with the apertures in the locking ring, so that when the key stem is pressed inwardly, the shoulder or detent on the stem extends through and engages on the inner side of the tripping ring, bringing the apertures in said ring into register.

Extending through the dial back frame ring 29, and face ring 27, is a rotatable post 46, which, at its inner end is provided with an arm 47, which extends rearwardly sufficiently to engage the tail 42, of the lever 41, to lift the same. The locking ring is thereby released when said post is rotated. An outwardly directed radial arm or pin 48, is secured in said post or shaft, as shown in Figs. 9 and 15. Slidably engaged in said dial frame also is a locking pin or bolt 49, which is normally held extended for its end to protrude beyond the face plate by means of a spiral pushing spring 50, engaged on said bolt, and bearing oppositely against the rear dial frame ring 29, and on a pin 51, set in said bolt, as shown in Fig. 15. A stop pin 52, is provided on the face plate, as shown in Fig. 9, to limit the forward swing of the arm 48, as hereinafter more fully described when the dial returns to normal after each actuation.

Pivotally engaged on any suitable support on one of the spiders, is a trip lever 53, one end of which is pivotally engaged on the bolt 49, and the other end of which extends outwardly toward the face ring in position to be engaged by the tail 44, of the tripping ring 43, when the same is swung forwardly, so that forward movement of said tripping ring, when actuated by any of the keys for that dial, acts to retract the bolt, permitting the arm 48, to swing thereover, as shown in Fig. 16, to locked position. When in such locked position, the arm 47, on the rotatable post 46, is swung inwardly, as shown in Fig. 17, and a shoulder 54, on said arm positively engages a corresponding shoulder 55, on the lever 41, and positively holds the locking ring from movement in either direction with the apertures therein out of register with the stems of the keys, thus preventing any key being pressed inwardly until the dial has been actuated to release position.

Means are provided for actuating the dials selectively and dependent upon the key actuated. For this purpose, the keys for the significant units of the various denominations to be registered, are arranged on each dial uniform distances apart beginning with a "no sale" key at the lower position for the penny dial and successively counting by one to nine at a point at the top of the dial. The second or dime dial is similarly arranged to count by dimes, the key for one dime corresponding in position with the key for one penny on the penny dial. Keys on the dollar dial are similarly arranged to count from one to the desired number, in the present instance shown as five, though, of course, a larger number of keys may be provided on this dial also, if desired.

Extending outwardly from the front frame plates of the machine is a bracket 56, and secured thereon and extending upwardly, is a bar 57, rigidly secured in any suitable manner on the inner side of which are bars 58, 59 and 60. These bars are provided at their lower ends with inwardly directed arms 61, 62 and 63, each of which is provided on its inner end and closely adjacent the respective dial face plates, with an upwardly directed flange 64, 65 and 66, respectively, each affording a detent to engage on its rear side a stop pin 67, extending through the dial frame corresponding therewith to limit the return of the dials to normal, each of said flanges being adapted to be engaged on its opposite side by the bolt 49, of the corresponding dial. As shown, said detents are inclined downwardly on their rear sides so that as the dial returns to normal, the arm 48, engaging thereon is swung out of engagement with the bolt to permit the bolt to be thrown outwardly by its spring after passing the detent wall. In the preliminary movement of the dial in counting, said arm 48, under the influence of the spring impelling the same falls over said detent and is engaged over the end of the bolt to hold the same inwardly until the return to normal, thereby preventing the actuation of any key on the same dial until the count has been effected.

A release key X, is provided for each dial. These, as shown in Fig. 14, are in all respects, similar to the keys for the significant units before described, with the exception that the detent is omitted from the inner end of the stem and instead thereof, the stems 68, are provided with inclined faces 69, at their inner end, which, when projected through the corresponding apertures in the locking ring, 39 act to shift said ring sufficiently to release any key on that dial previously actuated.

The bars 58 and 59, at their upper ends, are apertured to receive and afford a bearing for the crank shaft 15, and the operating crank 70, is rigidly secured on said shaft in alinement with said bars. For this purpose, as shown, the outer plate or bar 70, forming the crank arm, has secured thereon a succession of bars 71, 72 and 73, each at its extremity being bent inwardly toward the dial to afford an arm 74, 75, and 76, extending in close relation with the face plate and at the inner extremity bent radially inward toward the shaft to afford fingers 77, 78 and 79, which normally, as the crank is operated, pass through notches in said key stems 32 without contacting the stems, as shown in Fig. 8, but engage the stem to actuate the dial thereby when that key is pressed inwardly.

As shown, a sleeve 80, is rigidly secured on the crank shaft 15, and the crank arm is engaged to said sleeve by means of a pin 81, or any other suitable means for firmly connecting the crank with the shaft to thereby rotate the same. Each dial is provided with a rigid stop pin 82, 83 and 84, as shown in Fig. 1, to limit the rearward throw of the crank to its normal position while said upright bar 57, secured on the bracket 56, limits the forward and downward swing of the crank to the normal release position, after each actuation of the dials and register.

The dollar shaft 16, is of a length to extend inwardly to the back frame plates, as shown in Fig. 5, and rigidly secured on the end thereof is a collar 85, on which is rigidly secured a ratchet wheel 86, the teeth of which are directed forwardly. Rigidly secured on the shaft in advance of the collar 85, and ratchet wheel 86, is a ratchet wheel 87, the teeth of which are directed rearwardly or oppositely from those on the ratchet wheel 86. Rigidly secured on the rear side of the ratchet wheel 87, is a filling ring or spacing plate 88, against which and at the rear thereof is secured a gear wheel 89, for actuating the dollar shaft of the register, and a larger gear wheel 90, which actuates a governor and also actuates the sight indicator as hereinafter described. Said ratchet wheel 87, and gear wheels 89 and 90, are all rigidly secured together and likewise rigidly secured upon the shaft. In a similar manner, a collar 91, and ratchet wheel 92, are rigidly secured upon the dime shaft corresponding with the collar and ratchet wheel 85 and 86, on the dollar shaft, and also rigidly secured upon said shaft is a rearwardly facing ratchet wheel 93, a filling ring 94, at the rear thereof, and a gear wheel 95, corresponding with the gear wheel 90, on the dollar shaft, and which, in this instance, actuates the registering mechanism for dimes, the governor, and also actuates the sight indicator for dimes. In a similar manner, a collar 96, is secured on the inner end of the penny shaft, on which is secured a forwardly facing ratchet wheel 97. Rigidly secured on the shaft also, is a rearwardly facing ratchet wheel 98, a filling ring 99, and a gear wheel 100, which actuates the register for pennies, the governor, and also the sight indicator for pennies. Said gear wheels 90, 95 and 100, also actuate the printing shafts and thence actuate a shaft to wind up a main spring whereby the parts are returned to normal. Journaled upon the front and rear frame plates and also on intermediate frame plates 101 and 102, is a shaft 103, which is the dollar printing shaft. Secured on said shaft is a gear wheel 104, which meshes with the gear wheel 90, on the dollar dial shaft, as shown in Fig. 5. Secured on said shaft also intermediate the front frame plates and the intermediate frame plate 101, is a star detent wheel 105, and a wheel 106, marked on its periphery with numerals to correspond with the keys on the dollar dial and similarly arranged so that the numeral corresponding with the key actuated is presented in printing position at the moment of release of the dial after its full normal travel in registering. Rotatably engaged on said shaft and coaxial therewith, is a dime shaft 107, having secured on its forward extremity and bearing against the printing wheel for the dollar shaft, a star detent 108, and a dime printing wheel 109. Said dime shaft has also secured thereon a gear wheel 110, meshing with the gear wheel 95, on the dime and dial shaft before described. In a similar manner, a tubular penny shaft 111, is secured on the dime shaft and is likewise provided with a detent 112, and a penny printing wheel 113. This shaft is driven by means of a gear 114, meshing with the gear 100, on the penny shaft. Each of these printing shafts is positively driven, the extent of rotation thereof obviously depending upon the extent of rotation of the corresponding dial shaft, though in the opposite direction, and in consequence, the dollar and penny printing wheels always rotate to correspond exactly with the actuation of the dials and consequently the numerals on said wheels presented in printing position always correspond with the numerals on the keys actuated on the dials and which, of course, correspond with the amount to be registered.

The star wheels interposed between the printing wheels, (one of which is clearly shown in Fig. 41), of course, are provided with points or throws to correspond with the number of significant digits on the periphery to exactly position the printing wheels in position for printing. As shown in Fig. 7, each of said star wheels is provided with a detent 115, 116 and 117, which are pivotally secured upon a stud 118, secured on a depending bracket 119, as shown in Fig. 5, and which is secured on the under side of the base frame plate 427, for the governor. A leaf spring 121, is secured on said base frame plate and bears on all of said detents to hold the same in operative position. The printing mechanism as a whole will be hereinafter more fully described.

Journaled in the rear frame plate and in the intermediate frame plate 102 and 101, is a main spring shaft 122. Secured at its inner end on said shaft in any convenient manner, is a coiled main spring 123, the outer end of which is secured to a horizontal post 124, set in the intermediate frame plate 102, as shown in Fig. 36. As shown, gear wheels 125, 126 and 127 are loosely secured on said shaft, and mesh with the gear wheels 104, 110 and 114 respectively of the dollar, dime and penny printing shafts, and are driven thereby when said shafts are rotated. Rearwardly secured on the shaft 122, on the outer side of the gear wheel 125, is a collar 128, having a pin 129, set therein, which engages in a groove in the gear wheel 125, which is identical with the groove 130, shown in Fig. 4, in the gear wheel 127, on said shaft. Said pin is normally held at the rear end of the groove by the tension of the spring 123, on said shaft, so that when the gear is rotated, the spring is wound up thereby, said engagement of the pin in said groove serving as a clutch. The gear 126, and the gear 127, are similarly grooved and engaged on the shaft by means of a corresponding pin 129, engaged in a suitable collar 128, and projecting into said groove. When the shaft is rotated by the action of any one of said gears, the rotation of the shaft serves to carry the pin forwardly in the groove in the other gears, permitting said other gears to remain at rest. The return rotation of the main spring shaft 122, under the influence of its spring, acts to return the printing shaft and the dial shafts and all other mechanisms to normal except the sight indicators, when the handle on the operating lever is released, and a governor hereinafter described, of course, controls such return.

Means are provided for limiting the rotation of the dials forwardly to release and to prevent the return to normal of any dial after movement thereof less than that required to full release position, and also after such release, to prevent any other movement of the dial except the return to normal, thereby necessitating the full normal movement of the dial in one direction to register and preventing any movement of any dial toward registering position until the dials have all returned to normal position after previous registering movement. For this purpose, a shaft 131, is journaled on the intermediate frame plates 101 and 102, secured on which are pawls 132, 133, and 134, which are adapted to engage the rearwardly facing ratchet wheels 87, 93 and 98 respectively, and on the respective dial shafts to hold said shafts and the dials therefor, from turning rearwardly after the forward movement for registering has begun. Also secured on said shaft 131, are corresponding pawls 135, 136 and 137, which extend upwardly and beneath the dial shafts to engage respectively the ratchet wheels 86, 92 and 97, as shown in Figs. 4, 5, 6 and 7. Said pawls 135, 136 and 137, engage the forwardly facing teeth of the said ratchet wheels and act to hold said shafts and their dials from forward movement after the return movement has begun at release position. Said pawls are so arranged on their shafts as to afford sufficient clearance for one set of pawls when the other is in position to engage, and mechanism is provided for shifting the pawls 132, 133, and 134 into engagement with the corresponding ratchet wheels therefor when the dials return to normal, and for shifting the pawls 135, 136 and 137 into engagement with their ratchet wheels at the moment the dials are rotated to release position. For this purpose, as shown, in Figs. 5, 6, 27 and 28, a cam disk 138, is rotatably secured on the outer end of the crank shaft 15, and rigidly secured on the end of said shaft beyond said cam disk is a cam 139, the front face of which lies in a line substantially radial with the shaft, and, as shown, is straight. Secured on the outer end of the pawl shaft 131, is an upwardly directed lever 140, provided at its upper end with a substantially right angle flange 141, directed rearwardly from the machine and affording a detent to hold said lever at the outer limit of its swing to rotate the shaft 131, sufficiently to bring the pawls 135, 136 and 137 into engagement with the ratchet wheels 86, 92 and 97, whereby the forward rotation of the dial shafts is prevented after release from registering position.

Pivotally secured on the rear frame plate 5, is a lever 142, which bears normally upon the flat side of a cam disk 143, rigidly secured on the outer end of the main spring shaft 122, as shown in Figs. 27 and 28. Pivotally engaged on the cam disk 138, on the crank shaft near the bottom of the disk and on the opposite side thereof from the lever 140, is a thrust bar 144, which normally rests and is supported upon the upwardly directed inner extremity of the lever 142. Set in the face of said cam disk 138, in position to engage and press the arm 140, outwardly, as shown in Fig. 29, is a pin or projection 145. Pivotally engaged upon a stud or post 146, at the side of the rear frame member 6, is a detent lever 147, having a notch near its pivoted end on the under side thereof to serve as a detent on the lever 140, when said lever is pressed outwardly by the pin 145. A coiled pulling spring 148, is engaged at the inner end of said detent lever 147, and also on the flange or finger 141, on the upper end of the lever 140, and acts to pull said lever 140, inwardly to shift the pawls. A pin 149, is set in the arm 139, secured on the shaft 15, in position to engage beneath the detent lever 147, to lift the same out of engagement with the lever 140, when the crank shaft returns to normal, thereby permitting the upper end of the lever 140, partly rotating the pawl shaft 131, to bring the pawls 132, 133 and 134, into engagement with the ratchet wheels 87, 93 and 98 to hold the dial shafts from reversion after a registering movement thereof has begun. Near the end of the forward movement, however, of the crank shaft, the arm 139, engages the inner end of the push bar 144, which has been sprung upwardly by the rotation of the main spring shaft 122, and pushes the same so that continued rotation of the crank shaft rotates the cam disk 138, bringing the pin 145, thereon into engagement with the lever 140, at its upper end, forcing the lever outwardly until the finger or detent 141, thereon enters the notch in the detent lever 147, just at the time of the completion of the registering or forward movement of the crank shaft. This throws the pawls 132, 133, and 134 out of engagement with their ratchets and brings the pawls 135, 136 and 137 into engagement with the oppositely facing ratchet wheels 86, 92 and 97, thereby permitting only return movement of the dial shafts to normal. At the completion of the return movement of the crank shaft, the pin 149, thereon engages beneath the detent lever, as shown in dotted lines in Fig. 27, lifting the same and thereby releasing the pawl lever 140, permitting the same to swing inwardly to normal under the impulse of its spring 148.

Sight indicators are provided at the top of the machine to display to the purchaser the amount of the transaction registered. This mechanism also is positively and rotationally driven from the dial shafts and comprises rotating dials or cylinders appropriated respectively to dollars, dimes and pennies, or, in other words, to coin denominations corresponding with those of the dials, and for this purpose, the indicator is so constructed as to display the amount thereon at a plurality of points on its periphery to permit the same to be readily seen from practically any position adjacent the machine.

Secured to the top frame bars or plates 9 and 10, above the dial shafts, is a bracket comprising a downwardly extending plate 150, and a horizontally extending plate 151, just above the dial shafts. Journaled in the downwardly extending plate 150, of said bracket and in the rear end frame plates, are the indicating shafts comprising the inner dollar indicator shaft 152, the tubular dime shaft 153, and the tubular penny shaft 154. As shown, the dollar shaft is journaled at its rear end in the rear frame plates and all of said shafts extend through the vertical frame plate 150, for said bracket, the external or penny shaft bearing therein. Each of said shafts is provided at its inner end with a bevel gear 155, 156 and 157 respectively, of which the inner gear or that on the dollar indicator shaft is the smallest, and the other or outer gears are progressivley larger.

Journaled at its end on the horizontally extending bracket portion 151, is a vertical dollar indicating shaft 158, having rigidly secured thereon a bevel gear 159, which meshes with the bevel gear 155, on the dollar indicating shaft 152. A tubular vertical dime shaft 160, is rotatably engaged on the shaft 158, and secured thereon is a bevel gear 161, which meshes with a bevel gear 156. In a similar manner a tubular penny indicating shaft 162, is journaled on the dime shaft and secured thereon is a bevel gear 163, which meshes with a bevel gear 157, on the horizontal penny shaft 154. Said shafts, as shown, are journaled one within the other co-axially, and journaled also between the top frame plates 9 and 10, and rigidly secured on the upper end of the vertical penny indicating shaft is a cylindric sight indicator for pennies indicated by 164, and similarly the dime sight indicator 165, is secured on the dime indicator shaft and the dollar indicator 166 is secured on the dollar indicator shaft. These indicating cylinders are of comparatively large diameter and narrow rim, and each is provided with an interior spider 167, which is rigidly connected with the hub 168, which affords rigid connection with the proper shaft. The indicating cylinders may be constructed of any suitable material and marked or printed on the face of each are four series of numerals counting from a unit to the highest denomination it is possible to indicate thereon, for example, in the present machine in which the dollar dial is provided with keys appropriated to 1, 2, 3, 4, and 5 dollars respectively, an upper and a lower line of figures indicating said respective amounts are arranged respectively, so that each indication shall be exactly opposite or one hundred eighty degrees from the same digit or number on the opposite side of the cylinder; for example, as indicated in Figs. 54, 55 and 56, in which number 169ª, indicates a printed strip or tape adapted to be pasted or secured around the cylinder for dollars, the digit 2, with the dollar mark is arranged just half the length of the tape from the same digit in the same upper line, while the digit 2 in the lower space or line is arranged equal distances from the same character in the upper line, so that when said tape is pasted or otherwise secured around the periphery of the dollar or other indicating cylinder, each character will be repeated four times around the periphery of the cylinder and alternately positioned above and in the upper and lower line. The same is true with reference to tape 170ª, for dimes and 171ª, for pennies. Marked also on said penny cylinder and similarly at 90 degrees apart around and alternately on the upper and lower lines of digits, are the words "No sale", and corresponding blank spaces are provided on the tapes secured on the periphery of the other indicating cylinder. A housing or casing 172ª as shown, cylindric in form, is fitted over said cylinders and supported upon the case 173ª, of the machine in any suitable manner. Said indicator case 172ª, is provided at the front and at the rear and on each side thereof ninety degrees apart, with alternately arranged upper and lower view apertures for each indicating cylinder, as shown in Fig. 1, and said cylinders are so secured upon their shafts that when the "no sale" indicator appears at the four view apertures for the lower or penny cylinder, the blank spaces for the dime and the dollar cylinder appear at the remaining apertures in said casing. This is, of course, the normal position of the sight indicator cylinders.

Rigidly secured on the rear end of the horizontal dollar indicating shaft 152, is a filler block or collar 169, and rotatably secured on said shaft and meshing with the gear wheel 90, on the dollar dial shaft, is a gear wheel 170. Rotatably secured on the shaft in advance of said gear wheel is a ratchet wheel 171, the teeth of which are directed forwardly or to the right. Secured on the hub 172, of said ratchet wheel is a spiral pulling spring 173, which extends partly around and beneath the hub, and as shown, is connected at its outer end at the outer edge of the top frame plate 9; that is to say, on the left side of the machine. Said spring acts normally to pull said ratchet wheel in the direction that the teeth thereof face.

Rigidly secured on the dollar indicating shaft is a ratchet wheel 174, as shown in Figs. 20 and 23, and secured on the shaft between said ratchet wheels is a filler plate 175. A main spring 176, is rigidly secured to the shaft in advance of the ratchet wheel 174, as shown in Fig. 20, at its inner end and at its outer end is rigidly secured on the top frame plate 9, at the left side of the machine, said spring acting normally to rotate the shaft to the right. In a similar manner, a collar 177, is rigidly secured on the rear end of the dime indicator shaft and bearing against the same and rotatably secured on said shaft is a gear wheel 178. In advance of this is a ratchet wheel 179, the hub 180, of which is rotatably secured on said shaft, and secured to which is a pulling spring 181, corresponding with the pulling spring 173, before described. A filler plate 182, is secured on said shaft in advance of the loose ratchet wheel 179, and rigidly secured on the shaft in advance of, and operating against said filler plate is a ratchet wheel 183, corresponding with the ratchet wheel 174, for the dollar shaft. In a similar manner, a spring 184, is rigidly secured on the dime indicator shaft corresponding with the spring 176, before described. A collar 185, is secured on the penny indicator shaft and rotatably secured on said shaft is a gear wheel 186, corresponding with the gear wheels 170 and 178. In advance thereof is the ratchet wheel 187, the hub of which is rotatably secured on said penny shaft. A spring 188, corresponding with the springs 173 and 181, is engaged at one end on the hub and at the other to the top frame plate, as before described. A filler plate 189, is secured on said shaft. Rigidly secured on said shaft 154, in advance of a filler plate, is a ratchet wheel 190, corresponding with the ratchet wheels 174 and 183. A spring 191, corresponding with the winding springs 176 and 184, is rigidly secured at its inner end on said shaft and at its outer end at the top of the frame plate 9, as before described. Journaled in the end frame plates at the left of the machine and near the top thereof, is an indicator pawl shaft 192. Rigidly secured on said shaft opposite each pair of ratchet wheels for the respective shafts and projecting inwardly, is a tubular tripping lever 193, and extending inwardly and loosely therethrough and rotatably engaged on said shaft is a pawl 194, the extremities of which lie between the respective pairs of ratchet wheels and the end of which is bent forwardly to afford a detent to engage the ratchet wheels 174, 183, and 190 respectively, which are rigidly secured to their respective shafts. Each of said pawl levers 194, is provided on its outer end with a tail 195, and secured thereto at one end and at the other engaged by the top frame plate 9, above the same, is a pulling spring 196, which acts to hold said pawl downwardly, as shown in Figs. 21 and 22. Set in the front face of each of said gears 170, 178 and 186, is a pin 197, and set in the hub of each of the loose ratchet wheels is a radially directed pin 198, as shown in dotted lines in Fig. 22. Set in each of the loose ratchet wheels is a forwardly directed pin 199, adapted to contact a rearwardly directed pin 200, set in the respective fixed ratchet wheels 174, 183 and 190. Said pins are so arranged that all are in mutual bearing, one upon another, when all the parts of the machine are at normal—that is to say, when the dial shafts are at normal position and the sight indicators indicate the "no sale" position. As shown, however, the pin 197, secured to the gear wheels bears beneath the pin 198, while the pin 199, as shown in dotted lines in Fig. 21, bears beneath the pin 200, in the fixed ratchet wheel.

A pawl shaft 201, is journaled in the frame plates just below the pawl shaft 192, and rigidly secured thereon are pawls 202, which project inwardly and below the ratchet wheels and are provided at their inner ends with a detent or finger 203, adapted to engage the teeth respectively of the loose ratchet wheels 171, 179 and 187. The pawls 194, normally hold the fixed ratchet wheels, and of course, thereby the shafts for the indicating dials, from reverse rotation during the forward rotation of the dial shafts and until the limit of rotation to registering position, and are raised therefrom to permit rotation of the indicators through the forward rotation of said indicator shafts at the limit of the return movement of the dial shafts while the pawls 102, are normally out of engagement with the loose ratchet wheels on the respective shafts and are thrown into engagement with the same only at the forward limit of rotation of said shafts, that is to say, at registering position. These movements of the pawls are effected through the rotation of the crank shaft 15, and the cam disk 138, rotatably secured on said crank shaft at the rear end of the machine, as shown in Figs. 27, 28 and 29. For this purpose, as shown, a lever 204, pivotally engaged on the rear frame plate 5, on the outer side thereof, projects transversely the machine and the inclined inner end thereof normally rests upon the pin 149, set in the cam arm 139, secured on said crank shaft, as shown in Fig. 27, at which all the parts are at normal. Said lever 204, is provided near its inner end and on the under side with a notch affording an inwardly directed shoulder 205.

Rigidly secured on the upper cam shaft 192, is a depending lever 206, which projects downwardly on the outer side of the lever 204, and is provided at its lower end with a finger 207, which projects forwardly beneath the lever 204, in position to engage in the notch in the under side of said lever, as shown in Fig. 29, when said lever 206, is swung inwardly by the rotation of the cam disk 138, at the limit of travel of the dials to registering position. For the purpose of actuating said lever 206, and also to afford a stop for the lever 204, and the lever 206, at normal positions, a pin 208, is set in the cam disk to bear above the lever 204, and at the outer side of the lever 206, at normal position, and said pin acts with the forward rotation of the cam disk 138, to push the lever 206, laterally to permit the same to engage in the lever 204, at the moment of such release. Said levers 204—206, are mutually connected by means of a pulling spring 209, which is secured at its upper end to the lever 206, and at its lower end to the tail 210, of said lever 204. This spring acts to hold the inner end of the lever 206, downwardly in position to be engaged and lifted by the pin 149, on the cam arm 139, when the crank shaft returns to normal.

The upward movement of the inner end of the lever 204, releases the lever 206, therefrom, whereupon the spring 209, returns said lever 204, to normal. This movement is, of course, accompanied by the return rotation of the cam disk 138, under the influence of a spring 211, engaged at its lower end on the rear frame plate 5, and at its upper end engaged on the pin 208, set in said cam disk.

The lower pawl shaft 201, is normally locked from rotation with the pawls held out of engagement with their respective ratchet wheels until approximately the limit of the forward or registering movement of the dial shafts. The shaft is then rotated sufficiently to bring the pawls into action, and the ratchet wheels are engaged thereby until approximately the completion of the return movement of the dial shafts. For this purpose, as shown, a lever 212, is pivotally engaged on the frame plate 5, and extends substantially horizontally along the outer face of the cam disk 138, above the levers 147 and 204, and is provided near its inner end and on its under side with a downwardly inclined finger 213, affording a cam face on the under side thereof to receive therebeneath a pin 214, set in said cam disk. Said lever is also provided on its under side with a notch affording a shoulder 215, shown in dotted lines in Figs. 27, 28 and 29, which is directed oppositely from the normal rotation of the cam disk and in normal position of the parts, as indicated in Figs. 27 and 28, is engaged by a pin 216, secured on the inner side of a lever 217, secured on the outer end of said pawl shaft, whereby said pawl shaft is held normally from rotation with its pawl out of engagement with the ratchet wheels respectively controlled thereby.

A pulling spring 218, is engaged on the rearwardly directed tails 219 and 220ª on the respective levers, and acts to hold the lever 212, downwardly and acts to swing the lever 217, forwardly when the pin 216, thereon is released from the shoulder 215, on the lever 212. The lower end of said lever 217, extends downwardly into position to be engaged by the cam face on the rear side of the cam arm 139, as the crank shaft 15, returns to normal whereby said lever 217, is pressed rearwardly to release the pawls on the cam shaft 201, from the corresponding ratchet wheels and to permit the detent lever 212, to swing down under the impulse of the spring 218 to engage over the pin 216, on said lever. In consequence of this arrangement, the indicators are operated as follows: Starting with the indicator at "no sale" position, and registering the maximum amount the machine is capable of registering in one operation, the pawls on the cam shaft 192, remain in engagement with the ratchet wheels 174, 183 and 190 during the forward rotation of the dials and until the cam arm contacts the push rod 144, on the cam disk 138, rotating said cam disk a short distance just at the end of the forward stroke of the crank shafts. The rotation of said cam disk moves the lever 206, inwardly by the engagement of the pin 208, set in the cam disk thereagainst, thereby raising the pawls. Such rotational movement of the cam disk also raises the detent lever 212, the inclined face of the inner end of which slides upwardly over the pin 214, set in said cam disk, and remains supported on said pin, as shown in Fig. 29, after the release of the lever 217, from said detent lever. Such release rotates the lower pawl shaft 201, to throw the pawls 203, thereon upwardly into engagement with the ratchet wheels 171, 179 and 187, which are rotatable on their respective shafts. The gear wheels on the respective indicating shafts rotate freely during such forward rotation of the dial shafts, being in mesh with the gears thereon, and the pins 197, set in said gear wheels, engage beneath the radial pin 198, set in the hubs of the rotatable ratchet wheels and which are normally held in engagement therewith by the pull of the springs 183, and act to rotate the ratchet wheel with said gear wheel. The indicating shafts are also rotated thereby, inasmuch as the pin 200, set in the face of each fixed ratchet wheel, bears against the pin 199, in the loose ratchet wheel, all said pins normally being in engagement and the indicating shafts being held at normal by the action of the winding springs 176, 184 and 191 respectively. Inasmuch as the keys actuated in this instance, indicate the largest amount possible to register at one operation on the machine, the dial shafts begin their rotation immediately with the rotation of the crank shaft and in consequence, the indicators are rotated with such forward movement to show at the respective view apertures in the indicator casing, the amount registered, which, in the machine illustrated, is five dollars, ninety nine cents ($5.99).

At the moment of release of the pawls from the fixed ratchet wheel at the end of the forward rotation, the fingers 203, on the pawl arms 202, engage the rotatable or loose ratchet wheels, and hold the same, (and, of course also, the fixed ratchet wheel and indicating shaft) from reverse rotation owing to the mutual engagement of the pins 199 and 200, until the dials have returned to normal and just at approximately the limit of such return rotation, the lower pawls 202, are thrown out of engagement with the loose ratchet wheels and simultaneously the upper pawls 194, are brought into engagement with the fixed ratchet wheels, thereby firmly holding the indicators in indicating position. Should it now be desired to register any less amount than the maximum amount capable of registration, the keys are actuated as before, for example, the keys indicating one dollar, one dime and one cent are pressed inwardly. The crank shaft now turns freely and without actuation of the dial shafts or indicating shafts until the detent on the crank engages the respective keys on the respective dials, and, of course, the dial and dial shafts are rotated but a comparatively short distance to bring the machine to normal release position. In consequence, the gear wheels and loose ratchet wheels on the respective indicating shafts are again rotated to an extent indicated by the respective denominations on the dials to register the said amounts and at the moment of release of the upper pawls 194, from the fixed ratchet wheels, the indicating shafts are reversely rotated until the pins on the fixed ratchet wheels again contact the pins on the loose ratchet wheels, thereby arresting the indicating wheels at the proper point to display the proper indication. Should now a higher denomination be registered, for example, one dollar, forty five cents ($1.45), each of the dial shafts are rotated by the engagement of the crank with the key actuated, so that those shafts indicating a higher amount than that previously registered, are rotated forwardly while that indicating the same amount previously registered, remain at rest, while, of course, should a less amount be registered on any dial a reverse rotation of the indicating cylinder for that dial occurs, so that in any instance the amount registered by the machine will be clearly displayed in all the view apertures in the casing. The registering mechanism and total adding mechanism is also operated by the continuous rotation from the dial shafts, and, as shown, is removably secured in the machine upon an interior frame comprising a relatively short base plate 220, having a front vertical plate 221, and a rear vertical plate 222, and intermediate vertical frame plates parallel therewith 223, 224 and 225. Rigidly secured in any suitable manner to the front vertical frame plate 221, in its inner edge, is a vertical web or bar 226, which at its forward end affords a vertical frame plate 227. Said interior frame for the registering and total adding mechanism is removably secured in place on the right side of the machine by means of bolts, whereby the frame plates 227 and 222, are rigidly but removably secured upon the front and rear vertical frame plates, as shown in Figs. 2 and 57. Journaled in said frame plates 221, 223, 224 and 225, are coaxial registering shafts comprising an inner dollar register shaft 228, a tubular dime register shaft 229, rotatable thereon, and an outer penny register shaft 230, rotatable on the dime register shaft.

Rigidly secured on the dollar register shaft 228, and on the rear side of the frame plate 225, is a ratchet wheel 231, the teeth of which are directed forwardly or toward the right, and similarly secured on the dime register shaft and on the penny register shaft are corresponding ratchet wheels 232 and 233, on the rear side of the frame plates or uprights 223 and 224.

Rotatably secured on the dollar register shaft at the inner side of the frame plate 225, is a gear wheel 234, the hub 235, of which is of relatively large diameter, and is provided at its forward end with a push pin or pawl 236, parallel the shaft 228, and normally held outwardly by means of a spring 237, seated in the same bore in the hub therewith.

Rigidly secured on the dollar register shaft 228, is a double ratchet wheel 238, having ratchet teeth on the rear face thereof, which are directed toward the right and lie in position to be engaged by the spring pawl 236. Said ratchet teeth, as shown, are ten in number, and spaced uniform distances apart. The gear 234, on the dollar registering shaft, meshes with the gear wheel 89, on the dollar dial shaft, which is of the same size, inasmuch as the dollar dial has but 5 keys for significant digits to wit, from one to five inclusive and the dials and dial shafts rotate but one half or one hundred eighty degrees of a revolution as a maximum, while to count ten, the dollar shaft completes a revolution. In other words, the dollar register shaft rotates with and to the same extent as the dollar dial shaft.

Rotatably secured on the dime registering shaft and also on the penny registering shaft, and adjacent to the frame plates 224 and 223 respectively, is a rotative gear 239, the hub 240, of which is likewise provided with a push pin 236, impelled by a spring 237, engaged in the bore thereof as before described, and also secured on the dime indicating shaft and on the penny indicating shaft are double ratchet wheels 241, having teeth upon the periphery thereof, and teeth upon the rear face thereof, as before described, to engage the push pins 236, said teeth in both instances being directed toward the right. Said teeth are ten in number on said ratchet wheels, in each set thereof, with the exception of the ratchet wheel 241, on the penny register shaft 230, one tooth of which is omitted for the "no sale" key.

Rigidly secured on the rear end of the penny register shaft and the dime register shaft, is a collar 242, and projecting rearwardly therefrom is a pin 243, as shown in Figs. 58 to 61 inclusive and in Fig. 72. The gears 239 on the dime and penny register shafts mesh respectively with the gear wheels 95 and 100 on the dime and penny dial shafts, as shown in Figs. 4 and 6. Said gears are two to one gears, so that a rotation of one hundred eighty degrees of either of said dial shafts (which is the full amplitude of movement of said shafts in registering) acts to rotate the dime or penny registering shafts once. A collar 244 is secured near the end of the penny registering shaft 230, and secured on the extremity of said shaft and bearing against said collar, is a register wheel 245, marked on its periphery with the ten digits reading toward the right. A corresponding registering wheel 246, is secured on the dime shaft. For this purpose, as shown, a collar 247, is secured on the extremity of said shaft and provided with a hub on which said register is secured in close relation with the penny register, as shown in Figs. 57, and 72. Said registering wheels are so positioned upon the shaft as to read at the right and in a line with the shaft, as shown in Fig. 57, in which the said indicator wheels are shown before registration has been made thereon and with all the parts of the machine at normal.

A collar 248, is secured on the forward end of the dollar register shaft, and rigidly secured in the forward face thereof is a pin 249. An inclined bracket 250, is secured on the longitudinal web 226, of the register frame, as shown in Fig. 57, and slidably engaged thereon is an accumulating register or counter, which may be the ordinary veeder register 251, or any other suitable device. The shaft 252ª, of said register 251, extends axially through the register and at its rear end is journaled in an axial bore in the dollar registering shaft, and at its forward end is rotatably and slidably engaged in the front frame plates of the machine. Secured on said shaft at the rear side of the veeder, is a rearwardly facing clutch disk 252, having apertures therein arranged equal distances apart, and, of course, ten in number to receive the pin 249, therein, as shown in Fig. 72, to positively connect the veeder with the dollar register shaft.

The penny, dime and dollar registering shafts register positively from the direct drive of the corresponding dial shafts in registering amounts represented by each key affected in registering, the shafts for this purpose rotating directly and immediately from the drive of the intermeshing gears, one of which is in the dial shaft in each instance, and the other on the corresponding register shaft. The penny registering shaft carries by tens to the dime register, the dime registering shaft carries by tens to the dollar register, the carrying to the higher denomination being effected during the return rotation of the dials to normal. For this purpose, a shaft 253, is journaled below the register shaft in the frame plates 221, 222, 223 and 224, and a corresponding shaft 254, in alinement therewith is journaled in the frame plates 225 and 222, and at its forward end is provided with a gudgeon 255, which extends into and is journaled in a corresponding axial socket in the rear end of the shaft 253. Rigidly secured on said shaft 254, is a detent pin or post 256, which stands upwardly therefrom in the path of the pin 243, on the collar 242, for the dime register shaft. A corresponding post 257, is secured in the shaft section 253, and extends upwardly in the path of the pin 243, in the collar 242, secured on the penny shaft.

Extending through and journaled in the tops of the vertical frame members for the register frame, is a shaft 258, which extends also through the rear end frame plates of the machine. Slidably supported upon each of the vertical frame plates 224 and 225, on the rear side thereof is a sliding pawl 259, the upper end of which is longitudinally slotted to receive the shaft 258 therethrough, as shown in Figs. 59 and 60, and the lower end of which is provided with a hook or pawl head 260, which engages normally the ratchet wheels 231 and 232 respectively. Said pawl head is provided with a downwardly and outwardly opening notch or shoulder at the lower end thereof and rigidly secured on the sectional shafts 253 and 254, are detent levers 261, which engage in said notches in said pawl heads to hold said pawls normally in elevated position, and in engagement with the respective ratchets, and, as shown, outwardly directed arms 262—263, provided on said detent lever or arm 261, and on the back of said pawl arm 259, are connected by means of a strong pulling spring 264, which acts to hold said elements in mutual engagement with the pawl heads in position to engage the respective ratchet wheels. A pin or stop 265, is provided at the back of each of said pawl arms to limit the outward swing thereof from the ratchet wheel. Pivotally engaged on each of said vertical frame plates 223, 224 and 225, are pawls 266, held by springs 266ª in engagement with the teeth of said ratchet wheels at all times to hold the corresponding ratchet wheels 233, 232 and 231 on the penny, dime and dollar register shafts respectively, and which at all times engage said ratchet wheels to hold the respective register shafts from reverse rotation.

Rigidly secured on the outer end of the crank shaft 15, at the rear end of the machine is a cam disk 267, having notches therein disposed on diametrically opposite sides thereof, as shown in Fig. 3. Rigidly secured on the outer end of the shaft 258, is a lever 268, having a pin 269, set therein in position normally to ride on the periphery of said cam disk to throw the end of said lever upwardly, thereby rotating the shaft 258, to the right. A pulling spring 270, is connected at one end with said pin 269, and at its other end is connected upon a washer or plate 271, rotatably secured on said shaft 15, at the outer side of said cam disk 267.

Secured transversely in the shaft 258, closely in advance of the sliding pawl arm 259, is a transverse rod or pin 272, which projects therefrom across the slotted end of said pawl arm and in position to engage a pin 273, set in the face of said pawl arm above said pin 272, so that rotation of the shaft 258, toward the right acts to lift said pawl arm to the upper limit of its travel, while reverse rotation of said shaft 258, acts to leave said pawl arm unsupported except for the engagement of the detent lever 261, therebeneath, and, as shown, the notches on diametrically opposite sides of the cam disk 267, are so arranged that one of said notches is just in advance of the pin 269, on said lever at normal position, to permit said pin to fall therein to reversely rotate said shaft 258, as the crank arm is swung downwardly to registering position, while the other or oppositely disposed notch in said cam disk receives the pin 269, therein at the limit of the downward rotation of the crank to reverse the rotation of the shaft 258, to again engage the pin 272, beneath the pin 273, to lift said pawl arm again to normal, said upward movement of the pawl arm being obviously effected during the reverse rotation of the crank shaft, said cam disk acting on the pin 269, in the manner of a Geneva gear.

The pin or lever 257, secured in the shaft section 253, before described, is normally held by the spring 264, to be engaged by the pin 243, on the collar 242, on the penny shaft, as shown in Figs. 58 and 59, and said collars are so set on said shafts that the pin 243, thereof engages against the pin or lever 257, when the number "9" on the registering wheel is in registering position on that shaft, so that further rotation of that particular shaft acts to throw the detent lever 261, out of engagement with the pawl head, permitting the pawl arm to drop a distance equal to one tooth on the ratchet wheel 232, on the dime shaft under the draft of its spring 264, as shown in Fig. 59. The reverse rotation of said shaft 258, occasioned by the reverse or return movement of the crank shaft and the cam disk 267, thereon acts to raise the pawl arm thereby rotating the dime shaft one notch of the ratchet wheel 232, and thereby carrying one to the dime register.

The mechanism and operation for carrying the dimes to the dollar register is substantially identical with that for carrying the pennies to the dime register. For this purpose, as shown in Figs. 3 and 57 a tubular shaft 274, is secured on the outer end of the shaft 258, and, secured on the outer end thereof, is a lever 275, which projects transversely the machine. A pin 276, is secured in a suitable collar in the inner end of said tubular shaft in position to engage beneath the pin 273, set in the upper end of the sliding pawl 259, for the dollar registering shaft, and, as shown in Fig. 27, a gear wheel 277, is rigidly secured on the crank shaft in advance of the cam disk 267, and meshing therewith and slidable in a suitable casing 278, therefor, is a rack bar 279, the upper end of which engages beneath the lever 275, to hold the sliding pawl arm 259, elevated by the engagement of the pin 276, on said shaft beneath the pin 273, on said pawl when the mechanism is at normal. Rotation of the crank shaft, however, moves said rack bar downwardly out of engagement with said lever 275, leaving the sliding pawl bar 259, for the dollar shaft unsupported except for its detent lever 261. As before described with reference to the carrying from the penny to the dime shaft, the pin 243, set in the collar 242, for the dime shaft, acts to trip the detent lever 261, out of engagement with the head of the sliding pawl, permitting said sliding pawl to descend when the dime register indicates naught. The return of the crank shaft 15, to normal, however, reverses the rotation of the tubular shaft 274, by the engagement of the rack bar 279, beneath the lever 275, thereby lifting the pawl bar 259, one notch, or, in other words, carrying the tenth dime to the dollar register at the reverse or return rotation of the dials to normal.

Preferably the gear wheels 239, on the dime register shafts and on the penny register shaft are secured on their hubs 240, to permit a slight relative movement, as indicated in Fig. 64. For this purpose, as shown, a pin 280, is set in the rear face of said hub member parallel the shaft and projects through a short slot concentric with the shaft, to permit of a slight relative movement at either limit of the rotation of the dial shafts to enable the various pawls engaging the respective ratchet wheels on said registering shafts to seat positively against the ratchets to hold the registering shafts in registering position.

A single set-back mechanism is provided for the dime and penny registering shafts and also for the dollar register, whereby the registers may all be promptly returned to naught after the results have been taken therefrom by the book-keeper at the end of the day's or week's transactions. For this purpose, as shown in Figs. 57, 58 and 59, a shaft 281, is journaled in the vertical register frame plates 221, 223 and 224, and secured thereon below the ratchet wheel 241, on the dime shaft, and 241, on the penny shaft, are inwardly directed arms 282, having at their inner ends an upwardly directed pawl 283, in position to engage said ratchet wheels and normally held in yielding engagement thereagainst, and at their lowest position by means of pulling springs 284, engaged at the upper end of each pawl and also engaged on the base frame plate 220, of the register frame. A crank 285, is secured on the forward end of said shaft and provided with a handle 286. Said crank is normally directed upwardly by the pull of said spring with the handle thereof bearing against the front vertical frame plate 221, of the register frame, as shown in Fig. 57. From the construction shown, the reciprocation of said pawls by means of the crank act to rotate said penny and dime register shafts, and, inasmuch as each of said pawls has a tooth omitted for the zero position of the registers, as shown in Fig. 62, when the registers reach the zero position the pawl no longer can engage a tooth to rotate said shaft and consequently the registers remain set at normal, as shown in Fig. 57.

The set back mechanism for the dollar register 251, (which may, of course, register up to many thousands of dollars dependent upon the size or capacity of the veeder or of the register used for that purpose) is adapted to quickly reverse said register to naught independently of the number registered thereon. For this purpose, as shown, a frame plate or standard 287, is secured on the front end of the register frame and extends upwardly parallel the main front frame members and in close relation therewith and is rigidly secured thereon. At the upper end thereof is a horizontal and rearwardly extending frame plate 288, having at its rear or inner end a downwardly directed flange or plate 289. Journaled in said standard 286, and in the frame plate 289, is a screw shaft 290, having threaded thereon a nut 291, to which a post 292, is rigidly secured, and which extends upwardly through a longitudinal slot in the top set back frame plate 288, and which serves to hold said nut from rotation on said screw shaft. As shown, a weak spring 293, is secured on said post or arm and bearing at its lower end on said nut and at its upper end on a washer 294, which bears lightly on the under side of the frame plate. Rigidly secured on the forward end of said screw shaft is a star wheel 295. A stud shaft 296, is secured in said standard or set back frame plate 287, and projects inwardly, and rotatably secured thereon is a gear wheel 297, which meshes with a pinion 298, rigidly secured on the veeder or dollar register shaft 252$^a$, as shown in Figs. 67 and 69. A ratchet wheel 299, is rigidly secured on the rear face of said gear wheel 297, with the teeth directed to rotate said gear to the left. A cam disk 300, is rotatably secured on said stud shaft and is provided with a crank 301, set in the face thereof near its periphery to enable the same to be manually rotated. A spring pressed pawl 302, is carried on said disk on the forward side thereof in position to engage said ratchet wheel 299, to rotate the gear wheel when said cam disk is rotated, and said pawl is normally held out of engagement with said ratchet wheel by means of a cam 303, rigidly secured on said stud shaft 296, and which engages an arm 304, integral with said pawl and which projects rearwardly through a slot in said cam disk 300, to engage the cam 303, as shown in Figs. 67 and 68.

A collar 305, is secured on the veeder or register shaft 252$^a$, provided with a thin cam wheel 306, which projects normally alongside the rear face of the cam disk 300, and said cam wheel or disk 300, is radially slotted from its periphery inwardly, one portion 307, thereof bent forwardly and the portion 308, above said slot bent rearwardly, as shown in Figs. 67, 68 and 70, so that when the cam disk 300, is rotated from its normal position, the rearwardly directed flange 308, thereof engages behind the cam wheel 306, on the register shaft and acts to pull the register bodily forward, sufficiently to release the clutch disk 252, on the rear end of said veeder shaft from the pin 249, set in the collar 248, on the dollar shaft. A spring 309, is engaged on said cam disk 300, at the rear side thereof, and engaged at its other end on the plate 226, and acts to hold said cam disk normally in position for the periphery thereof to engage in front of the cam wheel 306, on the veeder shaft, as shown in Figs. 67 and 68, to hold said veeder rearwardly and positively connected by means of its clutch with the dollar shaft to drive therefrom. In this normal position, a pin 311, in the rear face of said gear wheel 297, is in engagement with the forward side of the lower arm of the star wheel 295, when the veeder or register is at naught, and also a pin 312, set in the rear face of the star wheel is in positive engagement on a pin 313, set in the forward end of the nut 291, on the screw shaft, as shown in Fig. 69, at that time being at the forward limit of its travel on said screw shaft. At this time also, a stop rod 314, engaged in any suitable rigid part of the register frame, engages on the inner side of the handle 301, for the cam disk 300, which, together with the pull of the spring 309, holds said cam disk in its normal position.

As the veeder, or the shaft of the register is rotated from the dollar shaft in registering on the veeder, the pinion 298, slowly rotates the gear 297, carrying the pin 311, to the right and away from the star wheel 295, to engage behind the lower arm of said star wheel to rotate the screw the fractional part of a revolution, dependent upon the number of arms on said star wheel with each complete rotation of said gear wheel. In this manner, the nut slowly travels rearwardly along the shaft as the amounts registered increase. As shown in the drawings, proportions are such that the ratio of the pinion 298, to the gear wheel 297, is about one hundred to one, so that with each rotation of the gear wheel, which is accomplished with the registering of approximately one hundred on the dollar register, the screw shaft completes one sixth of a revolution, inasmuch as the star wheel is shown with six arms. This, of course, however may be varied either by varying the size of the gear wheel or increasing or decreasing the number of arms on the star wheel. The effect in any event is to slowly drive the nut along the screw shaft toward the rear end of the screw as the count increases upon the register.

When it is desired to set back the register to naught, the cam disk 300, is rotated by means of its crank, the first effect of such rotation being to engage the cam wheel 306, on the forward side of the flange 308, thereby sliding the veeder or register forwardly to disengage the same wholly from the dollar shaft. When wholly disengaged, the pawl 303, then released from the cam 306, engages the ratchet wheel and reversely rotates the gear wheel 297, of course reversing the rotation of the veeder or register shaft 252$^a$, and reversing the rotation of the screw shaft by the engagement of the pin 311, against the successive arms of the star wheel with each rotation of the gear wheel, causing the nut 291, to travel forwardly, this forward movement continuing until the pins 312, on the star wheel and 313, on the nut, are brought into positive engagement by the pin 311, on the gear wheel, as shown in Fig. 69. At this moment, the register is brought to zero and the crank for the cam is reversed to release the cam wheel 306, therefrom and to engage the cam disk on the forward side of said cam wheel, with the stop 314, as shown in Fig. 68, in positive engagement with the crank 301.

As shown in Figs. 5 and 39 to 53 inclusive, the printing or recording is effected by means of the reciprocating carriage carrying a record strip, which is projected against a carbon ribbon or strip and together therewith projected against the printing wheels before described carried on the printing shafts 103, 107 and 111. Said carriage reciprocates transversely the machine between parallel front and rear guides 315 and 316, respectively, which are rigidly secured transversely the base or bottom frame plates of the machine near the front end thereof. Said bottom frame plates are apertured adjacent the inner face of each of said guides and journaled below said bottom plates, one on each side of the machine, is a shaft 317, on each end of which are secured rollers 318, which project upwardly through the bottom of the machine, as shown in Figs. 5 and 41, and on which the base 319, of the printing carriage rolls. Corresponding rollers 320, are journaled on the inner face of each of the guides near each of said rollers 318, as shown in Fig. 41, and engage on the upper face of the bottom plate or plates 319, of the printing carriage. The base of the printing carriage is a rectangular elongated plate of flat metal, as shown, and secured thereon is an upstanding web 321, of metal, stamped or shaped to afford in advance of the printing wheels on said shafts, an arm 322, integral therewith and about which is secured a roll of any suitable material to afford the impression roll or member for the printing carriage. Said arm is at all times parallel with the printing shafts to afford equal printing effect for all said printing wheels when the tape is projected thereagainst by the reciprocation of the carriage. Journaled on the forward or inner end of said vertical web or plate on said carriage, is a freely revoluble roller 323, on which is carried the printing tape 324, and the end thereof is carried over a roller 325, projecting horizontally from said vertical frame plate 321, on the same side with the roller 323, and parallel therewith. The tape is led therefrom beneath a corresponding roller 326, secured on said frame plate below the impression arm 322, and thence is carried upwardly around the inner side of, and over the impression arm 322, and downwardly to a positively driven take-up roller 327, journaled on the outer end of the carriage and also parallel the roller 323.

Mechanism is provided for winding the strip on the take-up roller 327, differentially to avoid varying the spaces between successive records on the strip or tape as the size of the roll of paper or record strip on said roller increases. For this purpose, as shown, a tubular shaft 328, is journaled in said web or vertical carriage plate 321, as shown in Fig. 46, and secured on the forward end of said shaft or that projecting forwardly from said web is a roll 329, which is rigidly secured thereon in any suitable manner. A pin 330, is secured in the forward end of said sleeve or roller 329, as shown in Fig. 46, and adapted to engage in any of the apertures 331, shown in the knurled or burled head 332, of the take up roll. This paper roll is thereby firmly engaged on the inner sleeve or core, but may be readily drawn therefrom to permit the end of the record tape to be engaged thereon. For this purpose, as shown, the roll 327, is made comparatively thin to fit on the core or barrel 329, and is provided with parallel longitudinal slots in one side thereof, as shown in Fig. 47, to afford a narrow tongue 333, beneath and around which the outer end of the record tape is secured, as shown in Fig. 47, to permit of quickly attaching the otherwise free end of said tape to the take-up roller. On the opposite or rear end of the tubular shaft 328, is rigidly secured a spiral ratchet wheel 334. Said ratchet wheel has a relatively wide face and the ratchets are arranged or cut thereon in a spiral form, the inclination or lead of each tooth across the face of the ratchet wheel approximating the pitch of the teeth, as shown in Fig. 45. The stud 335, is set in the vertical web or frame plate of the carriage at the outer end thereof, and beyond said ratchet wheel, and journaled thereon is a plurality of independent pawls 336, which at all times bear against the under side of the ratchet wheel and are held in firm bearing thereagainst by springs 337, one for each pawl. A lever 338, is pivotally engaged on said vertical web 321, on said carriage and projects outwardly and bears at its outer end on the record strip on the take up roll, as shown in Fig. 42, and is provided with a rearwardly directed arm 339, at its free extremity which projects rearwardly through a vertical slot in the carriage. Journaled on said tubular shaft 328, between the carriage and said spiral ratchet wheel, is a lever 340, the upper end of which is relatively broad and is provided, as shown in Fig. 44, with a relatively broad slot therein of a length approximately equal to the length of the slot in the carriage, through which the arm 339, projects. The lower end of said lever projects downwardly into a slot or opening in the base 319, of the carriage and is held rearwardly by means of the pulling spring 341, secured on said lower end of the lever at one end and at its other secured on the outer end of the carriage, thereby holding the top of said lever inwardly with the arm 339, on the lever 338, in bearing against the outer wall of the slot, as shown in Fig. 44. Secured on the inner side of said lever above the ratchet wheel 334, upon a stud 342, is a plurality of independent pawls 343, such as the pawls 336, before described, upon each of which bears an independent spring 343ª, acting to hold each of said pawls at all times in positive engagement with the teeth of the ratchet wheel when the lever 340, is reciprocated. The extent of the reciprocation of said lever, however, and therefore the rotational movement of the ratchet wheel, and therefore the take-up roller, is determined by the position of the arm 339, on the lever 338, in the slot, the greatest amplitude of reciprocation of said lever, and consequently the greatest movement of the ratchet wheel and take-up roll occurring when the arm is near the bottom of the slot in the carriage or, in other words, when the record roll is small, the amplitude of reciprocation of said lever and consequently the rotational movement of the take-up roll progressively decreasing as the lever 339, is raised in the slot by the gradual increase in the size of the record roll, such decrease, of course, arising from the fact that the sides of the slot in said lever are parallel and consequently the throw of the lever must be decreased as the arm which serves as a stop, moves radially outward from the ratchet wheel. For the purpose of reciprocating said lever with each reciprocation of the carriage, a lever 344, is pivoted at its inner end on the rear guide 316, and on the forward face thereof, and extends outwardly flat against the face of said guide, as shown in Fig. 41, and is held normally downward by means of a spring 345, which engages thereover. Said lever is provided with a forwardly directed arm 346, which engages over a rearwardly directed finger 347, at the lower end of said lever, as shown in Fig. 39, and which holds the lower end of said lever normally inward, as shown in Fig. 51. A fixed detent 348, is provided at the top of said guide member 316, which projects over the lever 344, to limit the upward swing thereof, and a handle 349, is provided on said lever above the detent or finger 346, and which extends outwardly to permit the lever to be lifted to release the carriage. As shown, a casing of sheet metal 350, is secured on the vertical carriage plate 321, and incloses said ratchet wheel, and said lever and its detents. The mechanism for reciprocating will be hereinafter described.

The carbon ribbon roll 351, is journaled on the front frame plate of the machine, in advance of the carriage and the ribbon 352, which may be a narrow carbonized strip of paper carried upwardly over a suitable roller 353, supported in any suitable manner upon the frame, and thence is led inwardly between guides 354, secured on said frame plate around a vertical roller 355, shown in Fig. 38, and thence rearwardly alongside the type faces in printing position on the printing wheels and around a vertical roller 356, secured upon any stationary part of the machine and at the rear of the carriage, and the end thereof is carried outwardly and passed over a corrugated roll 357, journaled in a suitable bracket supported upon any stationary part of the machine, and is engaged thereon by an upper corrugated roller 358, secured on a shaft 359, which extends rearwardly through a suitable bracket 360, secured on the rear frame plate. On the outer end of said shaft 359, is secured a ratchet wheel 361, whereby said shaft 359, and the corrugated rollers are rotated to draw the ribbon at intervals along the type faces to present a fresh carbonized surface to the record strip when impelled against the same, and the printing wheels in printing. The ribbon feed or, in other words, the mechanism for rotating said shaft 359, will be hereinafter described.

Conveniently and preferably, the carbon ribbon may be carried upon the carriage and the ribbon feed effectuated through the reciprocations of the differential operating lever before described. For this purpose, as shown in Fig. 50, a ribbon roll 362, is journaled on the carriage between the roll 323, and take-up roll 327, and the ribbon is led downwardly around a roller 363, and inwardly to the inner end of the carriage and around a roller 364, thence upwardly and around a roller 365, thence horizontally and outwardly around a roller 366, at the inner side of the printing arm 322, and over a corrugated roller 367, secured on a shaft 368, journaled at the top of the carriage, and on the other end of which or on the rear side of the carriage is secured a ratchet wheel 369.

A lever 370, is journaled near its middle on the rear side of the carriage, and carries at the inner end pivotally engaged thereon, a pawl 371, which at all times engages said ratchet wheel and is held in engagement therewith by means of a pulling spring 372, engaged on the outer end of said lever and on the tail of said pawl. A finger 373, is provided at the upper end of the differential lever 340, which bears at all times against the outer end of said lever and is held in engagement therewith by means of a pulling spring 374, which connects said end of the lever 370, with the end of the differential lever, and, as shown, a lever 375, is pivoted at one end on the front side of the carriage and at its rear end is provided with an idle corrugated roller 376, which engages the carbon ribbon against the roller 367, and is held at all times in engagement therewith by means of a pulling spring 377. In this construction, the reciprocation of the differential lever acts to feed the carbon ribbon or strip continuously as the printing or recording progresses. This arrangement, of course, permits the quick removal of the carriage carrying the record strip and the carbon ribbon from the machine, should it be desired to clean the type faces on the printing wheels.

The reciprocation of the carriage is effected by means of a shaft 378, journaled below the printing shaft and having at its inner end a face plate 379, in which is provided a crank pin 380, eccentric with the shaft. Secured on said crank pin is an arm 381, which projects outwardly and alongside the carriage and over the lever 344, and 349, thereof, and is provided with a downwardly directed arm 382, whereby the free end of said lever 381, is supported normally upon the handle 349, of said lever. In advance of said arm 382, is provided a notch or recess in the under side of said lever, adapted to engage therein the cylindric stud 383, which extends through and is rigidly engaged in the tubular shaft 328, upon which the spiral ratchet wheel and the take-up roll for the record ribbon are secured. Said stud 383, is provided with an enlarged head 384, which engages at the rear side of said arm to hold the same at all times in engagement therewith, and, as shown in Figs. 39 and 41, the outer end of said arm is inclined downwardly and inwardly to permit said arm to be lifted by engagement against said stud 383, when the carriage is slid inwardly into place. A rearwardly directed arm 385, is provided on the lever 381, and this is engaged at its extremity by a pulling spring 386, which is secured at its upper end to any rigid part of the frame and acts to hold the outer end of said lever at all times down in engagement with the stud 383. This arrangement causes the reciprocation of the carriage with each rotation of the shaft. Such rotation occurs near the limit of the return movement of the dials and is effected by means of a winding spring, which produces one rotation of said shaft and that with sufficient force to project the carriage inwardly, so that the printing arm strikes the record strip and carbon ribbon with sufficient force to afford the impression. For this purpose the shaft 378, projects through the rear frame plates of the machine and is provided closely adjacent said frame plates, with a cam wheel 387, rigidly secured thereon, having a single stop or shoulder 388, thereon, as shown in Fig. 28, which is normally engaged to hold said shaft from rotation by one end 389, of a bent lever, the other end 390, of which extends upwardly in close proximity with the cam disk 138, in the same plane therewith, so that said lever may be actuated thereby. The outer end of said shaft 378, is reduced in diameter beyond said cam and rotatably secured thereon is a spring casing 391, within which is a flat main spring 392, the inner end of which is secured to the shaft 378, and the outer end of which is secured to the spring casing, as shown in Fig. 33. Rotatable on said shaft, and bearing against the outer and otherwise open end of the spring casing, is a flat wheel or disk 393, on the outer face of which, and rotatable on said shaft, is secured a pinion 394, which meshes with a rack bar 279, before described, as shown in Figs. 5, 27 and 32, and as shown, a casing 278, for said rack bar is secured at its lower end on said shaft, which rotates in said casing, thereby acting to hold said rack bar at all times in engagement with said pinion as well as with the pinion 277, on the outer end of the crank shaft 15.

Secured on the spring casing 391, is an upstanding finger 395, and secured on said disk or wheel 393, on the inner or forward side thereof is a pawl comprising an arm 396, pivoted on said disk or wheel and having secured on its extremity, a plate 397, which engages the arm 396, and provided with a forwardly extending finger 404, integral with the plate at its forward edge, as shown in Fig. 32, and which passes said finger 395, on the inner or forward side thereof. A spring 398, is engaged on said disk or wheel 393, and on the tail of said resilient leaf or plate 397, and acts to hold the free end thereof normally inward and in position to engage the finger 395, on the casing. Secured on the spring casing near the periphery thereof, and projecting forwardly, is a pin 399, and pivotally engaged on the rear end frame plate 5, of the machine, is a detent lever 400, having a notch therein in the inner face thereof presenting an upwardly projecting shoulder 401, to receive said pin 399, therein, as shown in Fig. 30, to hold the tension of the spring 392, after the same is wound up by the rotation of the casing on said shaft.

Pivotally engaged upon the frame plates 6, and, as shown in Fig. 28, resting normally on the toe of the lever 389, is a lever 402, provided at its extremity with a rearwardly extending finger 403, which projects rearwardly sufficiently to engage the thin resilient finger 404, on the pawl plate 397, to hold said pawl from engaging said finger when said lever is in elevated position, as shown in Fig. 30. Pivotally engaged on said frame plate, and, as shown, on the same pivot pin or stud as that for the lever 389, is a lever 406, provided with a shoulder 407, which projects slightly beyond the toe of the lever 389, to engage the shoulder 388, on said cam 387, and provided also beyond said shoulder with an outwardly bent or sprung end 408, adapted to be engaged by the pin 399, to lift said lever out of engagement with the shoulder 388, on said eccentric, as shown in Fig. 35. As shown, the finger 403, on the lever 402, rests on said bent extremity 408, of the lever 406, so that the rotation of the spring casing in winding the spring, acts to lift said levers 406 and 402, the lever 406, remaining supported upon the cam, as shown in Fig. 35, during the reverse rotation of the plate 393, which, of course, actuates with the return movement of the crank and remains so elevated, holding the pawl on said plate 393, elevated because of the finger 404, thereof engaged on said finger 403, as shown in Fig. 31, so that no further winding movement of the casing can occur until the release of the cam from the lever 398, and the return of all parts to normal. This is effected by the partial rotation of the cam plate 138, on the crank shaft, said cam plate engaging the upper arm 390, of the lever 389, thereby throwing the toe of said lever out of engagement with the shoulder 388, of the cam, thereby permitting the shaft to freely rotate once under the throw of the main spring 392, and projecting the carriage violently inward to make the impression upon the record tape.

Inasmuch as the movement of the cam disk 138, occurs only at approximately the limit of the return movement of the crank shaft and dials, it follows that the inward movement of the carriages takes place at that time, at which time the printing wheels have all reached the proper position to record the transaction. After the release of the lever 389, and the passage of the shoulder 388 past the same in rotating the shaft, the lever 406, falls to engage the shoulder 388, of the cam thereby limiting the rotation of the shaft to one complete rotation and holding the cam sufficiently retracted to permit the toe of the lever 389, to again fall into position to engage said shoulder. The rotation of the shaft 378, also produces an audible signal by the ringing of a bell. For this purpose an arm 410, is secured in said shaft, as shown in Fig. 4, in position to strike the short arm 411, of a lever, secured on a shaft 412, journaled parallel the shaft 378. On the extremity of the long arm of said lever is a hammer 413, in position to strike the bell 409, when thrown violently upward by the rotation of the spring impelled shaft 378. The audible signal is produced simultaneously with the opening of the money drawer 414, shown in Fig. 2, which is slidable in the base of the machine and is adapted to be thrown open when released by a pushing spring 415. Said drawer is normally held in closed position by means of a vertically acting bolt 416, slidable on the rear frame plates 5 and 6, and which is projected through the top of the base casing and into position to engage the rear side of the drawer, as shown in Fig. 2. For the purpose of releasing said drawer from the bolt, a bent lever is pivotally engaged on the frame plate 6, the longer arm 417, extending upwardly and held in bearing against the outer side of the lever arm 390, before described, by means of a pulling spring 418 one end of which is secured on a rearwardly directed tongue 419, of said lever, and the other end of which is engaged upon a rod or lever 420, on the pivot shaft 131. The lower end 421, of said lever extends substantially horizontally across the frame plate 6, and engages in a notch in the bolt 416, as shown in Fig. 29, so that when the cam plate 138, rotates to actuate the arm 390, it also actuates this releasing lever, raising the bolt 416, sufficiently to release the drawer. As shown, the releasing lever is at all times held inwardly in engagement with the bolt by means of a pulling spring 422, engaged on said lever adjacent the bolt, and also engaged on the lever 400, and acting to hold both in working position.

In the ribbon feed mechanism illustrated in Figs. 2, 3, 7 and 38, the ratchet wheel 361, is at all times engaged by a spring pressed pawl 423, secured upon the bracket 360, on which the rear end of said ribbon feed shaft 359, is journaled. An arm 424, is pivotally engaged upon any suitable support on the frame plate 6, and depends along the front face of the ratchet wheel, and, as shown, is provided with a longitudinal slot receiving the finger 419, at the upper end of the drawer releasing lever, therein, so that with each transaction registered upon the machine, and, of course, opening the drawer, said arm is swung outwardly and thrown inwardly by the movements of said releasing lever. A pawl 425, is pivotally engaged on said arm 424, and engages the teeth of said ratchet wheel 361, at the top of the wheel and is at all times held in engagement therewith by means of a pulling spring 426. Said ratchet wheel is of large size, while the corrugated rollers feeding the ribbons are of small size and in consequence, very slow feed is effected, inasmuch as it rotates a distance indicated by one tooth thereon with each transaction registered upon the machine. In consequence, the carbon ribbon is utilized to the utmost and the feeding movement is only sufficient to present a fresh carbon surface to the printing wheels, as required.

All the mechanisms hereinbefore described, are controlled in their return to normal by means of the centrifugal and frictional governor, and this governor is also supported upon an independently removable frame to facilitate assembling, as in the case of the other mechanisms, such as the registering and the printing and the recording mechanisms hereinbefore described. Said frame comprises a base plate 427, constructed as are the other special frames of pressed steel or of steel plates. In this instance, the base plate 427, is provided with upwardly directed front and rear end members 428 and 429 respectively, and secured on said base plate at about the middle thereof, is an upwardly directed standard 430.

As shown in Fig. 73, journaled on the uprights 429 and 430, is a main governor shaft 431, a main driving shaft 432, and a transmission shaft 433, journaled above the same.

Rotatably secured on the main governor driving shaft opposite each of the driving gears on the respective dial shafts and meshing therewith, are pinions 434, each of which has secured thereto a guide disk 435, of greater diameter, which extends alongside the respective gears on the dial shafts and carries a spring pressed pawl 436, which at all times positively engages a ratchet wheel 437, rigidly secured on the main driving shaft of the governor, thereby permitting the main driving shaft of the governor to be driven from any and from all of the gears on the dial shafts. Also secured on said shaft 432, is a gear wheel 438, which meshes with a pinion 439, on the transmission shaft 433. Also rigidly secured on the transmission shaft 433, is a gear wheel 440, which meshes with a pinion 441, on the governor shaft 431, the drive being from a larger to a smaller gear, in each instance a comparatively slow rotation of the dial shafts affords a high rate of rotation in the governor shaft. The pawls and ratchets on the main driving shafts for the governor are so set that the governor remains at rest in normal downward rotation of the dials to release position, and the governor is brought into action only with the reverse rotation back to normal. Secured upon the base frame plate 427, for the governor, and near the front end of said governor frame, is a standard 442, and journaled therein is a longitudinally slidable shaft 443, having on its outer end a collar 444, of relatively large diameter bearing on its inner face a friction pad 445, adapted to engage frictionally against the front face of the standard 442.

Rigidly secured on the outer end of the shaft 431, which projects beyond the standard 430, is a sleeve 446, having oppositely directed integral arms 447. Said sleeve is longitudinally slotted from near its outer end inwardly on each side thereof, and the sliding shaft 443, at its rear end slidably engages in said sleeve and is secured in place therein by means of a pin 448, extending through the slotted sides of the sleeve and permitting free longitudinal movement of said shaft. A collar 449, is secured on the sliding shaft 443, and a pushing spring 450, is secured thereon, one end thereof bearing against the forward end of the sleeve 446, and the other against the collar 449, and acting to hold the friction pad 445, thereof out of engagement with the standard 442.

A collar 451, is secured on the sliding shaft and provided with laterally directed arms 452, corresponding with the arms 447, on the shaft 431. Toggle bars 453, are engaged at their outer ends respectively in the laterally directed arms on the respective shafts and are pivotally connected at their inner ends in the weights 454, as shown in Fig. 73, and act centrifugally when the governor shaft is rotated at sufficient speed to draw the shaft 443, rearwardly against the tension of the spring 450, to bring the friction pad 445, on the outer end of said shaft into frictional engagement with the face of the standard 442, and to thereby retard the return rotation of the dial shafts and other mechanisms hereinbefore described.

Means are provided for classifying the sales or transactions to indicate the nature of the transaction or to indicate the clerk registering the transaction, or both. For this purpose, as shown, a tubular bracket 455, is secured on the front frame plate of the machine below the dials and projects through the casing and is provided at its outer end with a stationary dial 456, as shown in Figs. 1 and 37, having marked thereon at equal distances apart around its periphery, whatever identifying characters may be required. For instance, if intended for the classification of transactions, these identifying characters may be various and as numerous as desired. As shown in the drawings, "C. S." indicates "cash sales"; "P. O." indicates "paid out"; and "R. A." indicates "received on account", and in a similar manner any desired number of characters may be arranged about the dial, utilizing the entire circumference thereof, if desired, or should this indication be required for clerks only, the initials or numbers of the clerks may be marked thereon instead of the identifying characters above described. Journaled in said bracket is a shaft 457, having at its inner end on the inner side the front frame, a pinion or gear wheel 458, and having secured on its outer end a knurled or milled head 459, to permit ready rotation thereof and also an indicator 460, to indicate the proper adjustment to record the proper character. Rotatably secured on the printing shaft 103, is a tubular shaft 461, having on the end thereof adjacent the front frame plates a pinion or gear wheel 462, and on its rear end a bearing against the ratchet for the dollar printing wheel and fixed printing wheel 463, as shown in Fig. 7, having a relatively wide face and having marked thereon the same characters and in the same order as those marked upon the dial 456. A racked bar 464, meshes with both said gears, as shown in Fig. 38, and is slidably secured upon the inner face of the frame plate by means of a set screw 465, which extends through a longitudinal slot in said rack bar and into the frame plate. Said rack bar is provided on its back or upper edge with ratchet teeth, one for each of the signatures or indicators on the printing wheel 463, and a pawl 466, is pivotally engaged on the frame above said rack bar in position to engage the respective ratchet teeth in back of the rack bar to hold the same in adjusted position. As shown, a spring 467, is engaged on the frame plate and on the rack bar and acts normally to hold the rack bar to the lower limit of its travel and exerts tension thereon to return the same to normal when released from adjusted position.

Means are provided for releasing the rack bar to rotate the printing wheel 463, and also the indicator 460, back to normal after each transaction. For this purpose, as shown, a shaft 468, is journaled in the front frame plate and in the standard 119, on which are secured the pawls for holding the printing wheels in printing position and rigidly secured on said shaft is an upwardly extending crank arm 469, having pivotally engaged at its upper end a depending forwardly and upwardly hooked bar 470, as shown in Fig. 38. A spring 471, engages partly around the shaft 468, and engages at its opposite end the tails 472 and 473, on the pawl 466, and the releasing hook 470, and acts to hold the free end of the pawl yieldingly pressed upon the back of the rack bar in position to engage the ratchet teeth thereon, and the lower end of the hooked bar 470, at the forward limit of its movement or in engagement with a pin 474, set in the side of the rack bar, as shown in Fig. 38.

As shown, a pin 475, is set in the rear face of the pawl 466, in position to fall into engagement with the hook on the lower end of said lever 470, when the pawl is seated in engagement with any of the ratchet teeth on the rack bar, so that upward movement of the hook bar acts to release the rack bar from its pawl, permitting the same to move downwardly reversely rotating the respective shafts controlled thereby. This release is effected by means of a lever 476, secured near the rear end of said shaft 468, and projecting inwardly to near the printing wheels and there provided with a downwardly directed, V shaped head 477, affording an inclined contact surface on both sides thereof.

Secured on the printing carriage near the inner end thereof, is a striking arm 478. For this purpose, as shown, a metallic plate having said arm integrally secured thereon, is bolted upon the upright web 321, of said carriage and projects transversely thereof to engage beneath the head 477, of said arm 476, and thereby rotate the shaft 468, with each reciprocation of the printing carriage. Said striking arm normally engages beneath said head to support the same, in which position the pin 475, bears against the bend of the hook on the arm 470. When the carriage is reciprocated inwardly, however, as shown in Fig. 40, said arm drops, permitting the hook 470, to drop beneath the hook 475, under the tension of its spring 471, and the sudden return of the carriages throws the tripping arm 476, upwardly pulling the detent out of engagement with the rack bar. Of course, mechanism such as described may be provided to indicate the character of the transactions and another to indicate the clerk effecting the transaction, in which event, of course, a mere duplication would be necessary. I have shown, however, but one of such mechanism, as it would be obvious that one or more than one may be used.

The operation is as follows: All the mechanisms of the machine are grouped about, and driven by the respective dial shafts, which act rotatably, and all the mechanisms operate rotatably, first, to actuate the dial shafts; second, to actuate the sight indicator cylinders; third, to actuate the registering mechanism; fourth, to actuate the printing mechanisms and the governor. Practically all these operations are effected by means of intermeshing gear wheels, which insure the utmost accuracy and reliability, together with an exceedingly strong and compact structure. The dials having the various keys set therein (actuation of which determines the amount of rotation of the respective dials, and, of course, determines the extent of rotation of all the other mechanisms connected therewith) serve no other purpose than to afford means for engaging the crank thereon to determine the extent of rotation of the dial for each operation. Said keys are so arranged in the respective dials and so secured therein, that should the wrong key be actuated, it may be released by the release key set in the opposite side of the key previously actuated. When, however, the registering movement of any dial has begun, the machine is positively locked to prevent the return of the dial until the dial has reached the limit of its downward rotation and in the same manner when the downward limit of travel of the crank has been reached in actuating any dial to effect the registration of any amount, no other movement is possible for the dial except the return rotation of the dial to normal, as before described with reference to the pawls engaging the respective ratchet wheels on the respective dial shafts. The rotation of the dial shafts for maximum registration, actuates the indicating cylinders in one direction and at full return said cylinders are arrested to display the amount of the transaction, enabling the customer or observer to see the amount recorded in whatsoever position he may stand with reference to the machine. Owing to the construction described, the direction of rotation of the indicating cylinders to effect the indication desired, depends upon the relation of the amount to be indicated to that previously indicated. In any event, should the amount to be indicated be less than the previous indication, that indicating cylinder rotates reversely to effect the indication. If more, positively and in the normal direction. The registering mechanisms are positively driven and at all times held in adjusted position through the medium of the intermeshing gears before described, and the ratchet wheels and pawls whereby the registration is positively and progressively effected during the forward or registering movement of the dials and dial shafts, while the carrying from the lower to the higher denomination of the tens of that denomination are effected during the reverse rotation thereof, such carrying, however, being completed, and the various registering shafts and the registering wheels thereon at all times held in positive control, during the entire movement and at the end of such movement.

The set back mechanism for the registers, as before described, permits the operation of setting the same back to be quickly effected and in each instance prevents the commission of error, inasmuch as the set back mechanism locks at normal or naught position in each instance and can effect no further action in the registers.

All parts of the machine are so constructed as to permit of the same being constructed of dies or by means of stamped or pressed metal, thus economizing in the construction. The printing mechanism, the registering mechanism, the governor, and practically all of the more important mechanisms comprising the machine, are each mounted upon an individual and independent frame secured within the main frame, and affording thereby great rigidity of construction and permitting easy and quick assembling.

Of course, it is to be understood that I have shown and described but a preferred form of my invention, although very numerous modifications and variations from the construction shown are possible. I therefore do not purpose limiting the patent granted otherwise than necessitated by the prior art.

I claim as my invention:

1. A cash register embracing the combination of co-axial rotative shafts, with a circular dial secured on the outer end of each, push keys on each dial for the respective money denominations, a crank for rotating the dials by selectively engaging the keys on said dials and thereby rotating the respective shafts, and registering mechanism rotatably driven from said rotative shafts selectively and proportionately to their respective rotational movements.

2. A cash register embracing the combination of co-axial rotative shafts, with a circular dial secured on the outer end of each, push keys in orderly arrangement on each dial for the respective money denominations, a crank adapted normally to sweep over said keys on the respective dials and adapted to engage the push keys selectively and thereby rotate the respective shafts proportionately with the key engaged, and rotative registering mechanism rotatably and selectively driven from said rotative shafts.

3. A cash register embracing the combination of co-axial rotative shafts, with a circular dial secured on the outer end of each, push keys on each dial for the significant digits of the respective money denominations, a crank adapted to normally sweep over the dials and the keys thereon and to selectively engage the keys actuated to rotate the respective dials proportionally to the digits of the keys engaged by the crank, registering mechanism rotatably and selectively driven from said rotative shafts, and a spring acting to return the crank and shafts to normal.

4. A cash register embracing the combination of co-axial rotative shafts, with a circular dial secured on the outer end of each, push keys on each dial in orderly arrangement and appropriated to the significant digits of the money denomination for its shaft, a crank adapted normally to sweep over the tops of the keys on the dials and to engage predetermined keys selectively to rotate the respective dials and shafts connected therewith, registering mechanism selectively and rotatively driven from said rotative shafts, and a spring to return the crank and shafts to normal after each actuation.

5. In a device of the class described the combination of a casing, with rotative shafts journaled in said casing and comprising a central crank shaft and tubular dial shafts journaled thereon and successively on each other, a dial rigidly secured on the outer end of each of said dial shafts at the front side of the casing, push keys in each dial appropriated to the respective money units of a given denomination, a crank on the outer end of the crank shaft adapted normally to sweep over said keys and adapted to engage the keys actuated to rotate the dials to registering position, and a register geared to the respective dial shafts and rotatably driven thereby.

6. In a device of the class described the combination of a casing, with a base supporting the same, a shaft, and tubular co-axial dial shafts journaled in the main frame, a dial rigidly secured on the outer end of each of said dial shafts at the front of the casing, and having the outer face in a common plane, push keys in each dial appropriated to the respective money units of a given denomination, a crank on the outer end of the crank shaft adapted normally to sweep over said keys and adapted to engage the keys actuated to rotate the dials to registering position, a registering mechanism geared to the respective dial shafts and rotatably driven thereby, and a rotative four way indicator geared to each shaft and driven thereby.

7. In a cash register the combination of a casing, with a central crank shaft and a plurality of tubular dial shafts journaled thereon and successively on each other, a dial on the outer end of each dial shaft and nested one within the other, push keys on each dial in orderly arrangement and appropriated to the digits each of one money denomination, means engaging to firmly hold each push key when pressed inwardly and adapted to be released by the pushing of any other key on the same dial prior to the movement of the dial, a crank on the outer end of the crank shaft adapted to engage each depressed key to rotate the dial thereby, a release key on each dial on the opposite side thereof from the digits keys, a gear on the inner end of each dial shaft, a register comprising a wheel to correspond with each dial, and gears connected to drive the same and meshing with the gear on the appropriate dial shaft.

8. In a cash register the combination of a casing, with a central crank shaft and a plurality of co-axial dial shafts journaled thereon and successively on each other, a dial on the outer end of each dial shaft and nested one within another, push keys on each dial in orderly arrangement and appropriated respectively to the digits of money denominations, means for engaging to firmly hold each push key when pressed inwardly and adapted to be released by the pushing of any other key on the same dial prior to the movement of the dial, a crank on the outer end of the crank shaft adapted to engage each depressed key to rotate the dial thereby, a release key on each dial on the opposite side thereof from the digits keys, a gear on the inner end of each dial shaft, a register comprising a wheel to correspond with each dial, a gear connected to drive the same and meshing with the gear on the appropriate dial shaft, and means for transferring the tens of one denomination to the register of a higher denomination.

9. In a cash register the combination of a casing, with a crank shaft and a plurality of tubular dial shafts journaled therein and successively on each other, a dial on the outer end of each dial shaft and nested one within another, push keys on each dial in orderly arrangement and appropriated on the respective dials to the significant digits of the respective money denomination, means engaging to lock each push key when adjusted inwardly and adapted to be released by the actuating of any other key on the same dial prior to the movement of the dial, a crank on the outer end of the crank shaft adapted to engage each depressed key to rotate the dial thereby, a release key on each dial on the opposite side thereof from the digits keys, a gear on the inner end of each dial shaft, a register comprising a wheel to correspond with each dial, a gear connected to drive the same and meshing with the gear on the appropriate dial shaft, and a rotative indicator geared to each dial shaft and driven thereby to indicate the total transaction at four different places thereon.

10. In a cash register the combination of rotative co-axial dials, each appropriated to a money denomination, with a tubular dial shaft engaged on each and co-axially journaled in the machine, a crank shaft extending through said dials and dial shafts, a crank thereon for actuating the dials to rotate the same appropriately with the amount to be registered of each denomination, a gear wheel on each dial shaft, a rotative registering mechanism, a rotative sight indicating mechanism, and a printing mechanism, all positively geared therewith and rotated thereby to respectively register, record, and visibly display the amount of the transaction.

11. In a cash register the combination of rotative co-axial dials, each appropriated to a money denomination, with a tubular dial shaft engaged on each and co-axially journaled in the machine, a crank shaft extending through said dials and dial shafts, a crank thereon for actuating the dials to rotate the same appropriately with the amount to be registered of each denomination, a gear on each dial shaft, a registering mechanism, a sight indicating mechanism and a printing mechanism all positively geared therewith and rotated thereby to respectively register, record, and visibly display the amount of each transaction, and a governor for controlling the operation of said mechanisms.

12. In a cash register the combination of rotative coaxial dials each appropriated to a money denomination, a plurality of push buttons on each of said dials, dial shafts connected with said dials and arranged coaxially, a gear connected with each of said coaxial dial shafts, a registering mechanism, a sight indicating mechanism and a printing mechanism, all positively geared therewith and rotated thereby to respectively register, record, and visibly display the amount of the transaction, and means adapted to normally sweep over said dials to selectively engage the push buttons to rotate the dials selectively and proportionately with the amount of the transaction.

13. In a cash register the combination of rotative co-axial dial shafts, with dials connected with each of said shafts, each appropriated to a money denomination, a gear connected with and driven by each dial shaft, a registering mechanism, a rotatable sight indicating mechanism and a printing mechanism, all positively geared therewith and actuated thereby to rotatively register a record, and to visibly display the amount of the transaction, and means adapted to normally swing over the face of said dials to selectively actuate the same.

14. A machine of the class described embracing the combination of a rotative registering mechanism, with a rotative printing mechanism and a rotative sight indicating mechanism, gears on each of said mechanisms, rotative dials, rotative coaxial dial shafts secured to said dials journaled intermediate said mechanisms, a gear on each dial shaft meshing the corresponding gears for each of said mechanisms, and a crank for selectively engaging said dials and rotating the dial shafts proportionally to the amounts to be registered, said geared connections acting to rotate all said mechanisms correspondingly.

15. A machine of the class described embracing the combination of a rotative registering mechanism, with a rotative printing mechanism and a rotative sight indicating mechanism, coaxial shafts connected with each of said mechanisms, gear wheels on each of said coaxial shafts, rotative dial shafts journaled intermediate said mechanisms, a gear on each dial shaft meshing the corresponding gears for each of said coaxial shafts, a crank for rotating the dial shafts selectively and proportionally to the amounts to be registered, said geared connections acting to rotate all said mechanisms correspondingly, and mechanism for returning all of said mechanisms to normal.

16. A machine of the class described embracing the combination of a rotative registering mechanism, with a rotative printing mechanism and a rotative sight indicating mechanism, coaxial shafts connected with each of said mechanisms, gears on each of said coaxial shafts, rotative dial shafts journaled intermediate said mechanisms, a gear on each dial shaft meshing the corresponding gears on the coaxial shafts for each of said mechanisms, and a crank for rotating the dial shafts selectively and proportionally to the amounts to be registered, said geared connections acting to rotate all said mechanisms correspondingly, those for the sight indicator rotating in either direction to the indication corresponding with the transaction.

17. A machine of the class described embracing the combination of a rotative registering mechanism, with a rotative printing mechanism and a rotative sight indicating mechanism, coaxial shafts connected with each of said mechanisms, gears on each of said coaxial shafts, rotative dial shafts journaled intermediate said mechanisms, a gear on each dial shaft meshing the corresponding gears on the coaxial shafts for each of said mechanisms, a crank for rotating the dial shafts selectively and proportionally to the amounts to be registered, said geared connections acting to rotate all said mechanisms correspondingly, those for the sight indicators acting differentially in either direction to set the indicators to the amount of the transaction.

18. A machine of the class described embracing the combination of rotatable coaxially nested dials, one for each money denomination, with keys thereon respectively appropriated to, and in orderly arrangement for the digits of the respective denomination, tubular dial shafts rigidly secured one on each dial and journaled co-axially, a gear wheel and a ratchet wheel on each, a crank shaft extending through said dials and dial shafts, a crank thereon to engage the keys selectively to rotate the dials in registering, pawls engaging said ratchet wheels to hold said dials and shafts positively from reversal during movement in either direction until the limit of such movement, means then acting to return the same to normal, a register, a sight indicator and a printing mechanism, gear wheels connected with each and meshing with the respective gear wheels on the dial shafts to rotate the same to correspond with the transaction.

19. In a cash register the combination of registering and printing mechanisms, with rotative actuating dials for rotating the same, to correspond with each transaction and the rotation of said actuating dials, a rotative sight indicating mechanism and connections between the same and said rotative actuating dials for rotating the same differentially in either direction to indicate the amount of each transaction.

20. A cash register embracing the combination of co-axial rotative dial shafts, with a gear wheel on each, a registering mechanism, a printing mechanism and a sight indicator, coaxial shafts connected with each of said mechanisms, gear wheels connected to drive each of said coaxial shafts and positively meshing with the gear wheels on the respective dial shafts, whereby all of said mechanisms operate rotatably from the dial shafts.

21. A cash register embracing the combination of co-axial rotative dial shafts, with a dial on each of said shafts, a gear wheel on each, a registering mechanism, a printing mechanism and a sight indicator rotatable differentially in either direction, gear wheels connected to drive each and positively meshing with the gear wheels on the respective dial shafts, whereby all of said mechanisms operate rotatably from the dial shafts, and means adapted to swing over all of said dials and selectively engage and rotate any predetermined number of the same and thereby actuate the mechanisms connected with the coaxial dial shafts.

22. A cash register embracing the combination of co-axial rotative dial shafts, with dials for rotating the same proportionally with the amounts to be registered, a gear wheel on each money shaft, a registering mechanism, a printing mechanism and a sight indicator, gear wheels meshing with the gear wheels on the respective dial shafts and acting to rotate said mechanisms to correspond with the amounts registered, and connections whereby said driving mechanism for said sight indicating mechanism acts differentially to rotate the same in either direction to necessitate minimum movement thereof to indicating position.

23. In a machine of the class described the combination of a casing, with a central crank shaft, a crank thereon, rotatable dial shafts journaled thereon and successively on each other, means connected therewith and adapted for engagement by the crank to rotate each dial shaft proportionately to the amount to be registered, a gear on each dial shaft, a rotative registering mechanism, a rotative printing mechanism and a rotative sight indicating mechanism, gears on each meshing with the gears on the dial shaft and respectively driving each to registering, to printing and to sight indicating position corresponding with the rotation of the dial shafts, means holding the dial shafts from reversal while rotating in either direction, and means operated from the crank shaft for releasing said holding means at each limit of rotation of the dial shafts.

24. In a machine of the class described the combination with a casing, with a central crank shaft, a crank thereon, dial shafts journaled thereon and successively on each other, means carried therewith and adapted for engagement by the crank to rotate each dial or money shaft proportionately to the amount to be registered, a gear on each dial shaft, a rotative registering mechanism, a rotative printing mechanism and a rotative sight indicating mechanism, gears connected with each and meshing with said gears on the dial shafts and respectively driving each to registering, printing and sight indicating position corresponding with the rotation of the dial shafts, detents holding the dial shafts from reversal while rotating in either direction, and means operated from the crank shaft for releasing one of said detents and engaging the other at each limit of rotation for the dial shafts.

25. In a machine of the class described the combination of a casing, with a central crank shaft, a crank thereon, rotatable dial shafts journaled thereon and successively on each other, manually actuated means connected with each dial shaft and adapted for engagement by the crank to rotate each dial shaft proportionately to the amount to be registered, a gear on each dial shaft, a rotative registering mechanism, a rotative printing mechanism, a differentially rotative and reversible sight indicating mechanism, gears meshing with the gears on the dial shaft and respectively driving each to registering, printing and sight indicating position corresponding with the rotation of the dial shafts, oppositely disposed detents holding the dial shafts from reversal while rotating in either direction, and means operated from the crank shaft for releasing one of said detents and engaging the other at each limit of rotation of a dial shaft.

26. In a device of the class described the combination of a casing, with a crank shaft, and dial shafts journaled in the main frame, a dial rigidly secured on each of said dial shafts and having the outer face in a common plane, push keys in each dial appropriated to the respective money units of a given denomination, a crank on the outer end of the crank shaft adapted normally to sweep over said keys and adapted to selectively engage the keys actuated to rotate the dials to a predetermined distance, a registering mechanism geared to the respective dial shafts and driven thereby, and an indicator geared to each shaft and driven thereby.

27. In a cash register the combination of rotative dials each appropriated to a money denomination, with push keys on each of said dials, a dial shaft engaged on each dial, a crank shaft extending through said dials, a crank thereon adapted when actuated to selectively engage the depressed keys on said dials to rotate the dials appropriately with the amount to be registered of each denomination, a gear on each dial shaft, a registering mechanism, and a sight indicating mechanism positively geared therewith and rotated thereby to respectively register and record the amount of each transaction.

28. A machine of the class described embracing rotatable dials, one for each money denomination, keys thereon, dial shafts rigidly secured one on each dial a gear wheel and a ratchet wheel on each, a crank shaft extending through said dials and dial shafts, a crank thereon to engage the keys selectively to rotate the dials in registering, pawls engaging said ratchet wheels to hold said dials and shafts positively from reversal during movement in either direction until the limit of such movement, and means then acting to return the same to normal.

29. In a machine of the class described the combination of a casing, with a crank shaft, a crank thereon, dial shafts, means carried therewith and adapted for engagement by the crank to rotate each dial shaft proportionately to the amount to be registered, a gear on each dial shaft, a rotative registering mechanism, a rotative printing mechanism and a rotative sight indicating mechanism, means connected with the dial shafts and driving each to registering, printing and sight indicating position corresponding with the rotation of the dial shafts, detents holding the dial shafts from reversal while rotating in either direction, and means operated from the crank shaft for releasing one of said detents and engaging the other at each limit of rotation for the dial shafts.

30. In a device of the class described the combination of rotative money shafts, each appropriated to a single denomination to be registered, with a crank shaft co-axial therewith, a crank thereon, adjustable means carried on each money shaft adapted for engagement by the crank to rotate each money shaft a proportional rotation dependent upon the amount to be registered, a registering mechanism, a printing mechanism, a sight indicating mechanism, all geared to the respective money shafts and acting rotationally therewith to register, to print and to display visibly the amount for which the respective money shafts were actuated, and pawls controlled by the crank shaft and acting to hold any and all the money shafts from reversal when rotating in either direction until the limit of travel thereof.

31. In a device of the class described a crank shaft, co-axial tubular money shafts journaled thereon and successively on each other, a dial rigidly secured to each money shaft, adjustable keys on each dial marked successively with money indicating numerals, a crank on the crank shaft adapted to swing over the face of said dials and to selectively engage the keys adjusted on the dial and corresponding with the amounts to be registered and to rotate the shafts to registering position thereby, a ratchet wheel on each money shaft and pawls for each shaft engaging the same and controlled by the crank shaft and acting to hold the money shafts from reversal during rotation toward, and rotation from registering position.

32. A cash register embracing the combination of rotative master shafts, one for each money denomination, with dials adapted to rotate the same selectively and simultaneously to correspond with the amount of each denomination to be registered, a registering mechanism, a printing mechanism, and a sight indicating mechanism, all positively and rotatably driven from the respective master shafts when rotated by the dials to register, to print and to visibly indicate the amount of each transaction.

33. In a device of the class described a casing, money shafts journaled therein, a key dial rigidly secured to each money shaft, a crank adapted to selectively engage the keys on the dial corresponding with the amounts to be registered to rotate the shafts to registering position thereby, a ratchet wheel on each money shaft and pawls engaging the same and controlled by the crank shaft and acting to hold the money shafts from reversal during rotation toward, and rotation from registering position.

34. In a device of the class described a crank shaft, co-axial tubular money shafts journaled thereon and successively on each other, a key dial rigidly secured to each money shaft, a crank on the crank shaft to selectively engage the keys on the dial corresponding with the amounts to be registered to rotate the shafts to registering position thereby, a ratchet wheel on each money shaft and pawls engaging the same and controlled by the crank shaft and acting to hold the money shafts from reversal during rotation toward, and rotation from registering position.

35. In a machine of the class described rotative tubular and co-axially nested master shafts, each appropriated to a money denomination, a crank shaft journaled therethrough, a crank on the outer end thereof, adjustable means carried on the outer end of each shaft and adapted for engagement by the crank to permit rotation of said shafts selectively and collectively, a fractional rotation proportionately to the money of that denomination to be registered, a spring acting to return said shafts to normal after each fractional rotation, all positively and rotatably driven from the respective master shafts to register, to print and to visibly indicate the amounts of each transaction, pawls controlled by the crank shaft and acting to prevent reversal of the money shaft in rotating toward and in rotating from registering position, and a governor acting to control the reverse rotation of the mechanism to normal.

36. In a machine of the class described rotative master shafts, each appropriated to a money denomination, a crank shaft, a crank on the outer end thereof, adjustable means carried on the outer end of each shaft and adapted for engagement by the crank to permit rotation of said shafts selectively and collectively, and pawls controlled by the crank shaft and acting to prevent reversal of the money shaft in rotating toward and in rotating from registering position, and a governor acting to control the reverse rotation of the mechanism to normal.

37. In a device of the class described rotative tubular and co-axially nested master shafts, each appropriated to a money denomination, a crank, adjustable means carried on the outer end of each shaft and adapted for engagement by the crank to permit rotation of said shafts selectively and collectively, a fractional rotation proportionately to the money of that denomination to be registered, mechanisms all positively and rotatably driven from the respective master shafts to register, to print and to visibly indicate the amounts of each transaction, and means acting to prevent reversal of the money shaft in rotating toward and in rotating from registering position.

38. In a cash register, rotative money shafts, a crank shaft and crank for actuating the money shafts, oppositely facing ratchet wheels on each money shaft, a rock shaft, pawls on said rock shaft extending on opposite sides of the respective ratchet wheels and adapted one to engage when the other is out of engagement with the ratchet wheels, and respectively the one when engaged to hold the shaft from reversal during rotation to the right, the other when engaged to hold the shaft from reversal during rotation to the left, and means operated by the crank shaft to throw one set of pawls out of engagement and the other set of pawls into engagement at the limit of each rotational movement of the shafts.

39. In a machine of the class described the combination of rotative dial or money shafts, one for each money denomination journaled co-axially, with a crank for rotating said shafts in one direction to registering position, a spring acting to reverse the rotation to normal, adjustable keys carried on the outer end of each shaft for engagement with the crank and capable of engagement thereby only when adjusted inwardly longitudinally of the shafts, a rotative registering mechanism, a rotative printing mechanism, and a rotative indicating mechanism, all positively driven from said money shafts to correspond with the amount to be registered, a rotative mechanism adapted to be manually set to print the character of the transaction and simultaneously with the printing of the amount of the transaction.

40. In a machine of the class described, the combination of rotative printing or type wheels with rotative money shafts for adjusting the same to the amount to be registered when the type wheels are actuated in a printing operation, dials adapted to be selectively actuated to rotate said shafts, and rotative mechanism adapted to be manually set for indicating the character of the transaction with the print of the amount of the transaction.

41. In a machine of the class described the combination of a rotative dial shaft, with a crank for rotating said shaft in one direction to registering position, means for reversing the rotation to normal, adjustable keys carried on the outer end of said shaft for selective engagement with the crank, a registering mechanism, a printing mechanism, and indicating mechanism, all positively driven from said money shaft to correspond with the amount to be registered.

42. In a device of the class described the combination of a casing, with a base supporting the same, a shaft, and dial shafts journaled in the main frame, a dial rigidly secured to each of said dial shafts, push keys in each dial appropriated to the respective money units of a given denomination, a crank adapted normally to sweep over said keys and adapted to engage the depressed keys to rotate the dials to registering position, and a registering mechanism geared to the respective dial shafts and rotatably driven thereby.

43. In a cash register, a plurality of dial or money shafts arranged successively on each other, a dial on each dial shaft, push keys on each dial in orderly arrangement and appropriated to the digits each of one money denomination, means engaging each push key when pressed inwardly and adapted to be released by the pushing of any other key on the same dial prior to the movement of the dial, a crank on the outer end of the crankshaft, adapted to engage each depressed key to rotate the dial thereby, and means adapted to prevent the release of the depressed keys until the movement of the dials is positively arrested.

44. In a cash register a casing, a plurality of tubular dial shafts journaled therein and successively on each other, a dial on each dial shaft and nested one within another, push keys on each dial in orderly arrangement and appropriated on the respective dials to the significant digits of the respective money denomination, means engaging to lock each push key when adjusted inwardly and adapted to be released by the actuating of any other key on the same dial prior to the movement of the dial, a crank adapted to engage each depressed key to rotate the dial thereby, means locking the depressed key in depressed position during rotation of its dial and means preventing reverse rotation of the dial prior to the completion of its forward rotation.

In testimony whereof I have hereunto subscribed my name in the presence of two subscribing witnesses.

CHARLES SULFER.

Witnesses:
CHARLES W. HILLS, Jr.,
LAWRENCE REIBSTEIN.

Copies of this patent may be obtained for five cents each, by addressing the "Commissioner of Patents, Washington, D. C."